United States Patent
Stephenson et al.

(10) Patent No.: US 12,165,103 B1
(45) Date of Patent: Dec. 10, 2024

(54) SYSTEMS AND METHODS FOR AUTOMATED PROBABILISTIC BASED FORECASTS OF COMPONENT DEMAND AND COST INCORPORATING DATA UP-SAMPLING

(71) Applicant: Halliburton Energy Services, Inc., Houston, TX (US)

(72) Inventors: Stanley Vernon Stephenson, Duncan, OK (US); Harold Grayson Walters, Houston, TX (US); Shahab Jamali Ghare Tape, Houston, TX (US); Erik Lee, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/602,800

(22) Filed: Mar. 12, 2024

(51) Int. Cl.
*G06Q 10/087* (2023.01)
*G06Q 10/0631* (2023.01)
*G06Q 30/0202* (2023.01)

(52) U.S. Cl.
CPC ..... *G06Q 10/087* (2013.01); *G06Q 10/06315* (2013.01); *G06Q 30/0202* (2013.01)

(58) Field of Classification Search
CPC .......... G06Q 10/087; G06Q 10/06315; G06Q 30/0202
See application file for complete search history.

(56) References Cited

U.S. PATENT DOCUMENTS

| | | | |
|---|---|---|---|
| 6,865,513 B2 | 3/2005 | Ushiku et al. | |
| 8,347,957 B2 | 1/2013 | Stephenson et al. | |
| 8,612,316 B2 | 12/2013 | Lepman | |
| 11,613,201 B2 | 3/2023 | Li et al. | |
| 2003/0216888 A1* | 11/2003 | Ridolfo | G05B 23/0283 702/181 |
| 2017/0308802 A1* | 10/2017 | Ramsøy | G06N 20/00 |
| 2019/0188584 A1* | 6/2019 | Rao | G06Q 10/00 |
| 2023/0082374 A1* | 3/2023 | Vahid | F17C 3/085 62/51.1 |
| 2023/0260332 A1* | 8/2023 | K | G07C 5/0808 701/31.4 |

* cited by examiner

*Primary Examiner* — A. Hunter Wilder
(74) *Attorney, Agent, or Firm* — Conley Rose, P.C.; Rodney B. Carroll

(57) ABSTRACT

Disclosed is generating an acquisition request of a component, using a probabilistic model based on current and planned life consumption, to maintain a usable component inventory, by: determining planned consumption of the component; retrieving historical lifetime data associated with the component; determining the associated normalized current life consumed for historical specimens at failure based on a power law equivalency model; determining a probability of survival distribution associated with the component; determine a probability of future failure of each component in inventory given planned consumption of the component; determine a projected number of component failures prior to completion of the job associated with the component; generate the at least one acquisition request to acquire a quantity of new components at least equal to the projected number of specific component failures prior to completion of the job; wherein the usable inventory of the component includes at least the quantity of new components.

19 Claims, 23 Drawing Sheets

|  | EFLB 702B | | | Probability of Failure 704B |
|---|---|---|---|---|
|  | Start 706B | Delta/Mo 708B | End 710B | |
| 706A | 0 | 8,500 | 8,500 | 2.3% |
| 708A | 20,000 | 8,500 | 28,500 | 16.4% |
| 710A | 40,000 | 8,500 | 48,500 | 39.0% |
| 712A | 60,000 | 8,500 | 68,500 | 62.0% |
| 714A | 80,000 | 8,500 | 88,500 | 80.4% |
| 716A | 100,000 | 8,500 | 108,500 | 91.4% |

- Each component end starts with different consumed life
- Prior pressures and volume impact consumed life
- Same delta consumed $$\text{Conditional } F = 1 - \frac{R(B)}{R(A)}$$

Speed Reducer Model 1100

$1102$ — $EFLTC = \sum_{i=1}^{20} kRevs_i \times 1000 \times \left(\frac{SpeedReducerTorque_i}{300,000}\right)^{Exponent}$ $1104$ — $EFLTB = EFLTC \times \frac{Bbls}{Rev} \times 1000$ $1106$ — $BblsToFailureAtPressure = EFLTC \times \frac{Bbls}{Rev} \times 1000 \times \left(\frac{SpeedReducerTorque_i}{300,000}\right)^{Exponent}$ 1108 — $EFLTC$ = Equivalent Full Load Torque Cycles
1110 — $EFLTB$ = Equivalent Full Load Torque Barrels
1112 — $Press_i$ = Weighted Avg Pressure in each 1000 psi Bucket
1114 — $kRevs_i$ = Revs x 1000 at each 1000 psi Bucket
1116 — $Press_{ref}$ = Pressure to adjust equivalency to
1118 — $SpeedReducerTorque_i$ = $Press_i$ x PeakTorqueFactor x Pump Gear Ratio

| Data Format 1120 | | | | | |
|---|---|---|---|---|---|
| 1122 — Pressure Bucket | 1000 | 2000 | 3000 | ••• | 20,000 |
| 1124 — Pressure | $Press_1$ | $Press_2$ | $Press_3$ | ••• | $Press_{20}$ |
| 1126 — kRevs | $kRevs_1$ | $kRevs_2$ | $kRevs_3$ | ••• | $kRevs_{20}$ |

*FIG. 11*

| Fails | UpSamples |
|---|---|
| 2 | 1 |
| 4 | 6 |
| 6 | 15 |
| 8 | 28 |
| 10 | 45 |
| 12 | 66 |
| 14 | 91 |
| 16 | 120 |
| 18 | 153 |
| 20 | 190 |

$k$    $\dfrac{k^2 - k}{2}$

SYSTEMS AND METHODS FOR AUTOMATED PROBABILISTIC BASED FORECASTS OF COMPONENT DEMAND AND COST INCORPORATING DATA UP-SAMPLING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally considered when deploying a pump for use in oil and gas operations. One deployment consideration concerns the life and reliability of various components of the pump configured to move fracturing fluid at high pressure or conduct other wellbore servicing operations.

Traditional, contemporary repair and maintenance forecasting ("R and M forecasting") methodologies for pump components depend on all component usage data being recorded in steady state conditions and on a in terms of a common component life metric such as pump hours or hydraulic horsepower hours being applicable to all components. Yet, in traditional, contemporary R and M forecasting, neither of these assumptions is realistic in real-world conditions. For example, under real-world conditions, the following non-limiting examples of steady-state conditions are not present:
  a constant ratio of pumps available for a wellbore servicing operation versus pumps required for the wellbore servicing operation versus pumps actually used for the wellbore servicing operation;
  a constant pressure, flowrate, and time for all wellbore servicing jobs (that is, the same component life consumption intensity for all wellbore servicing jobs);
  a same amount of prior usage prior to a current usage;
  a constant failure rate that does not account for amounts of pump component useful service lifetimes already consumed in previous wellbore servicing operations;
  a constant build rate for new or replacement equipment;
  a constant rate of retirement of used equipment; and
  an unchanging market activity.

Such steady-state conditions cannot exist when tracking component usage by, for example, hydraulic horsepower hours or pump hours because linear relationships between those metrics and life consumption do not exist, and also because every type of component does not have the same physics of failure.

Under real world conditions, attempting to use traditional, contemporary methods of predicting expected component failures is insufficient and unreliable because without steady state conditions and common life metrics for each component type, unrepeatable results emerge as conditions change. As such, forecasts of remaining component life before failure using only pumping hours or hydraulic horsepower hours are inadequate because such metrics fail to account for non-linear relationships, past usage, planned usage or usage intensity.

Likewise, traditional, contemporary methods do not provide a reliable way to project which components of a pumping unit will require the most resources to continue operating in the future. Since each component of a pump is replaced at different times, and each component has a different average lifetime before failure, some pumping units are equipped with nearly new components, some with components nearing end of life, some with a mixture thereof, and so forth. Merely tracking calendar time since a pump construction or rebuild date is insufficient for a useful projection.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 11 is a conversion model that defines an EFLX for a speed reducer of a pump, according to an embodiment of the disclosure.

DETAILED DESCRIPTION OF THE INVENTION

Figure 1A:
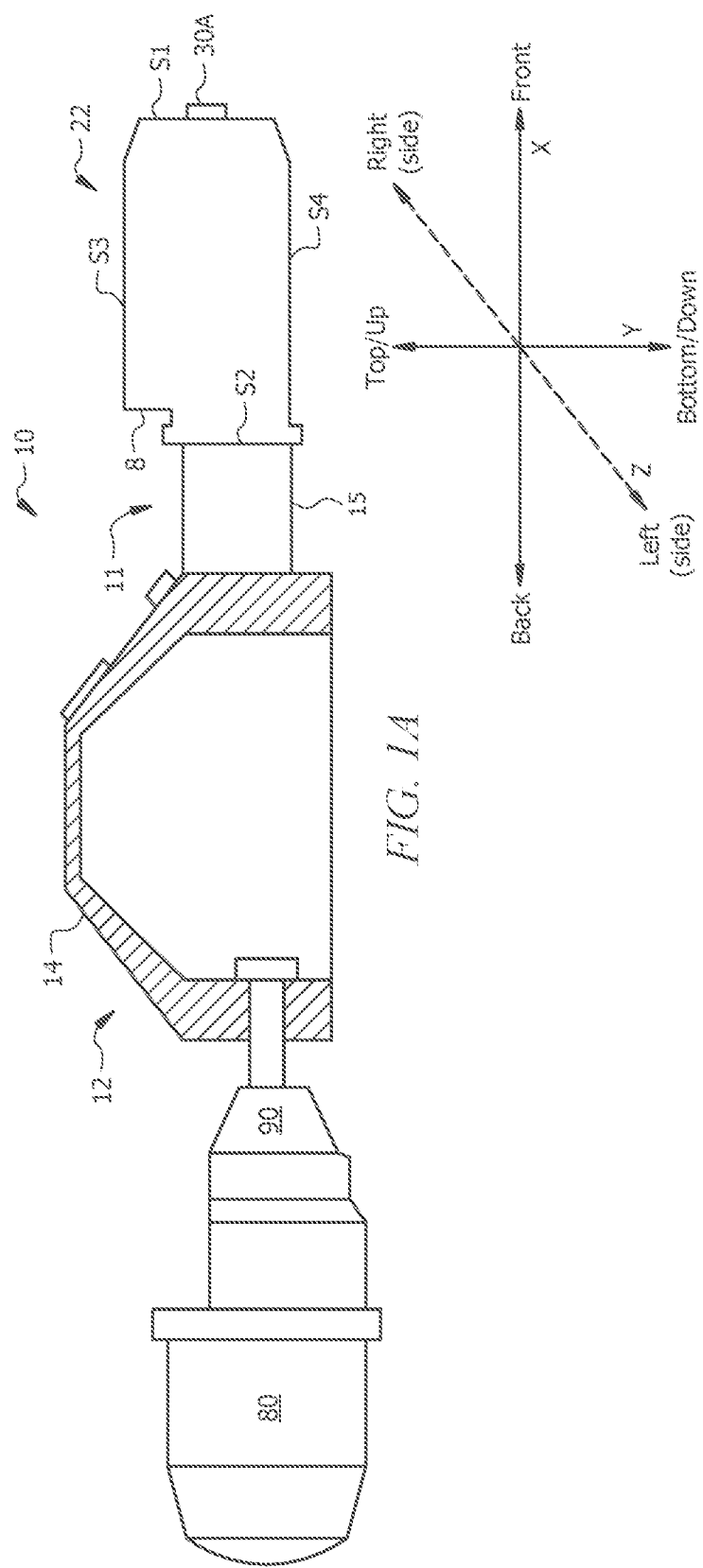
FIG. 1A is a side elevational view illustrating a pump according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure is generally directed to a pumping units used in oilfield servicing operations, and specifically directed to systems and methods to project expected pumping unit component failures using probabilistic analysis of conditional reliability of pumping unit components.

The disclosed systems and methods operate unconventionally at least by using power law non-linear life models of pumping unit components in combination with load metrics based on treating pressures and a number of cycles at each load. Due to variability of component manufacturing, metallurgy, abuse and variables that cannot be practicably accounted for in real-world use, the life consumed up to failure of a component is not a discrete value but a distribution of values. Thus, a probabilistic methodology is usable to determine life consumption of a component and the associated costs at risk of further usage of that component. Cost at risk includes physical resources and labor needed to repair or replace failed components. Future planned consumption metrics, which include information on pressure, flowrate and time in use, enable determining an expected number of failures and associated cost at risk on planned jobs while a common typical job of flowrate, pressure and time is used to determine the costs at risk for each pumping unit exposed to these common conditions. In some embodiments, the use of the common operating conditions discussed above for the calculations of cost at risk provides a rank ordered list, organized by cost at risk, of the available pumps, enabling selecting the lowest cost at risk pumps given the expected common conditions. This normalization provides basis to determine which pumping units are old (that is, that have the highest costs at risk) to which pumping units are young (that is, that have the lowest costs at risk).

The systems and methods herein further operate unconventionally by modelling pump unit components in such a way as to allow continuous calculations, under non-steady state conditions, of various useful component life metrics. Readily determinable pump and component performance data includes but is not limited to:

The probability a component or the entire pumping unit will survive or fail during an upcoming usage period, or other levels of usage at the anticipated load conditions;

the cost at risk for each component of a pumping unit and thus the entire pumping unit for a planned wellbore servicing operation;

the number of components expected to fail under defined operating conditions of pressure, flowrate, time or other applicable metrics;

the probabilistic cost at risk under operating conditions of pressure rate, time and/or other applicable metrics;

a funnel-shaped confidence interval that widens the further the failures and costs are forecasted into the future; and a surrogate for equipment age of a pump fleet in the form of a rank ordered list of pumping units arranged from those with the most cost at risk to those with the lowest costs at risk when operated under the same normalizing conditions.

Figure 1B:
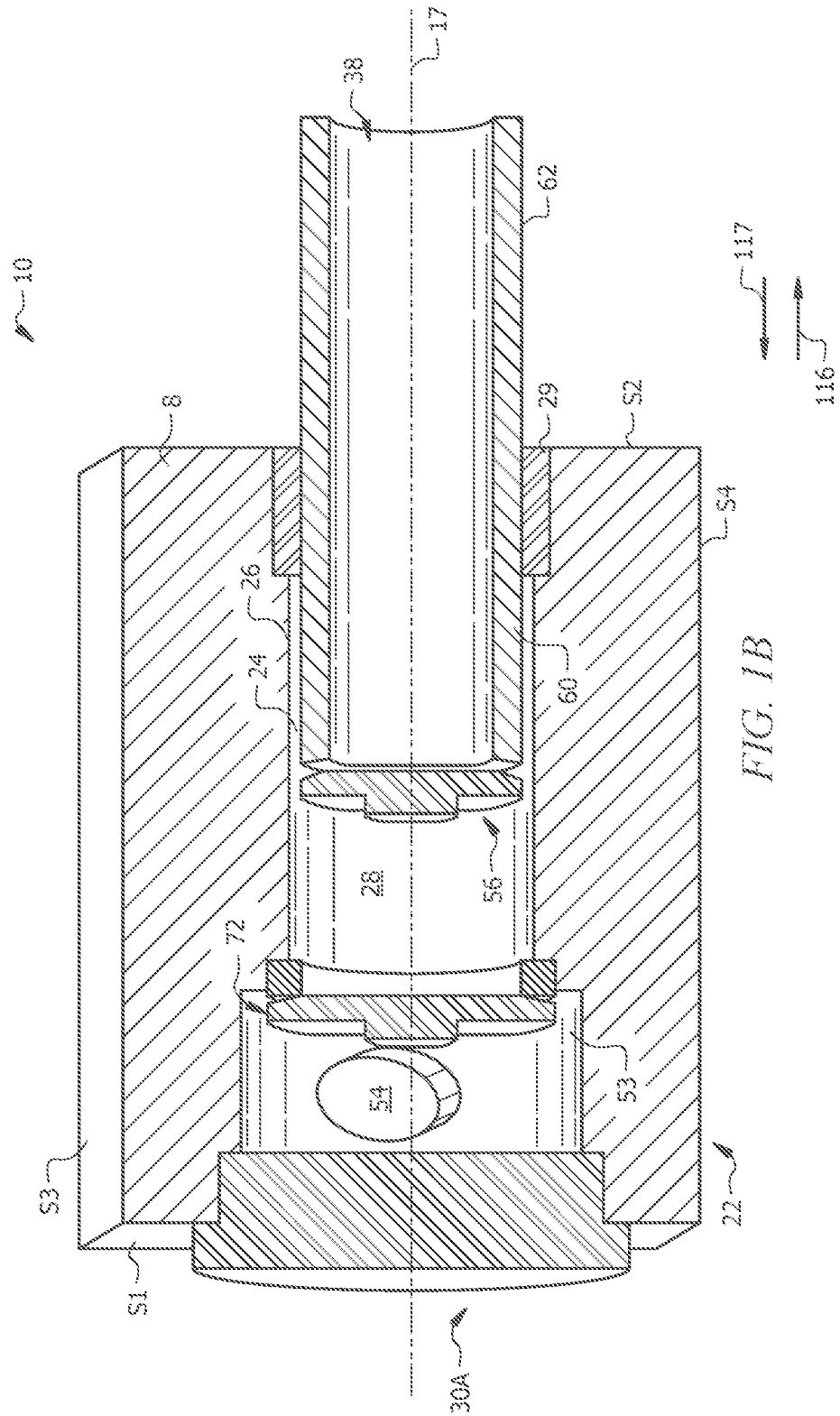
FIG. 1B is a cut-away view illustrating an exemplary pump comprising a concentric bore pump fluid end according to an embodiment of the disclosure.

FIG. 1A shows a side elevational view illustrating a pump 10 according to an embodiment of the disclosure. For convenience, FIG. 1A is discussed herein in conjunction with discussion of FIG. 1B, is a cut-away view illustrating an exemplary reciprocating pump comprising a concentric bore pump fluid end according to an embodiment of the disclosure, and FIG. 1C, a cut-away view illustrating an exemplary reciprocating fracturing pump comprising a cross-bore (referred to as a "tee-bore" or "T-bore" herein) pump fluid end according to an embodiment of the disclosure.

In some embodiments, the pump 10 is a reciprocating pump. The reciprocating pump 10 comprising a pump power end 12, a pump fluid end 22, and an integration section 11. As illustrated in FIG. 1, the pump fluid end 22 has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the x-axis is along a plane perpendicular to the plane of the x-axis and the y-axis. Accordingly, toward the top of the pump fluid end 22 (and the pump 10) is along the y-axis toward top S3, toward the bottom of the pump fluid end 22 (and the pump 10) is along the y-axis toward bottom S4, toward the front of the pump fluid end 22 (and the pump 10) is along the x-axis toward front S1, and toward the back of the pump fluid end 22 (and the pump 10) is along the x-axis away from front S1.

Figure 1C:
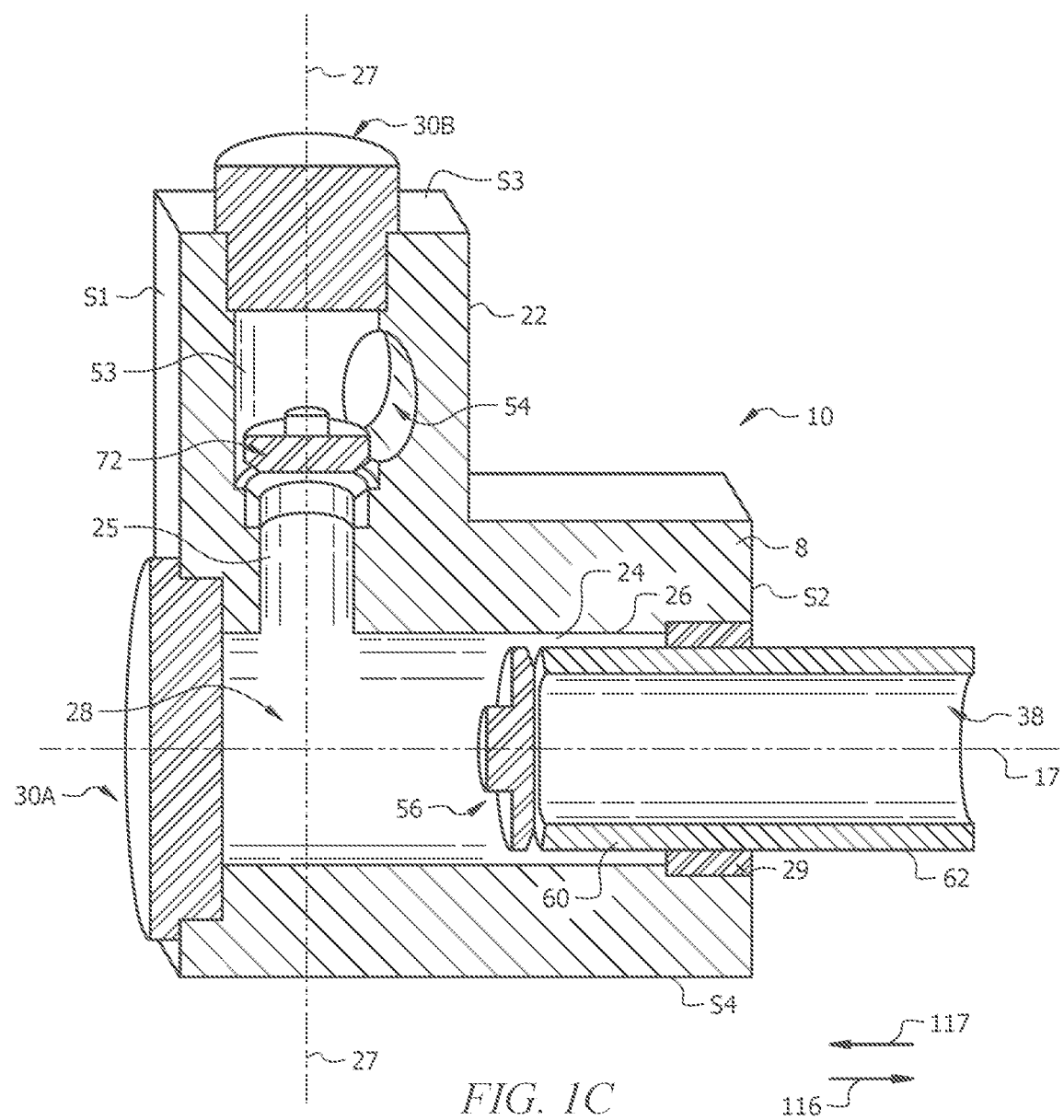
FIG. 1C is a cut-away view illustrating an exemplary pump comprising a cross-bore (referred to as a "tee-bore" or "T-bore" herein) pump fluid end according to an embodiment of the disclosure.

The pump fluid end 22 is integrated with the pump power end 12 via the integration section 11, such that the pump power end 12 is operable to reciprocate the reciprocating element 18 within a reciprocating element bore 24 (see FIGS. 1B and 1C) of the pump fluid end 22. The reciprocating element bore 24 is at least partially defined by a cylinder wall 26. As described further hereinbelow with reference to FIG. 1B, pump fluid end 22 of this disclosure can be an in-line or "concentric" bore pump fluid end. In alternative embodiments, described further hereinbelow with reference to FIG. 1C, pump fluid end 22 is a "cross-bore" pump fluid end 22, which, as utilized herein, can include "T-bore" pump fluid ends, "X-bore" (e.g., cross shaped bore) pump fluid ends, or "Y-bore" pump fluid ends. FIG. 1B is a schematic showing a concentric bore pump fluid end 22 engaged with a reciprocating element 18. FIG. 1C is a schematic showing a T-bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 1D:
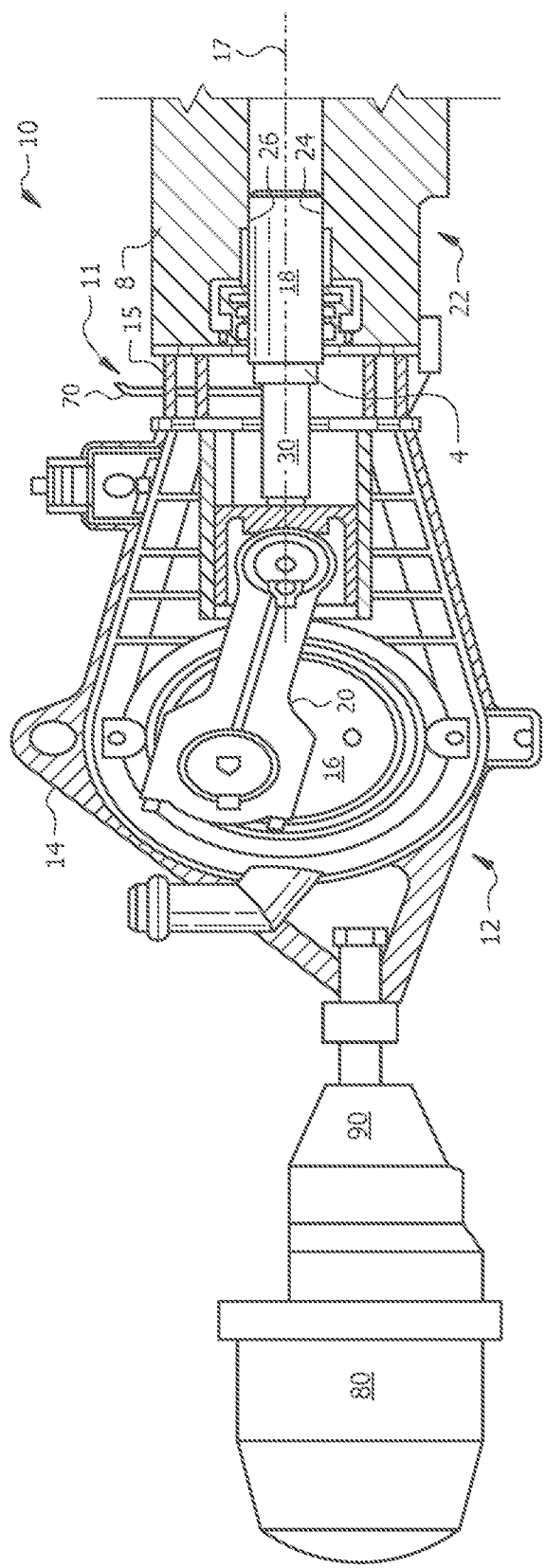
FIG. 1D is a cut-away view illustrating a pump power end of a pump according to an embodiment of the disclosure.

Those versed in the art will understand that the pump power end 12 may include various components commonly employed in pumps. For example, pump power end 12 comprises a power source 80 (sometimes referred to as a prime mover), a transmission 90, and a crankshaft assembly disposed within housing 14 (e.g., a crankcase). In some embodiments, the transmission includes a speed reducer, as that term is understood by persons having ordinary skill in the art. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 1D provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm 20 and pushrod 30. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", although not wishing to be limited to a particular reciprocating element 18). Pump 10 of FIG. 1A is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20). In embodiments, the power source 80 is mechanically coupled to the crankshaft 16 by a transmission 90.

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1A are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIG. 1B and FIG. 1C. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1) and return strokes (also referred to as suction strokes and correlating to movement in a negative direction parallel to the x-axis of FIG. 1), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. When discharge valve assembly 72 is in a closed configuration (e.g., under the influence of a closing mechanism, such as a spring, the high pressure in a discharge pipe or manifold containing discharge outlet 54) prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body and a valve seat thereof) and a configuration in which fluid cannot flow through the valve assembly (e.g., cannot pass between a valve body and a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 1B, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration of FIG. 1B, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). With reference to the embodiment of FIG. 1C, which is a schematic showing a T-bore pump fluid end 22 engaged with a reciprocating element 18, T-bore pump fluid end 22 comprises a T-bore fluid end body 8, a T-shaped pump chamber 28, a suction valve assembly 56, and a discharge valve assembly 72. In this T-bore configuration of FIG. 1C, suction valve assembly 56 is coupled with front end 60 of reciprocating element 18 and discharge valve assembly 72 is positioned in bore 25 that makes a tee with reciprocating element bore 24, i.e., central axis 17 of reciprocating element bore 24 is also the central axis of suction pump assembly 56 and perpendicular to a central axis 27 of discharge valve assembly 72).

Suction valve assembly 56 and discharge valve assembly 72 are operable to direct fluid flow within the pump 10. In pump fluid end 22 designs of this disclosure, fluid flows within a hollow reciprocating element (e.g., a hollow plunger) 18 via fluid inlet 38 located toward tail end 62 of reciprocating element 18. The reciprocating element bore 24 of such a fluid end design can be defined by a high-pressure cylinder 26 providing a high-pressure chamber. (As utilized here, "high pressure" indicates possible subjection to high pressure during discharge.) When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a pump fluid end 22 design of this disclosure, the fluid inlet 38 is configured to introduce fluid into pump chamber 28 via a reciprocating element 18 that is hollow. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. With reference to the concentric fluid end body 8 embodiment of FIG. 1B, a front access port 30A can be located on a front S1 of the pump fluid end 22 opposite a back S2 of the pump fluid end 22, wherein the back S2 of the pump fluid end is proximal the pump power end 12, upon integration therewith via integration section 11. With reference to the T-bore fluid end body 8 embodiment of FIG. 1C, a front access port 30A can be located on a front S1 of the pump fluid end 22 opposite a back S2 of the pump fluid end 22, wherein the back S2 of the pump fluid end is proximal the pump power end 12, upon integration therewith via integration section 11, and a top access port 30B can be located on a top S3 of the pump fluid end 22 opposite a bottom S4 of pump fluid end 22. Locations described as front S1, back S2, top S3, and bottom S4 are further described with reference to the x-y-z coordinate system shown in FIG. 1A and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port. In embodiments, the at least one access port is located on a side of the discharge valve assembly 72 opposite the suction valve assembly 56. For example, in the concentric bore pump fluid end 22 embodiment of FIG. 1B, front access port 30A is located on a side (e.g., front side) of discharge valve assembly 72 opposite suction valve assembly 56. In the T-bore pump fluid end 22 embodiment of FIG. 1C, front access port 30A is located on top S3 of pump fluid end 22.

In embodiments, one or more seals 29 (e.g., "O-ring" seals, packing seals, or the like), also referred to herein as "primary" reciprocating element packing 29 may be arranged around the reciprocating element 18 to provide sealing between the outer walls of the reciprocating element 18 and the inner walls 26 defining at least a portion of the reciprocating element bore 24. In fluid end designs such as described herein operated with a hollow reciprocating element 18, a second set of seals (also referred to herein as "secondary" reciprocating element packing; not shown in the Figures) is conventionally arranged around the reciprocating element 18 to provide sealing between the outer walls of the reciprocating element 18 and the inner walls of a low-pressure cylinder that defines a low pressure fluid chamber (e.g., wherein the secondary packing is farther back along the x-axis and delineates a back end of a low pressure chamber that extends from the primary packing 29 to the secondary packing). According to this disclosure, only a primary reciprocating element packing is utilized, as fluid enters tail end 62 of reciprocating element 18 without first contacting an outer peripheral wall thereof (i.e., no secondary reciprocating element packing is needed/utilized, because no low-pressure chamber external to reciprocating element 18 is utilized). Skilled artisans will recognize that the seals of the primary packing may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1A (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24. In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("oversleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or oversleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages may be used to couple the reciprocating element 18 to the pump power end 12 (e.g., to a crank arm 20 or pushrod 30).

According to this disclosure, reciprocating element 18 employed in a concentric bore pump fluid end 22 embodiment (such as depicted in FIG. 1B) or a T-bore pump fluid end 22 (such as depicted in FIG. 1C) comprises a peripheral wall 84 defining a hollow body. In embodiments, a portion of the peripheral wall 84 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within reciprocating element bore 24 and at least partially within reciprocating element 18 in concentric bore pump fluid end 22 designs such as FIG. 1B or T-bore pump fluid end 22 designs such as FIG. 1C, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed proximal the front S1 of bore 24 (e.g., at least partially within discharge chamber 53 and/or pump chamber 28) of the pump fluid end 22, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, in concentric bore pump fluid end 22 configurations such as FIG. 1B, the discharge valve assembly 72 may be co-axially aligned with the suction valve assembly 56 (e.g., along central axis 17), and the suction valve assembly 56 and the discharge valve assembly 72 may be coaxially aligned with the reciprocating element 18 (e.g., along central axis 17). In alternative embodiments, such as the T-bore pump fluid end 22 embodiment of FIG. 1C, discharge valve assembly 72 can be positioned within T-bore 25, at least partially within discharge chamber 53 and/or pump chamber 28, and have a central axis coincident (e.g., coaxial) with central axis 27 of T-bore 25.

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The pump 10 may comprise and/or be coupled (as detailed further hereinbelow) to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q-10™ Quintuplex Pump or an HT-400™ Triplex Pump, produced by Halliburton Energy Services, Inc.

In embodiments, the pump fluid end 22 may comprise an external or stationary fluid manifold (e.g., a suction header), as described in more detail hereinbelow for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms 20, connecting rods, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIG. 1B and FIG. 1C) forward in its cylinder. A top dead center position corresponds to the position of a fully extended reciprocating element at zero velocity, e.g., just prior to a reciprocating element moving backward (i.e., in a direction indicated by arrow 116 in FIG. 1B and FIG. 1C) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

With reference back to FIG. 1D, according to this disclosure, and as described further hereinbelow, a pump 10 comprises: a pump fluid end 22 (e.g., a concentric bore pump fluid end 22 such as depicted in FIG. 1B or a cross-bore pump fluid end such as T-bore pump fluid end 22 of FIG. 1C) and a power end 12, operatively connected via an integration section 11. A pump 10 of this disclosure comprises an integration section 11, integrated between pump fluid end 22 and pump power end 12, as described further hereinbelow.

As described above, the pump power end 12 is coupled to a pump fluid end 22 having a reciprocating element bore 24, within which a reciprocatable reciprocating element 18 reciprocates due to the action of the power end 12, which is operatively connected to the reciprocating element 18 and operable to reciprocate the reciprocating element 18 in the reciprocating element bore 24 of the pump fluid end 22. The reciprocating element 18 has a front end 60 opposite a fluid intake or tail end 62 and comprises a peripheral wall 84 defining a hollow cylindrical body. In embodiments, fluid can be supplied to the flow through plunger by way of a fluid inlet conduit or manifold. In other embodiments, fluid can be supplied to the reciprocating element 18 by way of a fluid inlet conduit or manifold.

Figure 2:
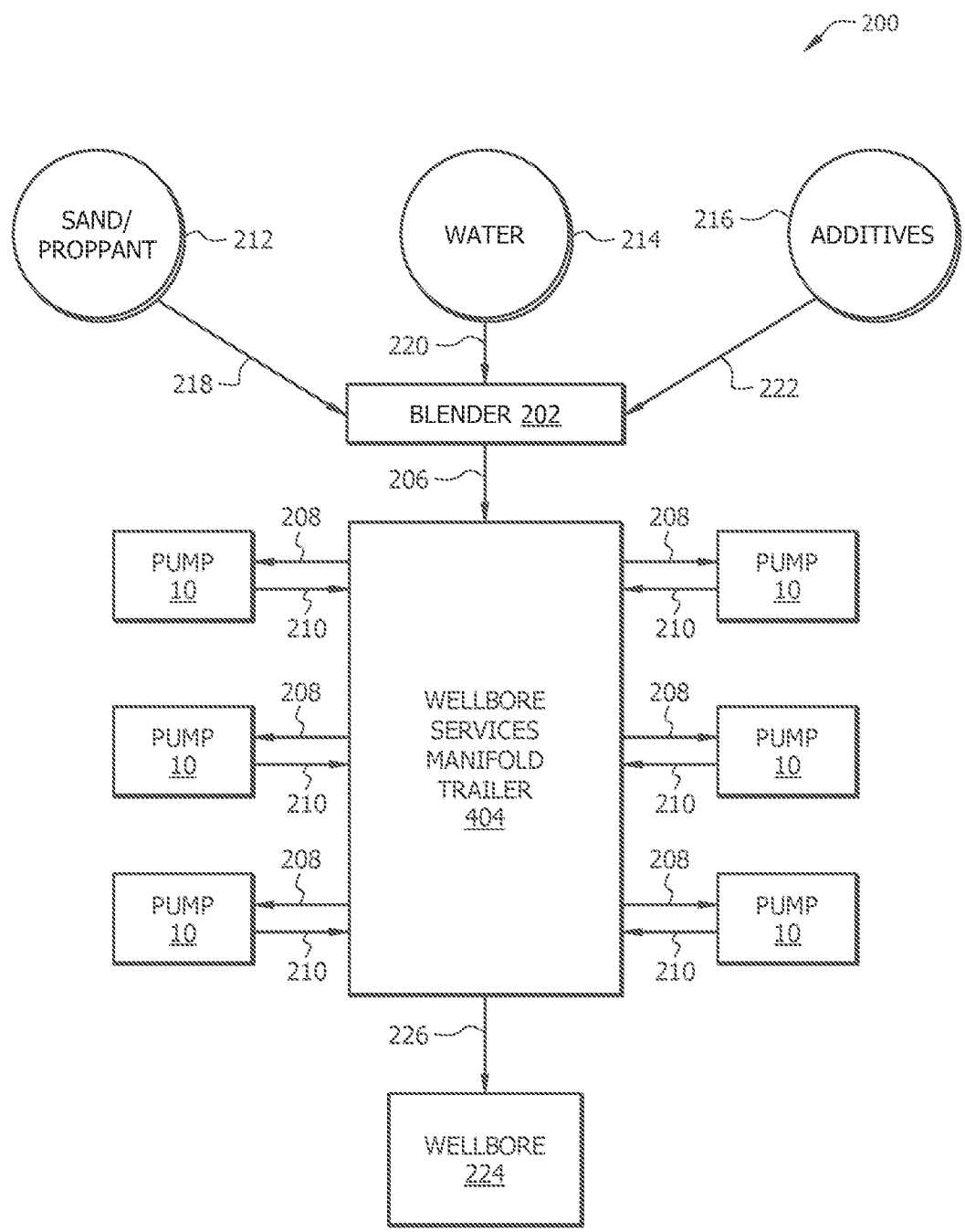
FIG. 2 is a block diagram is a block diagram illustrating a wellbore and wellbore servicing system according to an embodiment of the disclosure.

Turning now to FIG. 2, method of servicing a wellbore and a wellbore servicing system 200 comprising a pump of this disclosure (e.g., the pump 10) is described. FIG. 2 is a schematic representation of an embodiment of a wellbore servicing system 200, according to embodiments of this disclosure.

A method of servicing a wellbore 224 according to this disclosure comprises fluidly coupling the pump 10 of this disclosure to a source of a wellbore servicing fluid and to the wellbore, and communicating wellbore servicing fluid into the wellbore via the pump. The method can further comprise discontinuing the communicating of the wellbore servicing fluid into the wellbore via the pump, subjecting the pump to maintenance to provide a maintained pump, and communicating the or another wellbore servicing fluid into the wellbore via the maintained pump. Subjecting the pump to maintenance can comprise servicing the pump 10, as described hereinabove.

In embodiments, a method of servicing a wellbore 224 comprises: fluidly coupling a pump 10 to a source of a wellbore servicing fluid and to the wellbore 224; and communicating wellbore servicing fluid into the wellbore 224 via the pump 10, wherein the pump 10 comprises a pump fluid end 22 and a pump power end 12; wherein the pump power end 22 is operable to reciprocate a reciprocating element 18 within the reciprocating element bore 24 of the pump fluid end 22, wherein the pump fluid end 22 comprises: the reciprocating element 18 disposed at least partially within the reciprocating element bore 24 of the pump fluid end 22; a discharge valve assembly 72; and a suction valve assembly 56.

Embodiments of the wellbore servicing system 200 disclosed herein are usable for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids suitable for use as the wellbore servicing fluid, another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, diverter fluids, gelation fluids, polymeric fluids, aqueous fluids, oleaginous fluids, and any other fluid used in wellbore servicing.

In embodiments, the wellbore servicing system 200 comprises one or more pumps 10 operable to perform oilfield or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system 200 is illustrated, skilled artisans will readily appreciate that the pump 10 disclosed herein may be employed in any suitable operation.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle-laden fluids may then be introduced into a portion of a subterranean formation at a sufficient pressure and velocity to cut a casing or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck or trailer comprising one or more manifolds for receiving, organizing, or distributing wellbore servicing fluids during wellbore servicing operations. In this embodiment, the wellbore services manifold trailer 204 is coupled to six positive displacement pumps (e.g., such as pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 222, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants, or remnants of wellbore servicing fluids previously introduced into the wellbore during wellbore servicing operations.

The water 214 may further comprise local surface water contained in natural or manmade water features (such as ditches, ponds, rivers, lakes, oceans, etc.). Still further, the water 214 may comprise water stored in local or remote containers. The water 214 may be water that originated from near the wellbore or may be water that has been transported to an area near the wellbore from any distance. In some embodiments, the water 214 may comprise any combination of produced water, flowback water, local surface water, or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed or stored in a storage tank before entering a wellbore services manifold trailer 204.

In embodiments, the pump(s) 10 (e.g., pump(s) 10 or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid or the another wellbore servicing fluid) to a pressure of greater than or equal to about 10,000 psi, 20,000 psi, 30,000 psi, 20,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the wellhead 224 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally, or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle-laden fluid, as described herein), a perforating fluid, a cementitious fluid, a sealant, a remedial fluid, a drilling fluid (e.g., mud), a spacer fluid, a gravel pack fluid, a diverter fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally, or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor or the power source 80 of FIG. 1A and FIG. 1D. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus (e.g., power source 80) comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical four-stroke engine, arbitrarily beginning with the exhaust stroke, the plunger is fully extended during the exhaust stroke (that is, minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air-fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Certain terms, including (1) equivalent full load units (example units being cycles, barrels, etc.), referred to as EFLX; (2) equivalent full load cycles (EFLC); and (3) equivalent full load barrels (EFLB), are often used interchangeably by persons having ordinary skill in the art. In embodiments herein, EFLX is the generic normalized metric, EFLC is one form of EFLX based on normalized cycles to failure, and EFLB is a form of EFLC based on normalized barrels to failure. In some such embodiments, EFLB is obtained by multiplying EFLC by the volumetric displacement (e.g., barrels per cycle) of a pump.

Figure 3:
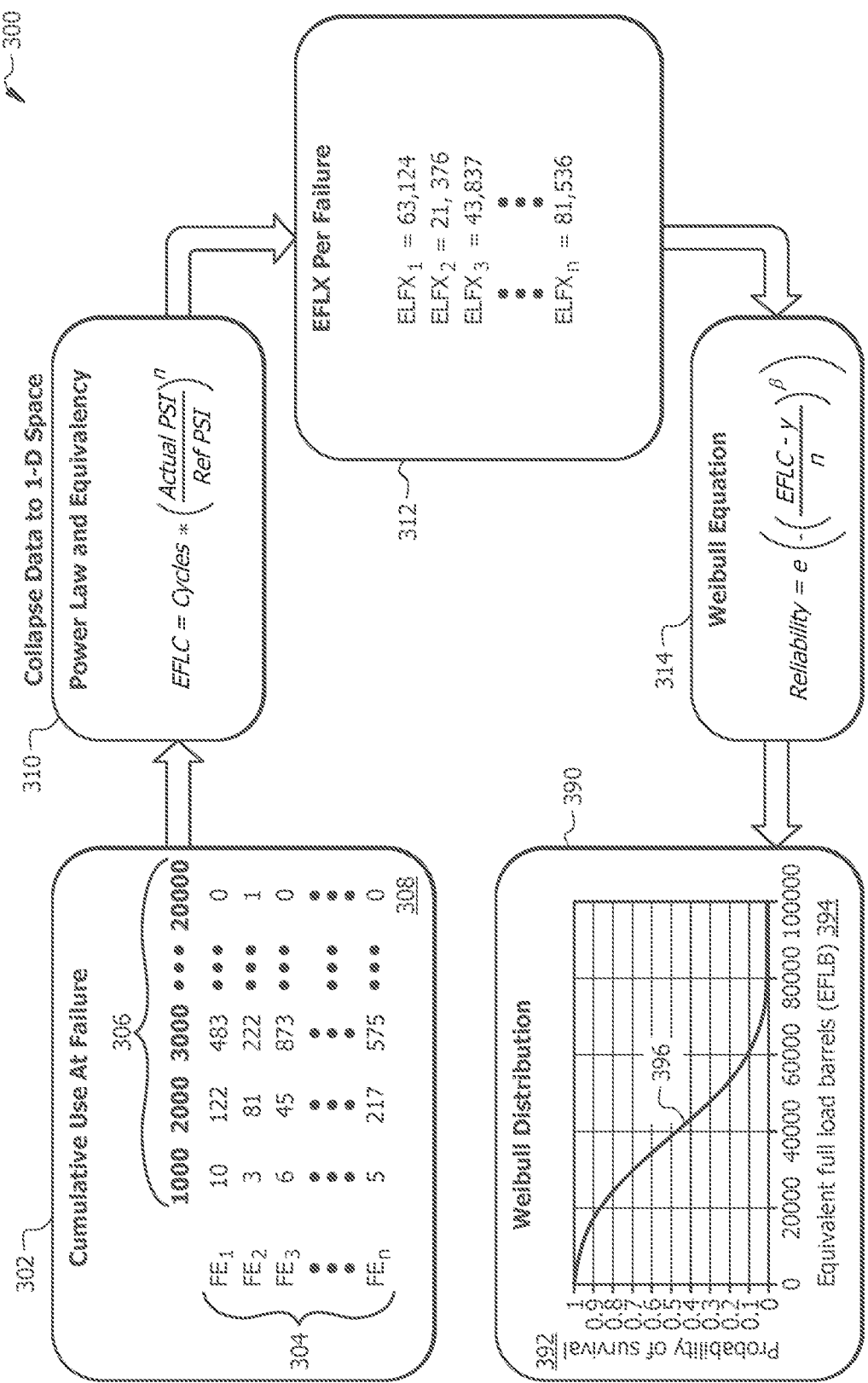
FIG. 3 is a flow diagram illustrating a process to derive a probability of survival curve for a component of a pump according to an embodiment of the disclosure.

Turning now to FIG. 3, a flow diagram 300 illustrating a process to derive a probability of survival curve for a component of a pump (also referred to as a "component survival probability curve 390"), according to an embodiment of the disclosure, is described. For each component of a pump, historical data on a cumulative use at failure of specific examples of the component ("historical data 302" herein). The non-limiting example of FIG. 3 illustrates the historical data 302 for a fluid end (FE), but the process described herein is applicable to any component of a pump whose overall lifespan is a function of cumulative damage as defined elsewhere herein (e.g., in the discussion of FIGS. 9-13, below) for which sufficient historical data 302 is available. In some embodiments, the historical data 302 is gathered from a control computer (referred to in some embodiments as a "unit controller") at a wellsite via an edge device on a wellbore pumping unit (e.g., the pump 10, also referred to as a "pumping unit" herein) deployed at a wellbore. Further, in some additional such embodiments, the unit controller and the edge device are integrated into the same apparatus (e.g., the unit controller is configured to act both as the unit controller and as the edge device).

In some such embodiments, the edge device is a general purpose computer or any other computer that is configured to read usage data from a unit controller attached to the pumping unit and transmit the usage data to a data store. In some embodiments, one or more sensors are communicatively coupled to the unit controller. In some embodiments, the data store is the secondary storage 2306 of FIG. 23, herein. In other embodiments, the data store is a network-based data store. In some such other embodiments, the data store is a cloud-based data store. In some embodiments discussed herein, the usage data is at least one of raw usage data (including but not limited to pressure, pump revolutions (e.g., revolutions per minute (RPM)) at the pressure, or the cumulative revolutions at different pressures (the "cumulative data"), or a combination thereof. In some such embodiments, the historical data 302 includes at least one of the raw usage data and the cumulative data. In some embodiments, the raw usage data is usable to generate the cumulative data, either in place of or in addition to the cumulative data transmitted by the edge device.

In some embodiments, the one or more sensors attached to the unit controller are configured to degrade or shut down the pumping unit to when a failure is detected. In some other embodiments, the usage data includes serial numbers or other unique numbers on each component of the pump. In some embodiments, the historical data 302 includes, for each component of the pump, cumulative usage from when the component was new to a failure, as captured from a first record associated with with a component serial number of each component until a last record associated with the component serial number of each component. The record(s) for a next failure start with a new serial number associated with a next component and end with the last record associated with with the new serial number.

The at least one sensor is configured to monitor whether any component of the plurality of components of the pumping unit has failed. In this context, failure comprises entering a state that either degrades or completely terminates the operation of the pumping unit until a remediation operation is completed. In some such embodiments, the remediation operation comprises repair or replacement of the component. In some embodiments, the at least one sensor directly monitors the component. In other embodiments, the at least one sensor is communicatively coupled to a control computer (or "unit controller") communicatively coupled to and configured to control the operations of the pumping unit and detect a failure of any component of the pumping unit. In such embodiments, upon detecting a failure of any component, the unit controller notifies the edge device of the failure, and the failure is added to the historical data for the component.

In some embodiments, the edge device, when attached to the pump, captures specific operational data. In such embodiments, operational data includes but is not limited to: a revolutions-per-minute of the engine, the transmission and the pump; a treating pressure and flowrate; a engine control module (ECM) data associated with the engine, which includes various engine health and engine control metrics; a proppant concentration; an output from a pump health monitor; and temperatures and pressures of at least one transmission and at least one pump. In some such embodiments, the pump health monitor is a version of IntelliSCAN by SCANLAB.

For each failed component 304 (e.g., $FE_1$ through $FE_n$ in the historical data), the number of revolutions the pump turned (or "cycles") within each 1000 pounds per square inch ("psi" herein) pressure bucket 306 in the pressure range from 1000 psi to 20,000 psi, prior to the failure of the component, is recorded. For example, in the collection of fluid end historical data 302 illustrated in FIG. 3, fluid end $FE_1$ made ten revolutions at the 1000 PSI pressure bucket, one-hundred-and-twenty-two revolutions at the 2000 psi pressure bucket, and four-hundred-and-eighty-three revolutions at the 3000 psi pressure bucket before fluid end $FE_1$ failed and rendered the pump inoperative. Also recorded are the revolutions at each 1000 psi increment up to and including at 20000 psi, and also the average pressure within each 1000 psi bucket (for example, the average pressure experienced by $FE_1$ when operating in the 1000 psi bucket). As discussed further herein, this average pressure is used a number of probability of survival-related calculations.

In embodiments herein, each psi bucket captures a number of revolutions a pump turns at each 1000 psi increment. For example, the number of pump revolutions that occur between 0 psi to 1000 psi are captured in a first bucket and the revolutions greater than 1000 psi to 2000 psi are captured in a second bucket, and so forth. A weighted average pressure is calculable for each 1000 psi bucket. In some embodiments, historical data 302 includes a total of twenty buckets from 1000 psi to 20000 psi.

When working with the raw form of the historical data 302 as described above, a complication is readily apparent: each failed component in the historical data 302 cannot be assumed to have failed due to the same, single failure condition. Further, each failed component in the historical data 302 cannot even be assumed to have failed due to a single failure condition at all—in some cases, components in the historical data 302 failed due to multiple conditions interacting. Thus, with regard to failures, the raw form of the historical data 302 is multi-variate (or "multi-dimensional") and prohibitively complex to use in deriving a probability of survival curve for the component that is usable to predict future failures of the same type of component used in future wellbore servicing operations.

Instead, in order to derive such probability of survival curves for each component, power law non-linear life models of components with load metrics based on treating pressures and number of cycles at each load, incorporating an equivalency conversion using, e.g., Miner's Rule, are utilized to arrive at a single equivalent full load cycle (EFLC) equation 310 usable to determine a single equivalent stress variable 312 that tracks and compares cumulative damage across multiple failed examples of the same type of component. This single equivalent stress variable 312 is one-dimensional, and in embodiments herein is referred to as the EFLX per failure (or simply "EFLX"). Thus, in FIG. 3, the single equivalent stress variable 312 is shown as EFLX for component 1 through EFLX through component n, for components 1-n which are all of the same type of component. Notably, n is the total number of components consumed in a time range (consumption of a single component being use of the component from installation to failure), so in some embodiments the value of n for a component is larger than the number of pieces of equipment (e.g., pumps) currently in service that use that component. Additional information on how the single equivalent stress variable 312 is derived is provided elsewhere herein (e.g., in the discussion of FIGS. 9-13). However, specific details of the foregoing are included below to better illustrate the process flow 300.

A power law model is a standard model for cumulative damage caused by fatigue, erosion, corrosion or any combination thereof. The main difference between the various power law model implementations is the value of the exponent (see below), the actual psi (actual load) and the reference psi (reference load). As used herein, a power law model converts the total usage exposure over a failure from a two-dimensional space (that is, cycles at different pressures) to one-dimensional space (equivalent cycles at a single reference pressure). This enables deriving a statistical distribution of probability of survival from the historical data 302 (e.g., a Weibull distribution), as such statistical distributions operate in a one-dimensional space.

In some embodiments, a set of equations assists in demonstrating the relationship between the EFLC and EFLX. Those equations are provided below for reference. Further discussion of the usage of these equations are provided below and at least as part of the discussion of FIGS. 9-13.

Equation 1: Equivalent Full Load Cycles
$$EFLC = \text{Cycles} * \left(\frac{\text{Pressure}}{\text{Pressure}_{FullLoad}}\right)^n$$

Equation 2: Equivalent Reference Load Cycles.
$$ERLC = \text{Cycles} * \left(\frac{\text{Pressure}}{\text{Pressure}_{ReferenceLoad}}\right)^n$$

Equation 3: Equivalent Full Load Cycles in Terms of the Reference Load
$$EFLC = ERLC * \left(\frac{\text{Pressure}_{ReferenceLoad}}{\text{Pressure}_{FullLoad}}\right)^n$$

Equation 4: Equivalent Reference Load Cycles in terms of a Constant
$$ERLC = \text{Cycles} * \left(\frac{\text{Pressure}}{\text{Constant}}\right)^n$$

Equation 5: Relationship Between Equivalent Load Cycles and Barrels per Cycle
$$ERLC * \left(\frac{\text{Barrels}}{\text{Cycles}}\right) = \text{Cycles} * \left(\frac{\text{Barrels}}{\text{Cycles}}\right) * \left(\frac{\text{Pressure}}{\text{Constant}}\right)^n$$

Equation 6: Equivalent Full Load Reference Barrels
$$ERLB = \text{Volume} * \left(\frac{\text{Pressure}}{\text{Constant}}\right)^n$$

Equation 7: Hydraulic Horsepower Hours
$$HHP \text{ Hours} = \frac{\text{Flowrate} * \text{Pressure}}{40.8} * \text{Time}$$

Hydraulic Horsepower (Restated)   Equation 8

$$HHP\ Hours = (Flowrate * Time) * \left(\frac{Pressure}{40.8}\right)$$

Hydraulic Horsepower Hours Stated   Equation 9 in Terms of Power Law and Equivalency $$HHP\ Hours = Volume * \left(\frac{Pressure}{Constant}\right)^1$$

In some embodiments, for some components of a pump (e.g., a fluid end), the pressure (actual psi) is the average pressure in each 1000 psi bucket and the reference pressure is the maximum pressure rating for the component, but any pressure can be used as the reference pressure without affecting the results when using the above equations.

In some embodiments, for pump power ends, the pressure and kinematic equations of motion describing the internal operation of the pump are used to calculate the peak torque for each revolution of the pump. The reference torque is the torque at the maximum pressure rating of the pump. This same torque is on the output shaft of the pump speed reducer, so the same reference torque is used for the speed reducer. The actual torque and reference torque for the transmission are the pump power end torques divided by the pump speed reducer gear ratio. Equation (9) above shows that HHP hours consumed by the engine is the same base equation as the power law equation converted to equivalent reference load barrels in equation (6). For HHP hours, the power law equation has an exponent of 1, and the reference constant is the unit conversion constant (40.8) for HHP.

The above set of equations enables using a power law equation to adjust for equivalency for any component of a pump. In embodiments, any reference value is usable because the provided equations are ready inverted to calculate the equivalency at any other actual condition of pressure or torque or other pertinent usage intensity metric as shown in equations (1) through (3). As noted, equation (9) defines the equation used for engines.

In light of the foregoing, the power law and equivalency-based single equivalent full load cycle (EFLC) equation at 310 is thus usable to convert the cycles of exposure at each 1000 psi bucket for each failure of a component in the historical data 302 to the equivalent number of cycles at the reference pressure that would have done the same damage as the cycles at the average pressure in each bucket. Thus, according to the historical data 302, the sum of the EFLC's for each bucket for each failure of a component is the total EFLC that component survived prior to failure. An optimization routine is used to adjust the exponent in the equation to minimize the variation of total EFLCs across each failure. In embodiments, the optimization routine is included in a software package that performs the analysis of the historical data described herein to create the probability of survival curve 390. In some such embodiments, the optimization routine is at least one of a generalized reduced gradient (GRG) method, or based on using at least one genetic algorithm.

The single equivalent stress variable 312, as described herein and shown on FIG. 3 is thus the total EFLX for each failure. In embodiments herein, the EFLX is usable as a generic term for each failure of the same type of component, as in some embodiments the computation of the life metric varies slightly for each component. This variation is explained further above herein and also in the discussion of FIGS. 9-13, below.

In hypothetical ideal embodiments, each EFLX for each component failure in a selection of failures of the same type of component would be the same. However, in implementations of the disclosure each failed component of the same type of component tends to have variations in chemical content, machining, mechanical properties, history of abuse and many other variables, which contribute to varying EFLX values per each failed component in the historical data 302. In embodiments, the optimization routine thus finds the exponent that minimizes the variation in the calculated EFLXs.

After the single equivalent stress variable 312 in the form of the EFLX per failure is calculated, the calculated EFLX are used as input to a distribution creation equation 314 to create the probability of survival curve 390. In some embodiments, the distribution creation equation is a Weibull equation as shown in FIG. 3, resulting in the probability of survival curve 390 being a Weibull distribution. In such embodiments, the Weibull distribution results from fitting the Weibull equation to the data. This is in contrast to other distribution methods which force fit data to a preconceived distribution.

In embodiments, the Weibull distribution for each failed component in the historical data 302 yields a distribution of the probability of a component surviving to a normalized usage metric such at EFLB. That is, in such embodiments, based at least in part on the historical data 302 as embodied in the single equivalent stress variable 312 (the EFLX per failure) the probability of survival curve 390 plots a probability 392 that the component will survive from new to a life consumption in the form of EFLB 394.

For example, for the exemplary fluid ends shown only for illustrative purposes in FIG. 3, the probability of survival curve 390 indicates at a line 396 that a fluid end has a ten percent probability of pumping 60,000 EFLB without a failure. Restated, such a fluid end has a ninety percent probability of not pumping 60,000 EFLB before failure.

Figure 4:
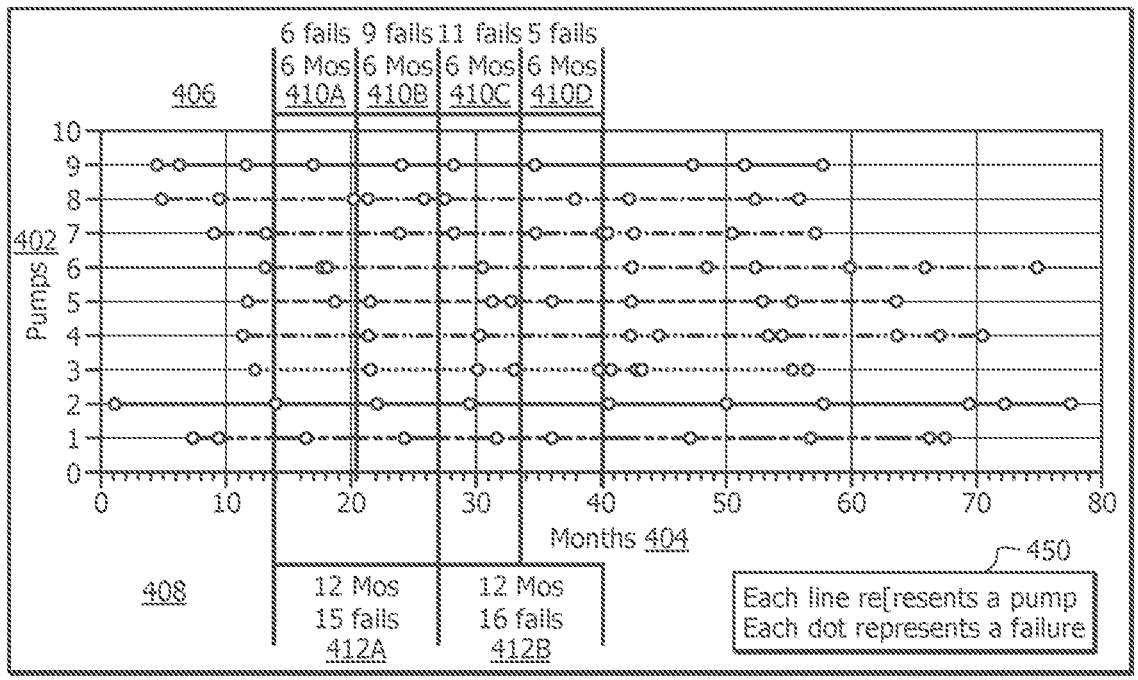
FIG. 4 is an exemplary data plot illustrating historical data of failures of a particular pump component when the failures are tracked over time without being normalized by an equivalent usage metric (EFLX) according to an embodiment of the disclosure.
Figure 5:
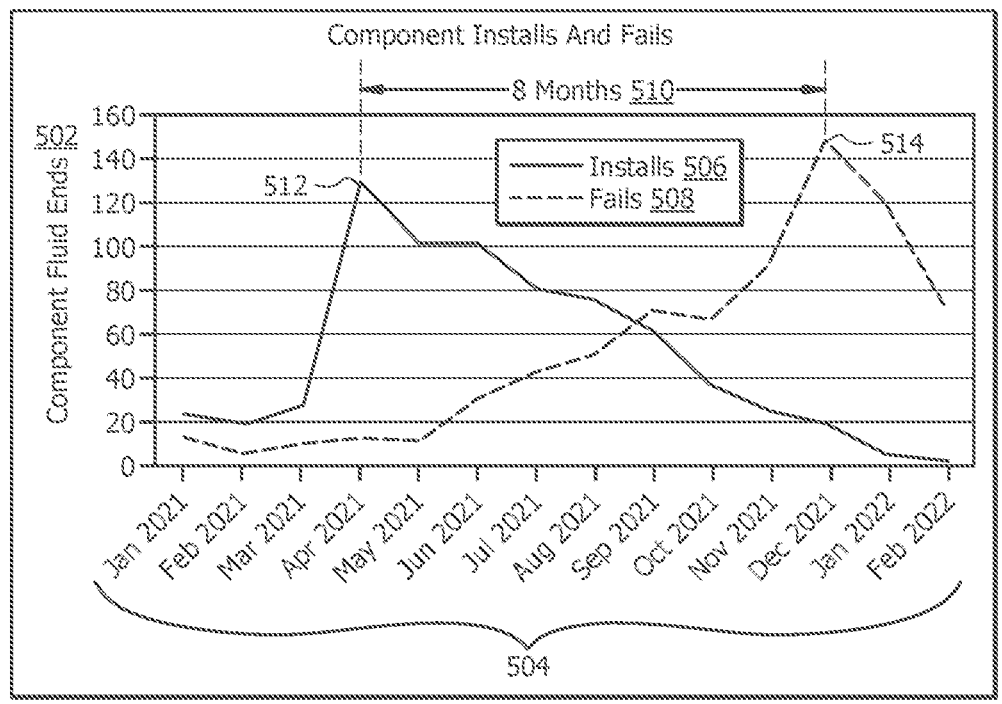
FIG. 5 is an exemplary data plot illustrating historical data of installations and failures of a particular pump component when the failures are tracked over time without being normalized by an equivalent usage metric (EFLX) according to an embodiment of the disclosure.

FIGS. 4 and 5 are discussed below. Both FIG. 4 and FIG. 5 depict the failure of a component of a pump merely as a function of the time in current service of a component (e.g., the time since the component was installed into the pump in which the component failed). As is demonstrated in the following paragraphs, this limited methodology of attempting to predict the remaining lifetime of a component is fundamentally unreliable, as the entire amount of the service lifetime of the component that has already been consumed by prior use before the current service is not accounted for. While FIGS. 4 and 5 demonstrate the need to account for prior life consumed, they employ methodologies that fail to do so in a consistent, systematic way, unlike the systems and methods disclosed herein.

Turning now to FIG. 4, an exemplary data plot 400 illustrating historical data of failures of a particular pump component (e.g., a fluid end, etc.) when the failures are tracked over time without being normalized by an equivalent usage metric (EFLX), according to an embodiment of the disclosure, is described. Each pump 402 experiences a component failure 450 after a certain number of months 404, before being put back into service after remedial action until the next component failure 450. A first data slice set 406 including data slices 410A, 410B, 410C, and 410D counts the total number of component failures 450 across all the pumps 402 in six month increments. A second data slice set 408 including data slices 412A and 412B counts the total number of component failures 450 across all the pumps 402 in twelve month increments.

In this example, the number of component failures 450 across the pumps 402 was measured and plotted as both the first data slice set 406 and the second data slice set 408. The number of component failures 450 in each of the data slices 410A, 410B, 410C, and 410D varied from five to eleven. During this time frame the components operated under the same average pressures, rates and time. When the analyzing the same data using the twelve month-based data slice set 408, the number of component failures 450 in each of the data slices 412A and 412B varied from fifteen to sixteen, for an average of seven-point-five to eight component failures 450 per every six months.

The large variation in the first data slice set 406 arises in part from the mean life of the component at the current rate of EFLX consumption being approximately eight months. As a result, less than half of the failure distribution is covered in a six month slice. However, when a twelve month data slice (e.g., 412A or 412B) is measured, effectively an entire year of component failures 450 are measured. Thus, the second data slice set 408 enables covering the entire width of the failure distribution.

As an additional example, a second component (e.g., an engine) with a mean life of six years (based on an average HHP hours consumed per year), when plotted onto a life distribution such as that shown in FIG. 3 above, with some specimens surviving for twelve years, demonstrates even more variability in the measured failures. Thus, as shown by this example, using only HHP hours to attempt to forecast component failure to an accuracy of one month is unviable.

Turning now to FIG. 5, an exemplary data plot 500 illustrating historical data of installations 506 and failures 508 of a particular pump component 502 when the failures are tracked over time (e.g., per month 504) without being normalized by an equivalent usage metric (EFLX), according to an embodiment of the disclosure, is described. As shown by the exemplary data of FIG. 5, installations 506 peaked in April 2021, failures 508 peaked in December 2021, and judging merely by the data presented in the data plot 500, the mean life 510 of the component 502 was eight months.

However, this apparently straight-forward reading of the limited information provided in the data plot 500 is misleading. Component 502 failures in one time period (e.g., that shown in the data plot 500) are not alone indicative or predictive of prospective failures of the component 502 in another, future time period. If the prior usage of the component 502 is not accounted for, as is the case in the data plot 500, the apparent sudden increase in the failures 508 is entirely misleading, as the data plot 500 cannot account for the change in the number of deployed pumps using the component 502 during that time. The difference in the peak installations 512 and peak failures 514 is approximately equal to the average life of the component 502 in calendar time at a fixed usage per time period. Successive peaks in failures will occur with each peak being smaller than the first due to the distribution of failures such as shown in FIG. 3 herein (e.g., the component survival probability curve 390). In the example of the data plot 500, no additional components 502 are added and the usage stays the same, the peaks will eventually disappear. However, increasing the components 502 deployed or increasing the usage of the deployed components 502 will cause another decaying peak to emerge in the data plot 500. In light of the foregoing, and in particular this sensitivity to the number of deployed components and usage rates, component 502 failures 508 in a time period, taken alone, are not usable to predict an amount of failures of the component 502 in another, future, time period, even under similar conditions.

In light of the foregoing shortcomings, the systems and methods disclosed herein incorporate conditional reliability-based modeling to predict the probability of whether a component with a certain amount of prior life consumed will survive a planned future usage. Stated in the inverse, conditional reliability-based modeling predicts the probability of whether a component with a certain amount of prior life consumed will fail in the midst a planned future usage, and allows users of the component (and the pump in which that component is installed) to allocate resources accordingly in order to have sufficient spare components available to complete the planned future usage.

Figure 6A:
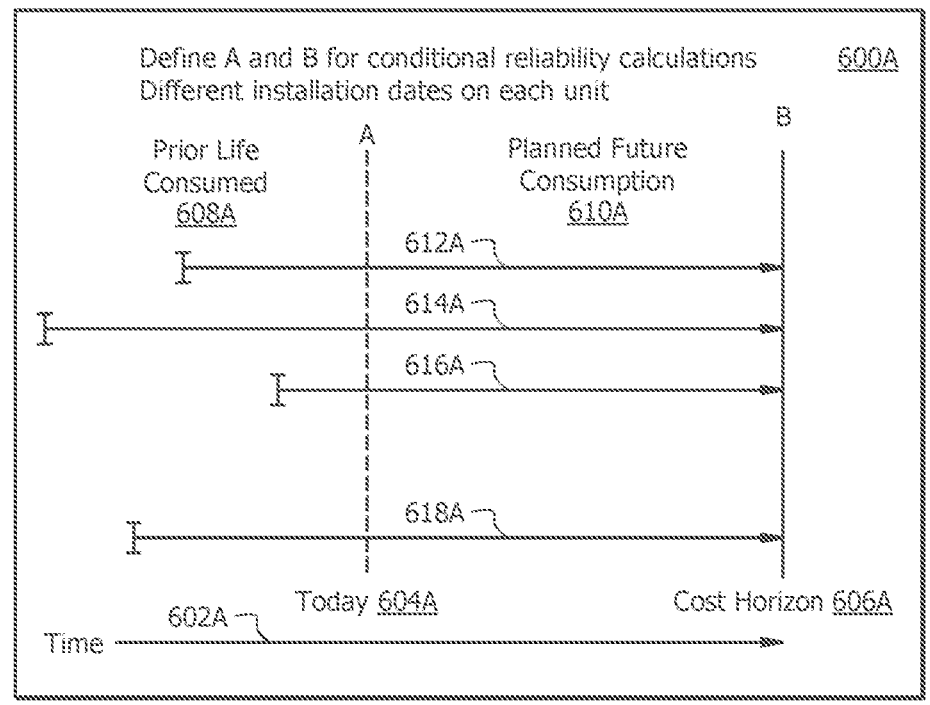
FIG. 6A is an exemplary timeline illustrating conditional reliability calculations for a component of a plurality of components of a pump wherein each component has a different installation date and amount of prior usage, and failures of each component are tracked over time and normalized by an equivalent usage metric (EFLX), according to an embodiment of the disclosure.

Turning now to FIG. 6A, an exemplary timeline 600A illustrating conditional reliability calculations for a component of a plurality of components of a pump wherein each component has a different installation date and amount of prior usage, and failures of each component are tracked over time and normalized by an equivalent usage metric (EFLX), according to an embodiment of the disclosure, is described. For exemplary purposes only, a first component 612A, a second component 614A, a third component 616A, and a fourth component 618A are shown on a time plot 602A. A current date 604A (also referred to as "today 604A") is plotted on the timeline 602A, along with a cost horizon 606A. The cost horizon 606A comprises a cutoff time in the future—the maximum time in the future when the conditional reliability model is configured to predict the reliability of the component. Also indicated on the timeline 600A is a prior life consumed 608A (or "A") of each of the first component 612A, the second component 614A, the third component 616A, and the fourth component 618A. A prior life consumed 608A comprises a confirmed used up amount of the total lifetime of the component. Finally, a planned future consumption 610A between the current date 604A and the cost horizon 606A is the amount of usage that the component is planned to be subject to under known conditions (e.g., pressure, temperature, pump revolutions, etc.) between the current date 604A and the cost horizon 606A.

Given that components fail at different times according to, e.g., the component survival probability curve 390 of FIG. 3, the install date, and thus the prior life consumed 608A, of each of the first component 612A, the second component 614A, the third component 616A, and the fourth component 618A varies as shown on the time plot 602A. In accordance with the discussion of FIG. 3 and other portions of the disclosure herein, the prior life consumed 608A is the amount of EFLX consumed from the date of install of each of the first component 612A, the second component 614A, the third component 616A, and the fourth component 618A to the current date 604A.

Figure 6B:
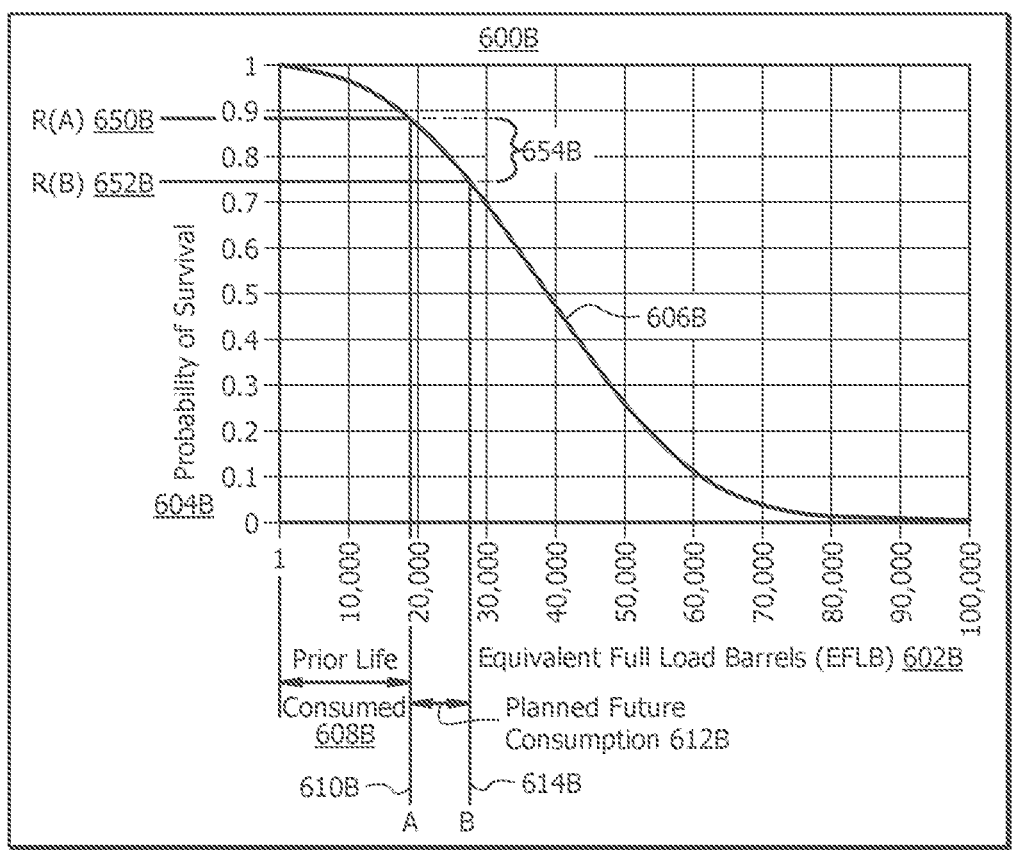
FIG. 6B is an exemplary data plot of a reliability curve for a component of a plurality of components of a pump wherein each component has a different installation date and amount of prior usage, and failures of each component are tracked over time and normalized by an equivalent usage metric (EFLX), according to an embodiment of the disclosure.

Turning now to FIG. 6B, an exemplary data plot 600B of a reliability curve 606B of a component of a plurality of components of a pump, wherein each component has a different installation date and amount of prior usage, and failures of each component are tracked over time and normalized by an equivalent usage metric (EFLX), according to an embodiment of the disclosure, is described. In some embodiments, conditional reliability is calculated from the reliability curve 606B. The reliability curve 606B plots the probability of survival 604B of a component against an EFLB measurement 602B. Here, the EFLB measurement 602B is the EFLX as described elsewhere herein, and accounts for both a prior life consumed 608B from installation to a current date (or "A") 610B of a component and also the amount of planned future consumption 612B at a future time "B" 614B ("B" 614B minus "A" 610B). That is, "B" 614B is the sum of "A" 610B and the amount of planned future consumption 612B, and thus the difference between "B" 614B and "A" 610B is the amount of life that will be consumed after the current date "A" 610B up until the planned future consumption 612B. The prior life consumed 608B added to the planned future consumption 612B equals the total life consumed at the desired cost horizon.

Based on the foregoing, equations and datapoints below, based at least in part on the reliability curve 606B and the discussion of the component survival probability curve 390 and the rest of FIG. 3 herein, model how to determine the probability the component will fail based on the prior life consumed 608B up to the current date 610B and the amount of planned future consumption 612B.

In embodiments herein, a function R(x) is a reliability function. As a non-limiting example, the function R(x) is the reliability distribution creation equation 808, which is in some embodiments, the distribution creation equation 314. In some such embodiments, the function R(x) is a Weibull equation using variables determined by Weibull distribution calculation software.

Point 650B is R(A): the probability of survival of the component from installation (zero EFLB consumed) to the EFLB consumed at the current date 610B. In some embodiments, the value of R(A) assumes the component has never previously been refurbished, reconditioned, etc.

Point 652B is R(B): the probability of survival of the component from installation (zero EFLB consumed) to the EFLB consumed at the future time "B" 614B.

Thus, dividing R(B)/R(A) provides the conditional probability of survival of the component measured in EFLB from the current date 610B to the completion of the planned future usage at "B" 614B.

Thus, a conditional probability of failure (F) 654B (or the "conditional reliability") of a component from the EFLX at the current date 610B (zero EFLB consumed) to the EFLB projected to be consumed at the planned future usage "B" 614B, where F being equal to one is a one-hundred percent probability of failure, is expressed as:

$$F = 1 - \left[\frac{R(B)}{R(A)}\right]$$

In some embodiments, the conditional probability of failure 654B comprises a range of probabilities, as indicated by the conditional probability of failure 654B being a portion of the probability curve 606B and not a single point.

Figures 7A, 7B:
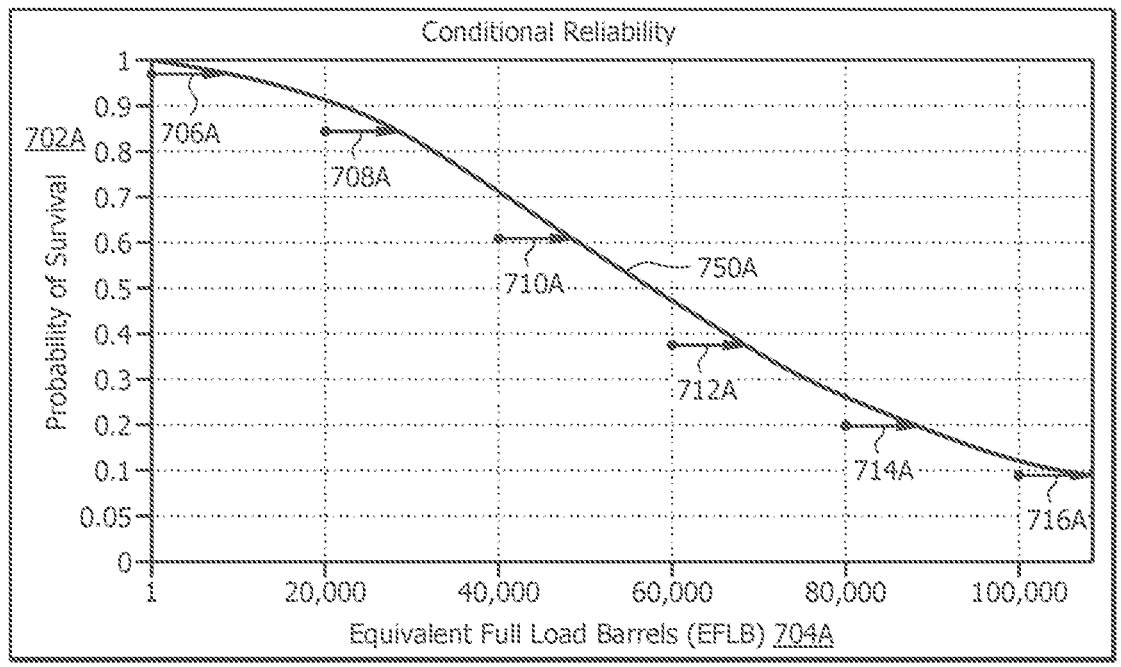
FIG. 7A is an alternative exemplary data plot of a conditional reliability curve for a component of a plurality of components of a pump wherein each component has a different installation date and amount of prior usage, and failures of each component are tracked over time and normalized by an equivalent usage metric (EFLX), according to an embodiment of the disclosure.
FIG. 7B is a table illustrating exemplary predictions of a probability failure in terms of EFLB of a component of a plurality of components of a pump based on conditional reliability curve of FIG. 7A, according to an embodiment of the disclosure.

Turning now to FIG. 7A, an alternative exemplary data plot 700A of a conditional probability of survival for a component of a plurality of components of a pump wherein each component has a common installation date, a different current date (that is, a different prior life consumed), the same planned future consumption, and failures of each component are tracked over time and normalized by an equivalent usage metric (EFLX), according to an embodiment of the disclosure, is described. In the context of FIGS. 6A and 6B above, the data plot 700A further demonstrates why the prior life consumption of a component must be considered when determining a probability of failure (or, restated, why the prior life consumption of the component is the condition on which determining a probability of failure of the component depends. The data plot 700A plots a probability of survival 702A against an EFLX 704A, as represented by a reliability curve 750A in accordance with the descriptions of FIGS. 6A and 6B herein. In the example of the data plot 700A, the EFLX is in the form of equivalent full load barrels. In particular, the data plot 700A depicts the reliability curve 750A in increments of 20,000 EFLB prior life consumed from zero EFLB (a component with no prior life consumed) to a maximum prior life consumed of 100,000 EFLB. Indicators 706A, 708A, 710A, 712A, 714A, and 716A indicate a constant EFLB delta from an initial prior consumed life value of an example component, as discussed further in relation to FIG. 7B, below.

Turning now to FIG. 7B, a table 700B illustrating exemplary predictions of a probability of failure 704B in terms of EFLB 702B of a component of a plurality of components of a pump based on the reliability curve 750A of FIG. 7A, according to an embodiment of the disclosure, is described. Each row of the table 700B represents a different exemplary component, which each row corresponding to indicators 706A, 708A, 710A, 712A, 714A, and 716A in FIG. 7A. Each exemplary component has a prior consumed life 706B (denoted by the dot at the tail end of each indicator arrow), an EFLB delta per month 708B (that is, the planned future consumption), and a projected EFLB 710B at a planned future usage checkpoint (here, the sum of the prior consumed life 706B, and the EFLB delta per month 708B denoted by the tip end of the arrowhead of each indicator arrow). That is, the table 700B illustrates whether each exemplary component is predicted to fail while being used in pursuit of the planned future usage checkpoint, and assigns a probability of failure 704B using the conditional probability of failure 654B formula discussed herein.

Notably, the start of each of the indicators 706A, 708A, 710A, 712A, 714A, and 716A (the end of each of the indicators 706A, 708A, 710A, 712A, 714A, and 716A opposite the arrowhead) corresponds to the associated prior consumed life 706B. Further, arrowhead of each of the indicators 706A, 708A, 710A, 712A, 714A, and 716A corresponds to the associated projected EFLB 710B as shown in FIG. 7B.

Figure 8:
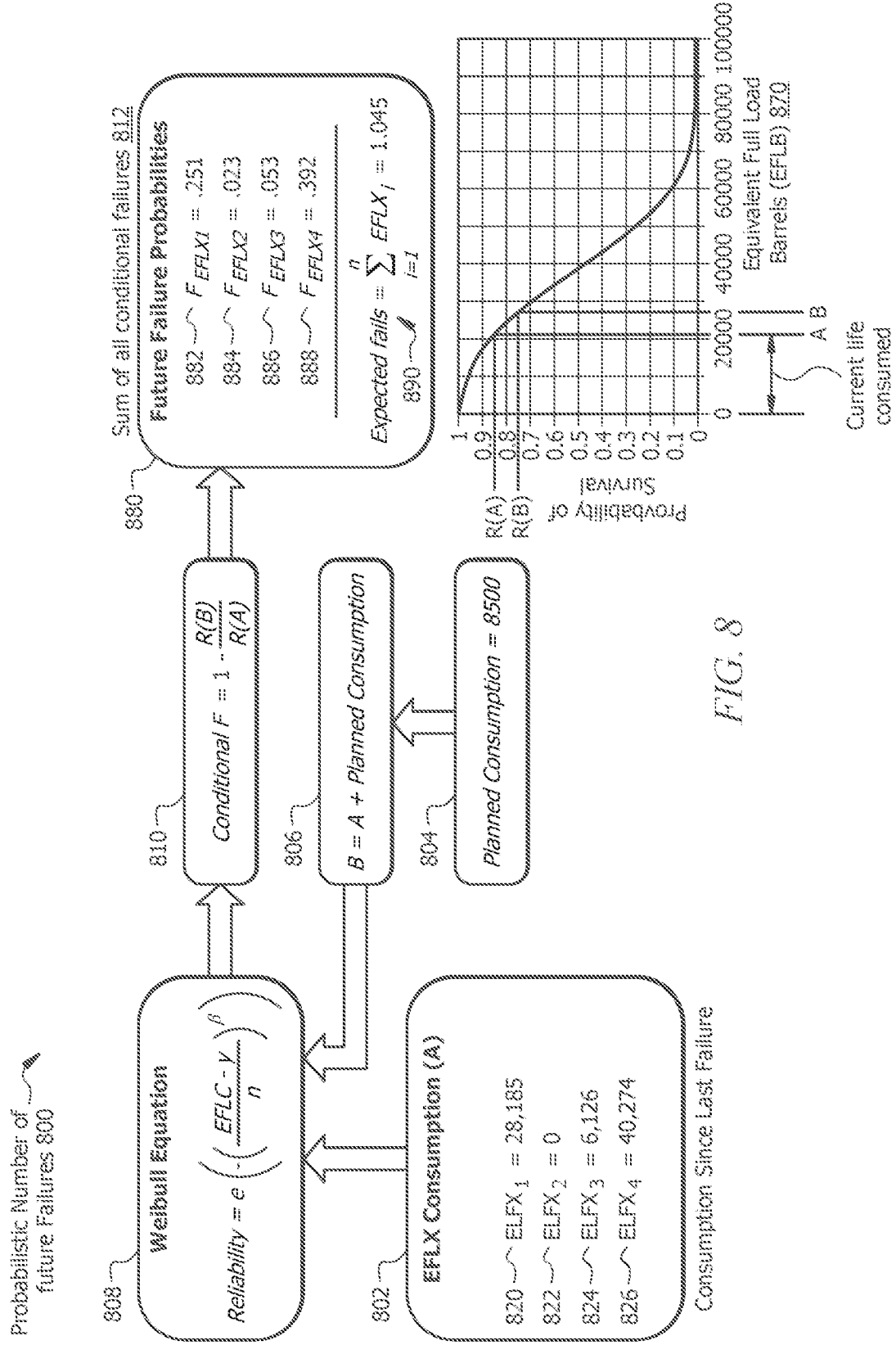
FIG. 8 is a process flow illustrating a method to model the probabilistic number of future failures of a component of a plurality of components of a pump wherein each component has a different installation date and amount of prior usage, and failures of each component are tracked over time and normalized by an equivalent usage metric (EFLX), according to an embodiment of the disclosure.

Turning now to FIG. 8, a flow diagram 800 illustrating a method to model the probabilistic number of future failures of a component of a plurality of components of a pump wherein each component has a different installation date and amount of prior usage, and failures of each component are tracked over time and normalized by an equivalent usage metric (EFLX), according to an embodiment of the disclosure, is described.

As previously discussed herein, modelling a probabilistic number of future failures of a component of a plurality of components of a pump based on prior life consumed, wherein each component has a different installation date and amount of prior usage, and failures of each component are tracked over time, necessitates collapsing historical data on prior usage and failures of each component, wherein multiple variables may have contributed to the failure of a pump, to a one-dimensional (single-variable) space using a combination of the power law and equivalency, as previously disclosed by Applicant and incorporated herein by reference.

That is, in order to model a probabilistic number of future failures of a component of a pump, the variable(s) impacting the failure of that component of the pump in the available historical data, which in some embodiments vary from component to component, are first collapsed or reduced to a one-dimensional model indicating the probability of failure of all components of the plurality of components. In embodiments herein, this single variable is the EFLX, representing normalized past consumption of a examples of the component from installation to failure as recorded in the historical data. For each component, the EFLX of each specific example in the historical data is used to create a conditional reliability or probability of survival curve for that component, as discussed elsewhere herein. The method of combining the power law and equivalency calculations of Miner's Rule to determine the EFLX for each component is the same for each component. However, for each component in the plurality of components, a distinct conversion model is used to determine the EFLX based on the available types of data about the component.

FIG. 8 incorporates elements of FIG. 3 and FIG. 6B already discussed in detail herein. An exemplary reliability curve (e.g., the reliability curve 606B) is provided for visual reference to accompany the following discussion of the flow diagram 800. EFLX consumption 802 is the prior life consumed of all available components of the same type of component (e.g., the single equivalent stress variable 312 of FIG. 3). In embodiments herein, the EFLX consumption for each component is the consumption since the last failure of that component. For each component, EFLX 802 is combined with the planned consumption 804 (e.g., 8500 EFLX) to determine the projected consumption 806 at the end of a single future usage period.

The EFLX 802 and projected consumption 806 are used as input to a reliability distribution creation equation 808 (e.g., the distribution creation equation 314). The reliability distribution creation equation 808 generates a conditional reliability function (or conditional probability of failure function) F 810 (e.g., the conditional probability of failure (F) 654B), which is usable to determine the conditional reliability of each component according to the reliability distribution.

The conditional reliability of failure function 810 determines for each component, given the prior life consumed of each component in EFLX and the planned consumption in EFLX for the usage period under examination, a future failure probability 880.

Example components 820, 822, 824, and 826 have associated future failure probabilities 882, 884, 886, and 888, respectively. To project how many of the example components 820, 822, 824, and 826 are expected to fail during the usage period, the associated future failure probabilities 882, 884, 886, and 888 are summed to determine a probabilistic forecast of expected failures 890 (the "probabilistic forecast 890").

The probabilistic forecast 890 is not a measure of probability. Each failure of the example components 820, 822, 824, and 826 occurs independently, thus each of the associated future failure probabilities 882, 884, 886, and 888 is also independent. Therefore, the integer value of the probabilistic forecast 890 indicates how many of the example components 820, 822, 824, and 826 each having an associated EFLX 802 are projected to fail during the usage period. This summation is valid because each component has an independent future failure probability: each of example components 820, 822, 824, and 826 have a specific conditional probability of failure independent from the other. Thus, in some embodiments, the probabilistic forecast 890 enables the user to allocate sufficient resources to ensure that sufficient components are available during the usage period to accomplish the planned consumption.

In some embodiments, the value to the right of the decimal point in the probabilistic forecast 890 is usable to calculate resource costs associated with component failures. In other embodiments, when the value to the right of the decimal point in the probabilistic forecast 890 is above 0.5, then the value to the left of the decimal point is rounded up (that is, an additional failure is forecasted).

FIGS. 9-14, discussed immediately below, provide non-limiting, illustrative embodiments of EFLX conversion models for various components of a pump, including: fluid ends, power ends, speed reducers, transmissions, and engines. FIGS. 9-14 and the associated descriptions of conversion models 900, 1000, 1100, 1200, and 1300 are most readily understood when viewed in the context of process flow 300, which at least in part explores how the internal operations of a pump impact the various components of that pump. While all components of a pump are not shown, a conversion model exists for every component of a pump whose productive lifetime is a function of cumulative damage. Cumulative damage includes but is not limited to damage caused by erosion, corrosion, or fatigue. In FIGS. 9-14, the EFLX is represented as an amount of barrels produced by a specific component in the historical data at a specific pressure before that component failed. In FIGS. 9-14, the amount of barrels produced by a specific component in the historical data at a specific pressure before that component failed is sometimes abbreviated as "BblsToFailureAtPress" or a variation thereof.

Figure 9:
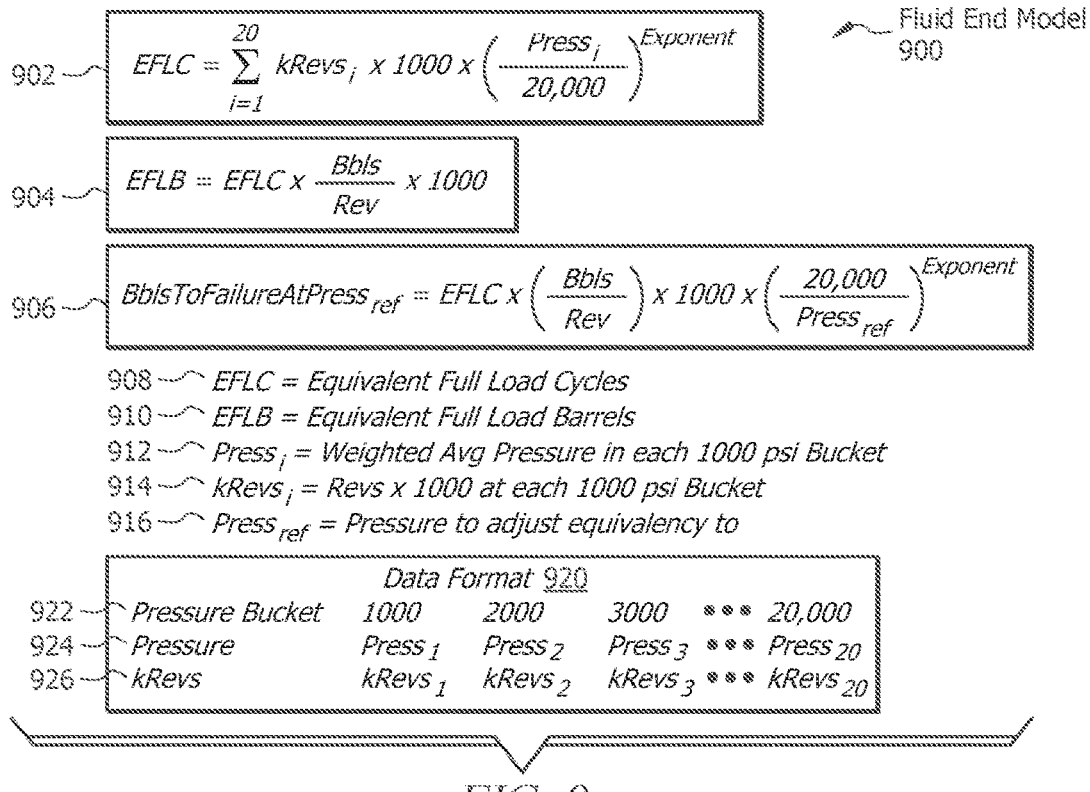
FIG. 9 is a conversion model that defines an ELFX for a fluid end of a pump, according to an embodiment of the disclosure.

Turning now to FIG. 9, a conversion model 900 that defines an ELFX for a fluid end of a pump, according to an embodiment of the disclosure, is described. At operation 902, equivalent full load cycles (EFLC) 908 are determined using the provided summation formula and historical data for a number of 1000 psi buckets. In the example of FIG. 9, there are twenty 1000 psi buckets in the historical data, though in other embodiments, the amount of 1000 psi buckets in the historical data is more, while in yet other embodiments, the amount of 1000 psi buckets in the historical data is less. Associated with each 1000 psi bucket are a weighted average pressure 912, and a product kRevs 914 of the revolutions of the pump multiplied by 1000.

Solely for the purpose of illustrating the type of data input into the following calculations, performance data of a hypothetical first fracturing pump and a hypothetical second fracturing pump is provided below.

|  | Hypothetical First Fracturing Pump | Hypothetical Second Fracturing Pump |
| --- | --- | --- |
| Pump Gear Ratio | 10.875 | 9.21 |
|  | Barrels per Pump Revolution (Bbls/Rev) | |
| Plunger Diameter (Inches) | Hypothetical First Fracturing Pump | Hypothetical Second Fracturing Pump |
| 4.0 | 0.064762 | Not Applicable |
| 4.5 | 0.081964 | 0.059014 |
| 5.0 | Not Applicable | 0.072857 |
| 6.0 | Not Applicable | 0.104914 |

At operation 904, using the EFLC 908 determined at operation 902, an equivalent full load barrel (EFLB) value 910 is determined by multiplying the EFLC 908 by the barrels per revolution of the pump, and multiplying this product by 1000.

At operation 906, a quantity of barrels to failure at a reference pressure 916 is determined utilizing the indicated formula. For each particular fluid end in the historical data, the quantity of barrels to failure at a reference pressure 916 is the EFLX for that particular fluid end. For reference, a data format table 920 illustrates the naming of and the relationship between a particular pressure bucket 922, a pressure 924, and a kRevs 926 (pump revolutions multiplied by 1000). In the non-limiting example of data format table 920, twenty pressure buckets 922 are included. However, in other embodiments, a smaller amount of pressure buckets 922 are included, and in yet other embodiments, a larger amount of pressure buckets 922 are included.

Figure 10:
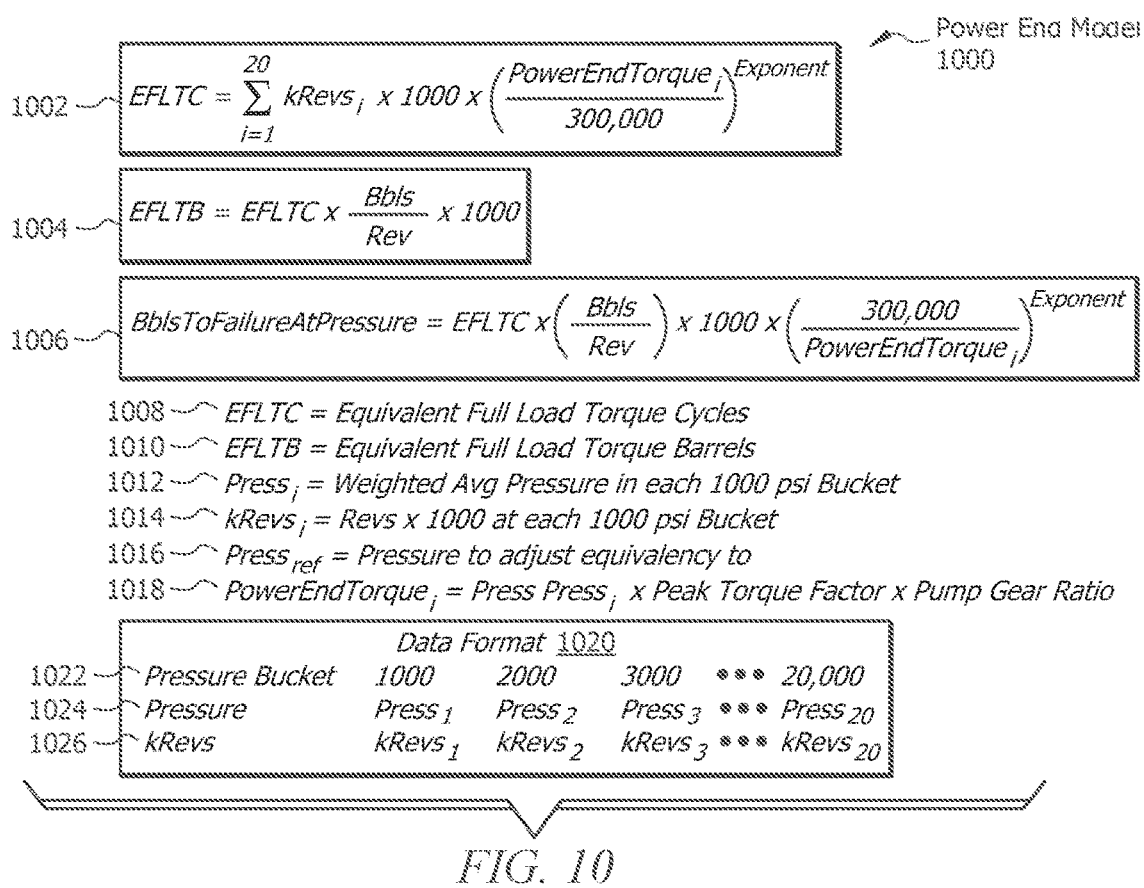
FIG. 10 is a conversion model that defines an ELFX for a power end of a pump, according to an embodiment of the disclosure.

Turning now to FIG. 10, a conversion model 1000 that defines an ELFX for a power end of a pump, according to an embodiment of the disclosure, is described. At operation 1002, equivalent full load torque cycles (EFLTC) 1008 are determined using the provided summation formula and historical data for a number of 1000 psi buckets. In the example of FIG. 10, there are twenty 1000 psi buckets in the historical data, though in other embodiments, the amount of 1000 psi buckets in the historical data is more, while in yet other embodiments, the amount of 1000 psi buckets in the historical data is less. Associated with each 1000 psi bucket are a weighted average pressure 1012, and a product kRevs 1014 of the revolutions of the pump multiplied by 1000.

Solely for the purpose of illustrating the type of data input into the following calculations, performance data of a hypothetical first fracturing pump and a hypothetical second fracturing pump is provided below.

|  | Hypothetical First Fracturing Pump | Hypothetical Second Fracturing Pump |
| --- | --- | --- |
| Pump Gear Ratio | 10.875 | 9.21 |
| Peak Torque Factors | | |
| Plunger Diameter (Inches) | Hypothetical First Fracturing Pump | Hypothetical Second Fracturing Pump |
| 4.0 | 0.7825 | Not Applicable |
| 4.5 | 0.9903 | 0.9812 |
| 5.0 | Not Applicable | 1.2113 |
| 6.0 | Not Applicable | 1.7443 |
| Barrels per Pump Revolution (Bbls/Rev) | | |
| Plunger Diameter (Inches) | Hypothetical First Fracturing Pump | Hypothetical Second Fracturing Pump |
| 4.0 | 0.064762 | Not Applicable |
| 4.5 | 0.081964 | 0.059014 |
| 5.0 | Not Applicable | 0.072857 |
| 6.0 | Not Applicable | 0.104914 |

At operation 1004, using the EFLTC 1008 determined at operation 1002, an equivalent full load torque barrel (EFLTB) value 1010 is determined by multiplying the EFLTC 1008 by the barrels per revolution of the pump, and multiplying this product by 1000.

At operation 1006, a quantity of barrels to failure at a reference pressure 1016 is determined utilizing the indicated formula. For each particular power end in the historical data, the quantity of barrels to failure at a reference pressure 1016 is the EFLX for a particular power end having a power end torque 1018 that varies at each 1000 psi bucket. The power end torque 1018 at each 1000 psi bucket is the product of the weighted average pressure 1012 associated with the 1000 psi bucket and a known peak torque factor associated with a pump gear ratio, plunger diameter, and stroke and number of plungers in a pump, examples of which are provided above.

For reference, a data format table 1020 illustrates the naming of and the relationship between a particular pressure bucket 1022, a pressure 1024, and a kRevs 1026 (pump revolutions multiplied by 1000). In the non-limiting example of data format table 1020, twenty pressure buckets 1022 are included. However, in other embodiments, a smaller amount of pressure buckets 1022 are included, and in yet other embodiments, a larger amount of pressure buckets 1022 are included.

Turning now to FIG. 11, a conversion model 1100 that defines an EFLX for a speed reducer of a pump, according to an embodiment of the disclosure, is described. At operation 1102, equivalent full load torque cycles (EFLTC) 1108 are determined using the provided summation formula and historical data for a number of 1000 psi buckets. In the example of FIG. 11, there are twenty 1000 psi buckets in the historical data, though in other embodiments, the amount of 1000 psi buckets in the historical data is more, while in yet other embodiments, the amount of 1000 psi buckets in the historical data is less. Associated with each 1000 psi bucket are a weighted average pressure 1112, and a product kRevs 1114 of the revolutions of the pump multiplied by 1000.

Solely for the purpose of illustrating the type of data input into the following calculations, performance data of a hypothetical first fracturing pump and a hypothetical second fracturing pump is provided below.

|  | Hypothetical First Fracturing Pump | Hypothetical Second Fracturing Pump |
| --- | --- | --- |
| Pump Gear Ratio | 10.875 | 9.21 |
| Peak Torque Factors | | |
| Plunger Diameter (Inches) | Hypothetical First Fracturing Pump | Hypothetical Second Fracturing Pump |
| 4.0 | 0.7825 | Not Applicable |
| 4.5 | 0.9903 | 0.9812 |
| 5.0 | Not Applicable | 1.2113 |
| 6.0 | Not Applicable | 1.7443 |
| Barrels per Pump Revolution (Bbls/Rev) | | |
| Plunger Diameter (Inches) | Hypothetical First Fracturing Pump | Hypothetical Second Fracturing Pump |
| 4.0 | 0.064762 | Not Applicable |
| 4.5 | 0.081964 | 0.059014 |
| 5.0 | Not Applicable | 0.072857 |
| 6.0 | Not Applicable | 0.104914 |

At operation 1104, using the EFLTC 1108 determined at operation 1102, an equivalent full load torque barrel (EFLTB) value 1110 is determined by multiplying the EFLTC 1108 by the barrels per revolution of the pump, and multiplying this product by 1000.

At operation 1106, a quantity of barrels to failure at a reference pressure 1116 is determined utilizing the indicated formula. For each particular speed reducer in the historical data, the quantity of barrels to failure at a reference pressure 1116 is the EFLX for a particular speed reducer having a speed reducer torque 1118 that varies at each 1000 psi bucket. The speed reducer torque 1118 at each 1000 psi bucket is the product of the weighted average pressure 1112 associated with the 1000 psi bucket and a known peak torque factor associated with a pump gear ratio, a plunger diameter, a plunger stroke, and a number of plungers in a pump, examples of which are provided above.

For reference, a data format table 1120 illustrates the naming of and the relationship between a particular pressure bucket 1122, a pressure 1124, and a kRevs 1126 (pump revolutions multiplied by 1000). In the non-limiting example of data format table 1120, twenty pressure buckets 1122 are included. However, in other embodiments, a smaller amount of pressure buckets 1122 are included, and in yet other embodiments, a larger amount of pressure buckets 1122 are included.

Figure 12:
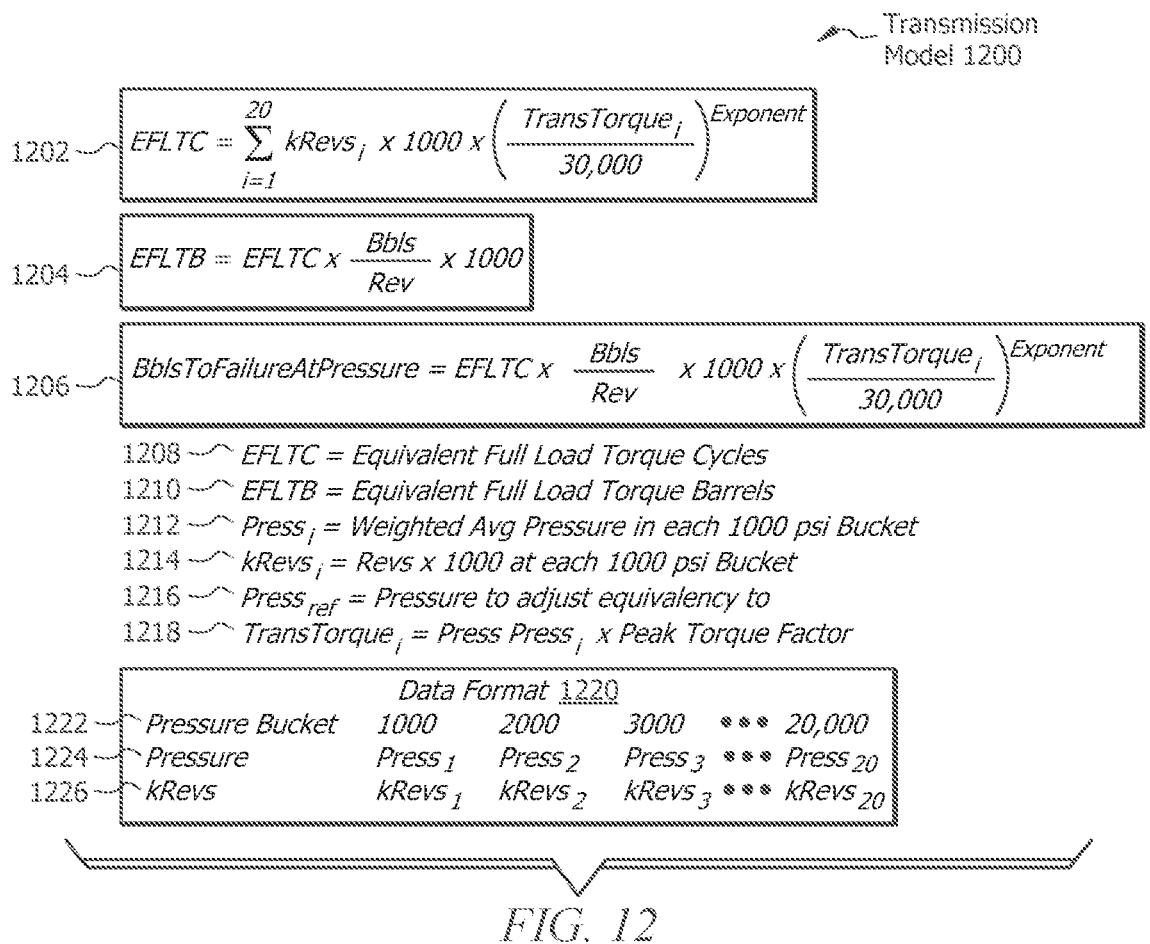
FIG. 12 is a conversion model that defines an EFLX for a transmission of a pump, according to an embodiment of the disclosure.

Turning now to FIG. 12, a conversion model 1200 that defines an EFLX for a transmission of a pump, according to an embodiment of the disclosure, is described. At operation 1202, equivalent full load torque cycles (EFLTC) 1208 are determined using the provided summation formula and historical data for a number of 1000 psi buckets. In the example of FIG. 12, there are twenty 1000 psi buckets in the historical data, though in other embodiments, the amount of 1000 psi buckets in the historical data is more, while in yet other embodiments, the amount of 1000 psi buckets in the historical data is less. Associated with each 1000 psi bucket are a weighted average pressure 1212, and a product kRevs 1214 of the revolutions of the pump multiplied by 1000.

Solely for the purpose of illustrating the type of data input into the following calculations, performance data of a hypothetical first fracturing pump and a hypothetical second fracturing pump is provided below.

| | Hypothetical First Fracturing Pump | Hypothetical Second Fracturing Pump |
|---|---|---|
| Pump Gear Ratio | 10.875 | 9.21 |
| Peak Torque Factors | | |
| Plunger Diameter (Inches) | Hypothetical First Fracturing Pump | Hypothetical Second Fracturing Pump |
| 4.0 | 0.7825 | Not Applicable |
| 4.5 | 0.9903 | 0.9812 |
| 5.0 | Not Applicable | 1.2113 |
| 6.0 | Not Applicable | 1.7443 |
| Barrels per Pump Revolution (Bbls/Rev) | | |
| Plunger Diameter (Inches) | Hypothetical First Fracturing Pump | Hypothetical Second Fracturing Pump |
| 4.0 | 0.064762 | Not Applicable |
| 4.5 | 0.081964 | 0.059014 |
| 5.0 | Not Applicable | 0.072857 |
| 6.0 | Not Applicable | 0.104914 |

At operation 1204, using the EFLTC 1208 determined at operation 1202, an equivalent full load torque barrel (EFLTB) value 1210 is determined by multiplying the EFLTC 1208 by the barrels per revolution of the pump, and multiplying this product by 1000.

At operation 1206, a quantity of barrels to failure at a reference pressure 1216 is determined utilizing the indicated formula. For each particular transmission in the historical data, the quantity of barrels to failure at a reference pressure 1216 is the EFLX for a particular transmission having a transmission torque 1218 that varies at each 1000 psi bucket. The transmission torque 1218 at each 1000 psi bucket is the product of the weighted average pressure 1212 associated with the 1000 psi bucket and a known peak torque factor associated with a plunger diameter, a plunger stroke and a number of plungers in a pump, examples of which are provided above.

For reference, a data format table 1220 illustrates the naming of and the relationship between a particular pressure bucket 1222, a pressure 1224, and a kRevs 1226 (pump revolutions multiplied by 1000). In the non-limiting example of data format table 1220, twenty pressure buckets 1222 are included. However, in other embodiments, a smaller amount of pressure buckets 1222 are included, and in yet other embodiments, a larger amount of pressure buckets 1222 are included.

Figure 13:
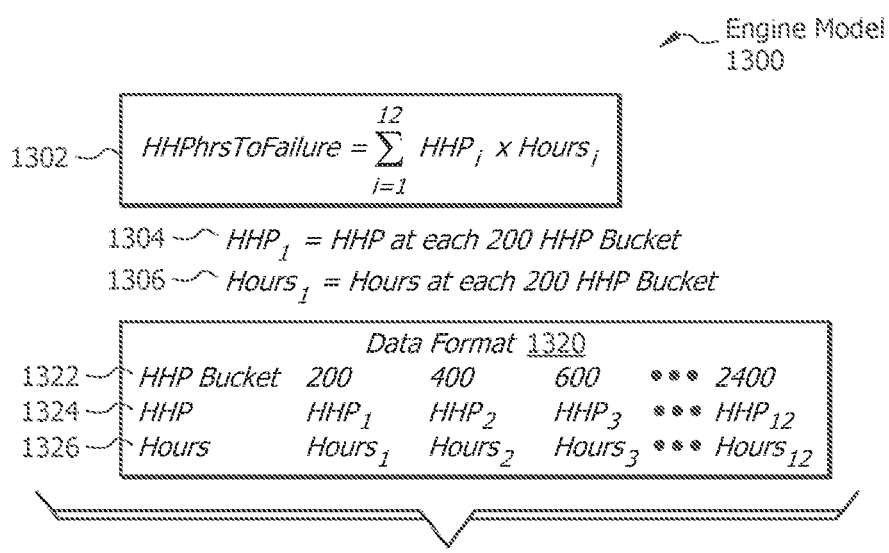
FIG. 13 is a conversion model that defines an EFLX for an engine of a pump, according to an embodiment of the disclosure.

Turning now to FIG. 13, a conversion model 1300 that defines an EFLX for an engine of a pump, according to an embodiment of the disclosure, is described. While the conversion model 1300 initially appears to differ in operation from conversion models 900, 1000, 1100, and 1200, this is not the case. Rather, the nature of how engines function allows the conversion model 1300 to be represented in a more compact manner.

Operation 1302 determines an EFLX for an engine of a pump in terms of hydraulic horsepower (HHP) hours until the failure of the engine. In embodiments herein, "hydraulic horsepower hours" are referred to as "HHPhrs." As explained above in the discussion of the process flow 300, the summation equation used at operation 1302 to determine HHPhrs consumed by the engine is the same base equation as the power law equation converted to equivalent reference load barrels (ERLB). For HHPhrs, the power law equation has an exponent of 1, and the reference constant is the unit conversion constant (40.8) for HHP. In the operation 1302, HHP hours to failure are determined using the provided summation formula and historical data for a number of two-hundred psi buckets. In the example of FIG. 13, there are twelve two-hundred psi buckets in the historical data, though in other embodiments, the amount of two-hundred psi buckets in the historical data is more, while in yet other embodiments, the amount of two-hundred psi buckets in the historical data is less. Associated with each two-hundred psi bucket are an HHP at each bucket 1304, and an hours at each bucket 1306. At each iteration of the summation formula, the product of multiplying the HHP at each bucket 1304, and an hours at each bucket 1306, is determined. The EFLX for a particular engine in the historical data is thus the result of the summation.

For reference, a data format table 1320 illustrates the naming of and the relationship between a particular HHP bucket 1322, an HHP 1324, and hours 1326. In the non-limiting example of data format table 1320, twelve HHP buckets 1322 are included. However, in other embodiments, a smaller amount of HHP buckets 1322 are included, and in yet other embodiments, a larger amount of HHP buckets 1322 are included.

Figure 14:
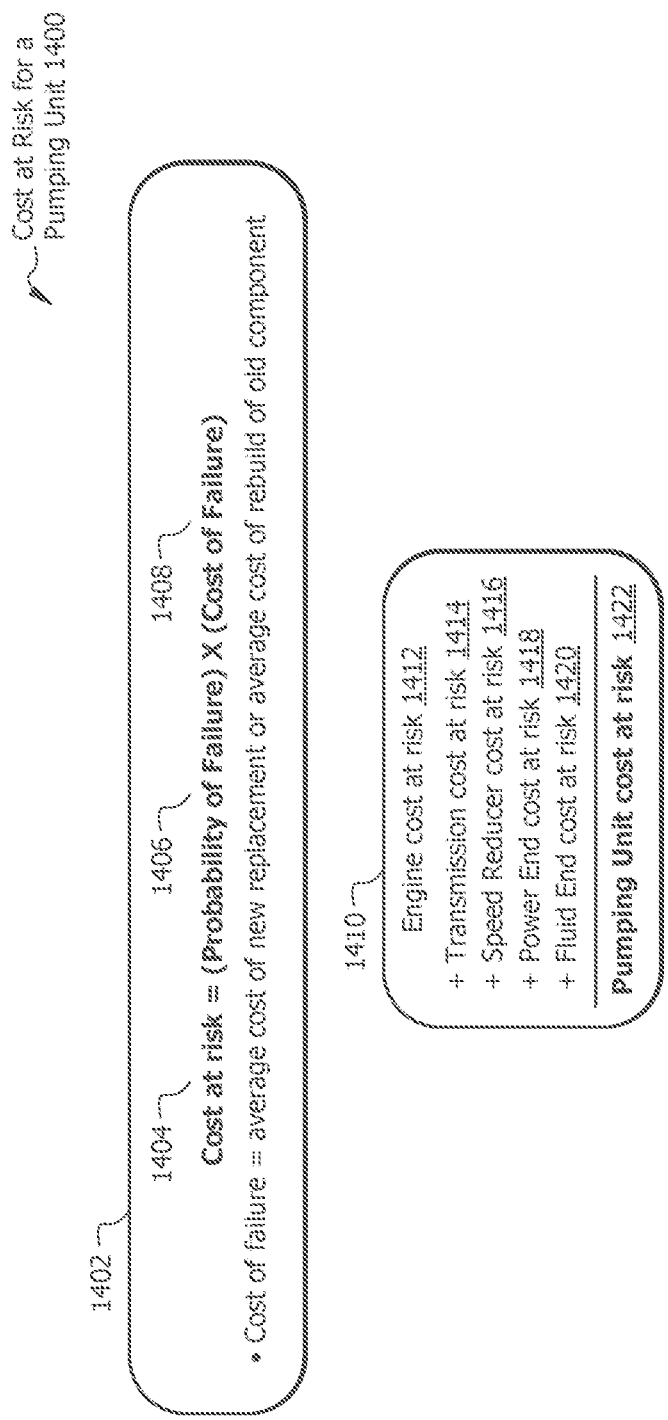
FIG. 14 is a model that defines a pumping unit cost at risk, according to an embodiment of the disclosure.

Turning now to FIG. 14, a model 1400 that defines a pumping unit cost at risk 1422, according to an embodiment of the disclosure, is described. For each component 1402 of a pumping unit 1410, a cost at risk 1404 associated with the component 1402 comprises the product of (1) a probability of failure 1406 and (2) a cost of failure 1408 of the component 1402. In embodiments herein, the cost of failure 1408 is measurable by a number of metrics, including but not limited to an average amount of physical resources (e.g., spare parts that are either already in an inventory or that need to be ordered) and labor needed to either procure a new replacement component 1402 or repair or rebuild the failed component 1402.

In other embodiments, the cost of failure 1408 is measurable as a financial cost (that is, an amount of currency that must be expended, including on labor, to either procure a new replacement component or repair or rebuild the failed component. In some such embodiments, accrual accounting is used to allocate money for the expected cost of failure 1408. The systems and methods disclosed herein allow for forecasting of more accurate expected costs of failure 1408, thus making accrual accounting more reliable, as the expected cost of failure 1408 predicts the actual settled cost. In other such embodiments, cost accounting is based on having enough revenue to allocate the money for the expected cost of failure 1408 from the revenue when the failure occurs.

In yet other embodiments, the cost of failure is measurable as a combination of the foregoing.

In embodiments herein, the probability of failure 1406 of a component 1402 is based on the probabilistic forecast of the expected failures 890 of FIG. 8 associated with the component 1402, determined as discussed elsewhere herein. That is, as explained elsewhere herein, the characteristics of a particular upcoming wellbore servicing operation in combination with the known prior life consumed (in EFLX) of various pump components 1402 in inventory and the planned consumption of the components 1402 associated with the upcoming wellbore servicing operation enables determining both the probability of failure of each of the components 1402 used in the upcoming wellbore servicing operation and predicting how many specimens of each of the components 1402 will fail in the upcoming wellbore servicing operation. For each specimen of the component 1402 predicted to fail, a separate cost at risk 1404 is defined.

In light of the forgoing, the pumping unit cost at risk 1422 is based on the planned consumption of a particular pumping unit in an upcoming wellbore servicing operation. Thus, in some embodiments, pumping unit cost at risk 1422 is modelled as the sum total of an engine cost at risk 1412 (the sum total cost at risk for each engine predicted to fail), a transmission cost at risk 1414 (the sum total cost at risk for each transmission predicted to fail), a speed reducer cost at risk 1416 (the sum total cost at risk for each speed reducer predicted to fail), a power end cost at risk 1418 (the sum total cost at risk for each power end predicted to fail), and a fluid end cost at risk (the sum total cost at risk for each fluid predicted to fail). In other embodiments, a different set of component costs at risk is used to model the pumping unit cost at risk 1422. Utilizing the pumping unit cost at risk 1422 as determined herein allows a user of a particular pumping unit to reserve sufficient resources or set appropriate wellbore servicing operations pricing to ensure that the upcoming wellbore servicing operation remains practicable and economically feasible.

In some embodiments utilizing the model 1400, an initial analysis determines, from captured failure data (e.g., the historical data 302), which of the components 1402 are the majority contributors to the pumping unit cost at risk 1422. In such embodiments, the 80/20 rule or another ratio is usable to determine which of the components to include in forecasting the pumping unit cost at risk 1422.

As discussed above, for each component of a pumping unit 1410, each probability of failure 1406 is multiplied by the cost of failure 1408 and summed to calculate the pumping unit cost at risk 1422. Notably, this calculation does not involve directly calculating the sum of each of the probabilities of failure 1406. Thus, each component of the pumping unit 1410 has a distinct cost at risk 1414, 1416, 1418, and 1420 and at no point is the probability of failure 1406 for any component contemplated to be greater than one.

In embodiments of the model 1400, the probabilistic forecast of the expected failures 890 enable determining the total cost at risk when a wellbore servicing operation provider is bidding on a job, thereby enabling the provider to meet a required margin threshold and engage in demand planning (that is, to determine how many components will be needed in the future) based on the planned future consumption of various components.

In some embodiments, the demand planning comprises using historical data of prior component failures that have an associated prior actual life consumed to forecast future demand for a component, by utilizing at least the probabilistic forecast described in the discussion of FIG. 8 and elsewhere herein. By accounting for the amount of prior life consumed since a component was new, demand planning is rendered more accurate. For example, more components that have a larger amount of prior life consumed results in more failures of that component during planned future usage than would be experienced by a group of components with a lesser amount of prior life consumed.

In some embodiments of the model 1400, the cost at risk 1404 of each component of the pumping unit, and the cost at risk of the pumping unit 1422, or either alone or in combination, is usable as a surrogate for component or overall pump age when determining how many resources will be needed to keep the component or pump in commercially useful operation by, for example, enabling a determination of how many resources a unit or a component must consume (e.g., for repair or refurbishment) to produce a given number of barrels at a given pressure. In some embodiments, either or both of the cost at risk 1404 of each component of the pumping unit, and the cost at risk of the pumping unit 1422 are measurable for at least one fracturing stage of a wellbore servicing operation. As used herein, a fracturing stage is a single unit of work of the multiple units of work (that is, multiple stages) involved in completing a fracturing operation. In embodiments where stages are measured by time, the fracturing stage is a unit of time (e.g., one hour) during which equipment (e.g., a pump) is operational and engaged in wellbore servicing operations.

Figure 15:
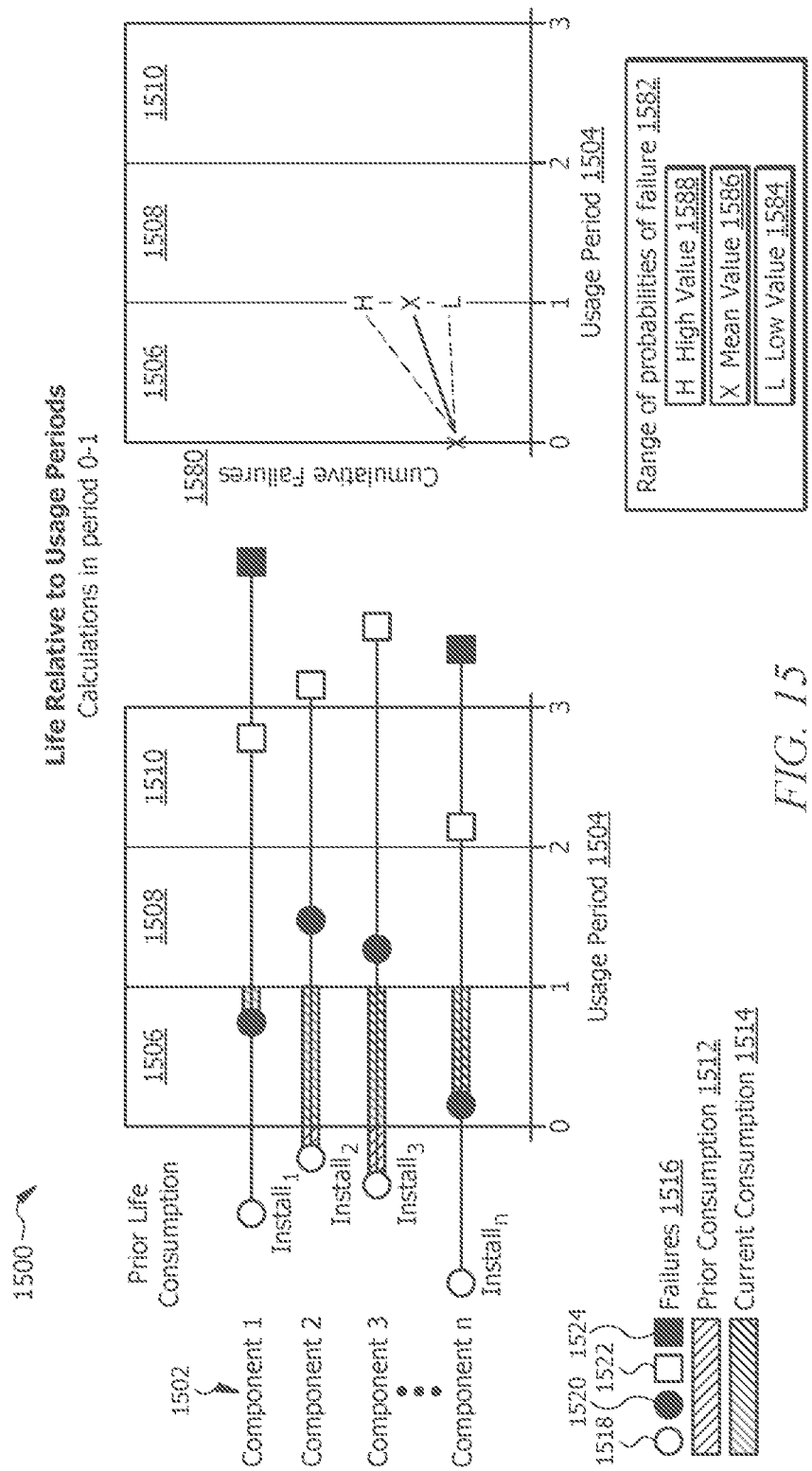
FIG. 15 is an illustration of a first period of a future component failure forecast of the process flow of FIG. 8, according to an embodiment of the disclosure.
Figure 16:
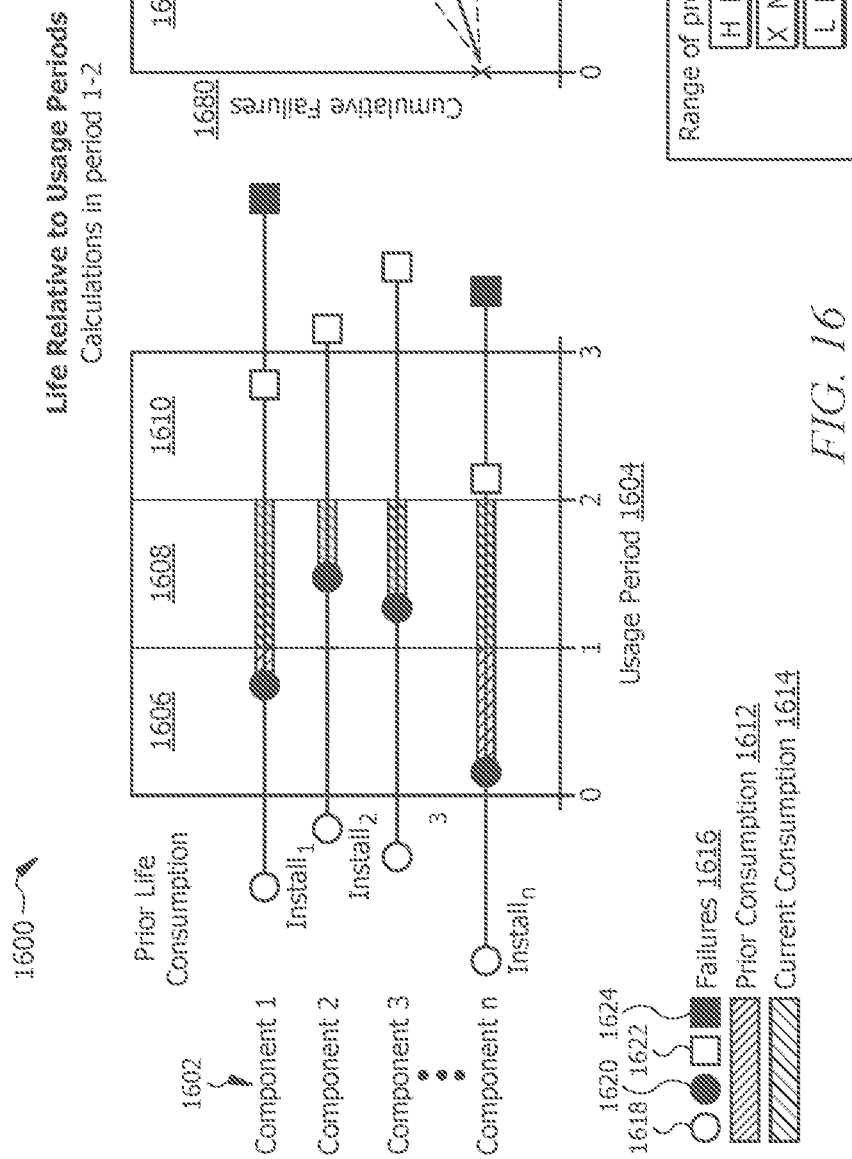
FIG. 16 is an illustration of a second period of a future component failure forecast of the process flow of FIG. 8, according to an embodiment of the disclosure.
Figure 17:
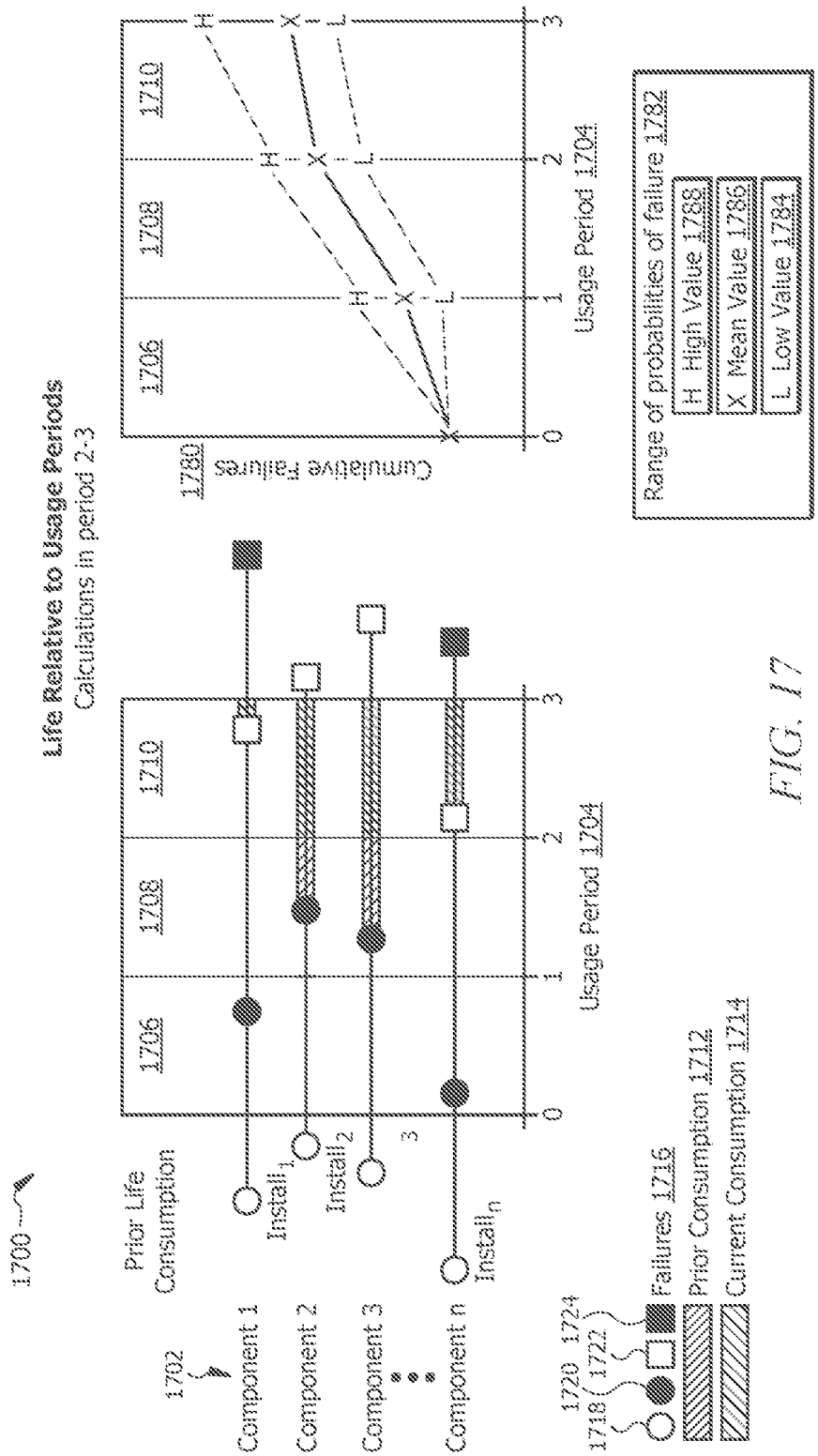
FIG. 17 is an illustration of a third period of a future component failure forecast of the process flow of FIG. 8, according to an embodiment of the disclosure.

FIGS. 15-17, as discussed below, describe in further detail the future component failure forecast of FIG. 8. To simplify the discussion of these figures, certain elements which FIGS. 15-17 share are discussed briefly below before the discussion of the individual figures. Each of FIGS. 15-17 illustrates the progression of the future component failure forecast. That is, FIG. 15 includes forecasting for a first usage period; FIG. 16 includes cumulative forecasting for the first usage period and a second usage period; and FIG. 17 includes cumulative forecasting for the first usage period, the second usage period, and a third usage period. The cumulative forecasting of FIGS. 15-17, as shown and discussed below, is refined and increases in accuracy as each usage period is added.

Components 1502, 1602, 1702: A plurality of components of the same type, taken from a set of historical data of failed components of the same type.

Usage period 1504, 1604, 1704: These periods of usage track both the amounts of prior consumption and planned consumption (e.g., in EFLX) as discussed elsewhere herein and in particular in the discussion of FIG. 8. By dividing the total planned consumption into the usage periods 1504, 1604, and 1704, the future component failure forecast is made more accurate, as the time of future component failure is narrowed down to a specific period. A first usage period (1506, 1606, and 1706), a second usage period (1508, 1608, and 1708), and a third usage period (1510, 1610, and 1710) are shown. Some embodiments include additional usage periods; this disclosure places no upper bound on the number of usage periods except for what is practicable for a specific implementation (e.g., the amount of historical data available, the amount of computing resources available to make the forecast, etc.).

Failures 1516, 1616, and 1716: The illustrations 1500, 1600, and 1700 track a number of different types of failures, as described below.

Most recent failure 1518, 1618, and 1718: For each separate component of the same type of component, taken from a set of historical data of failed components (e.g., the components 1502, 1602, and 1702), the most recent failure 1518, 1618, and 1718 indicates the date of the most recent failure of that component in an actively deployed pump. In embodiments, and as shown in FIGS. 15-17, the date of the most recent failure of the component in the actively deployed pump is also the date of installation of the replacement component of the failed component. Thus, the most recent failures 1518, 1618, and 1718 are labeled as "Install 1" through "Install n" in FIGS. 15-17.

Forecasted failures 1520, 1522, 1524; 1620, 1622, 1624; and 1720, 1722, 1724: For each separate component of the same type of component and given the details of planned future consumption associated with a future wellbore servicing operation, the forecasted failures 1520, 1522, 1524; 1620, 1622, 1624; and 1720, 1722, 1724 represent a sequence of forecasted failures of that component. For example, in FIG. 15, 1520 is the first forecasted failure, 1522 is the second forecasted failure, and 1524 is the third forecasted failure. Forecasted Failures 1620, 1622, 1624; and 1720, 1722, 1724 have the same meaning. A forecasted failure within a usage period indicates that there is a probability of failure of 1.0 for that usage period and the remaining usage until the end of the usage period is determined based on using both the prior usage life consumption and the planned consumption as described at least in FIG. 8, herein.

Mean values 1586, 1686, and 1786. The discussion of FIGS. 15-17 below discusses determination of mean values. Herein, the term "mean" is used as a convenient shorthand for any type of practicable averaging. Thus, in embodiments herein, a "mean value" is determinable by any one of mean averaging, median averaging, mode averaging, weighted averaging, or any other averaging technique suitable to an implementation of the disclosure.

Turning now to FIG. 15, an illustration 1500 of the usage period 1506 (the "first period") of a future component failure forecast of the process flow of FIG. 8 is described, according to an embodiment of the disclosure. In the example of the illustration 1500, a total of n components 1502 were deployed in the first usage period 1506. The components 1502 labeled "1" and "n" failed during the first usage period 1506. Thus there is no prior life consumed 1512 associated with the first usage period 1506 to calculate since the components 1502 labeled "1" and "n" have already failed and have a probability of failure of 1.0. Therefore, the prior life consumed 1512 for components "1" and "n" is zero and the planned consumption is measured from the forecasted failure 1520 to the end of the first usage period 1506.

Additionally, the components 1502 labelled "2" and "3" each experienced an associated prior life consumed 1512 before the start of the first period 1506 and also a current consumption 1514 within the first usage period 1506. The conditional probability of failure calculations of FIG. 8 for components 1502 labelled "2" and "3" are thus based on both a prior consumed life 1512 and a current consumption 1514 within the first usage period 1506.

In light of the foregoing and according to the methodology of FIG. 8 herein, cumulative failures 1580 are determined. In some embodiments, the determination includes at least in part the use of a monte carlo simulation. The determination of cumulative failures of the component 1502 is in the form of a range of probabilities of failure 1582. The range of probabilities of failure 1582 includes a low value 1584, a mean value 1586, and a high value 1588. In some embodiments, when forecasting the actual number of expected failures according to FIG. 8, the mean value 1586 is preferred.

Turning now to FIG. 16, an illustration 1600 of the usage period 1608 (the "second period") of a future component failure forecast of the process flow of FIG. 8 is described, according to an embodiment of the disclosure. In the example of illustration 1600, a total of n components 1602 were deployed in the first usage period 1606. The components 1602 labeled "1" and "n" failed during the first usage period 1606. Thus there is no prior life consumed 1612 associated with the first usage period 1606 to calculate since the components 1602 labeled "1" and "n" have already failed and have a probability of failure of 1.0. Therefore, the prior life consumed 1612 for components 1602 "1" and "n" is zero in the first usage period 1606, and the planned consumption for components 1602 "1" and "n" in the first usage period 1606 is measured from the forecasted failure 1620 to the end of the first usage period 1606. The conditional probability of failure calculations of FIG. 8 for components 1602 labelled "1" and "n" are thus based on both a prior consumed life 1612 and a current consumption 1614 within the first usage period 1606 and the second usage period 1608.

Additionally, the components 1602 labelled "2" and "3" each experienced associated most recent failures 1618 prior to the first usage period 1606, whereupon the components 1602 labelled "2" and "3" were replaced. The components 1602 labelled "2" and "3" are forecasted to fail at forecasted failures 1620 during the second usage period 1608, after which the components 1602 labelled "2" and "3" are projected to survive the planned consumption of the second usage period 1608 (labeled the current consumption 1614, as the planned consumption of the second usage period 1608 in the future will be the current consumption 1614 when the second usage period 1608 is in the present. Therefore, the prior life consumed 1612 for components "2" and "3" is zero in the second usage period 1608, and the planned consumption is measured from the forecasted failure 1620 to the end of the second usage period 1608. The conditional probability of failure calculations of FIG. 8 for components 1602 labelled "2" and "3" are thus based on both a prior consumed life 1612 and a current consumption 1614 within the second usage period 1608.

In light of the foregoing and according to the methodology of FIG. 8 herein, cumulative failures 1680 are determined. In some embodiments, the determination includes at least in part the use of a monte carlo simulation. The determination of cumulative failures 1680 builds on and refines the determination of cumulative failures 1580. The determination of cumulative failures 1680 of the component 1602 is in the form of a range of probabilities of failure 1682. The range of probabilities of failure 1682 includes a low value 1684, a mean value 1686, and a high value 1688. In some embodiments, when forecasting the actual number of expected failures according to FIG. 8, the mean value 1686 is preferred.

Turning now to FIG. 17, an illustration 1700 of the usage period 1710 (the "third period") of a future component failure forecast of the process flow of FIG. 8 is described, according to an embodiment of the disclosure. The illustration builds on and furthers the future component failure forecast of FIGS. 15-16, which are already discussed above. Thus, the descriptions of the usage periods 1706 and 1708 are not repeated in the description of illustration 1700. The components 1702 labeled "component 1" and "component n" are forecasted to fail in the usage period 1710 at the forecasted failures 1722, while the components 1702 labeled "component 2" and "component 3" are forecast to function without failure during the usage period 1710 after the forecasted failure and replacement of the components 1702 labeled "component 2" and "component 3" in the usage period 1708. After the replacement of the components 1702 labeled "component 1" through "component 3" and "component n," all of the depicted components 1702 are projected to survive the planned consumption (illustrated as the current consumption 1714, as the planned consumption will be the current consumption when usage period 1710 is in the present) without an additional failure during the usage period 1710. Additional forecasted failures 1722 and 1724 are depicted after the usage period 1710 for illustrative purposes only, and primarily to indicate that in some embodiments more than three usage periods exist. The additional forecasted failures 1722 and 1724 depicted after the usage period 1710 are not used in the determination of cumulative failures 1780.

In light of the foregoing and according to the methodology of FIG. 8 herein, the cumulative failures 1780 are determined. In some embodiments, the determination includes at least in part the use of a monte carlo simulation. The determination of cumulative failures 1780 builds on and refines the determination of cumulative failures 1580 and the determination of cumulative failures 1680. The determination of cumulative failures 1780 of the component 1702 is in the form of a range of probabilities of failure 1782. The range of probabilities of failure 1782 includes a low value 1784, a mean value 1786, and a high value 1788. In some embodiments, when forecasting the actual number of expected failures according to FIG. 8, the mean value 1786 is preferred.

In the context of the foregoing descriptions of FIGS. 15-17, FIGS. 7A and 7B are now referred to once again to explore further how, in some embodiments featuring the use of a monte carlo simulation to determine future failure probabilities of components, an initial seed for the monte carlo simulation is determined. In such embodiments, the probability of survival from the reliability curve 750A is divided into n segments corresponding to a total number of components in operation during each usage period of FIGS. 15 to 17. This ensures that the distribution of failures across the various components maintains the same distribution as the original failures for each component for each iteration of the monte carlo simulation.

Each of these n failures is the initial monte carlo simulation seed for each successive failure on each component. For the first component failures, the first seed is randomly distributed between the first failure or install and the first failure thereafter for each component. For each successive failure, a new seed is chosen. For the second and successive failures, on each iteration, the seed will be randomly distributed between the failures on each component. For example, in FIG. 17, there will be three seeded groups on component 1 and n and only two seeded groups for components 2 and 3. Thus, seeding is constrained such that enough groups are seeded such that the last failure of a component is beyond the last usage period.

FIGS. 15-17 are examples wherein the useful service life of the components subject to simulation are short relative to the usage periods. That is, these types of components tend to fail at an accelerated rate compared to other components that generally have a longer useful service life. The techniques and methods discussed herein are applicable to any component whose life is a function of cumulative damage as described elsewhere herein; these techniques and methods work substantially the same way whether the useful service life is short or long relative to usage periods.

In the context of a monte carlo simulation, the left edge of indicators 706A, 708A, 710A, 712A, 714A, and 716A (that is, the dot at the tail end of each of the arrow indicators 706A, 708A, 710A, 712A, 714A, and 716A) mark the prior life consumption since the last component failure or new install. The reliability curve 750A indicates life consumed in the usage period of interest (e.g., between 0 and 20,000 EFLB, 20,000 and 40,000 EFLB, etc.). Thus, the conditional probability of failure is calculated for each amount of EFLB consumed and planned consumption per usage period.

If a component failure occurs during a usage period, then there is a probability of failure of one (for the failed component) and an additional probability of failure from install of a replacement component to the end of the usage period. The total failures in each usage period will be the sum of the probabilities of failure across all components of the same type for each iteration (or, each usage period). In this context, the expected failures 890 of FIG. 8 are the total amount of failed components of a single type in a single usage period.

In embodiments herein, the iterations in the monte carlo simulation continue until an objective function is stabilized to a minimum threshold. The variance of the data in the first usage period defines the variance around the mean. The sum of the variances of the first two usage periods define the total variance at the end of the first two usage periods, and the sum of the variances of the first three usage periods defines the total variance at the end of the third usage period. Continuing to sum the variances of each successive usage period forms an enlarging funnel from the start of the first usage period with no variance prior to the first usage period, as that is the last known total failures prior to the forecast.

Figure 18:
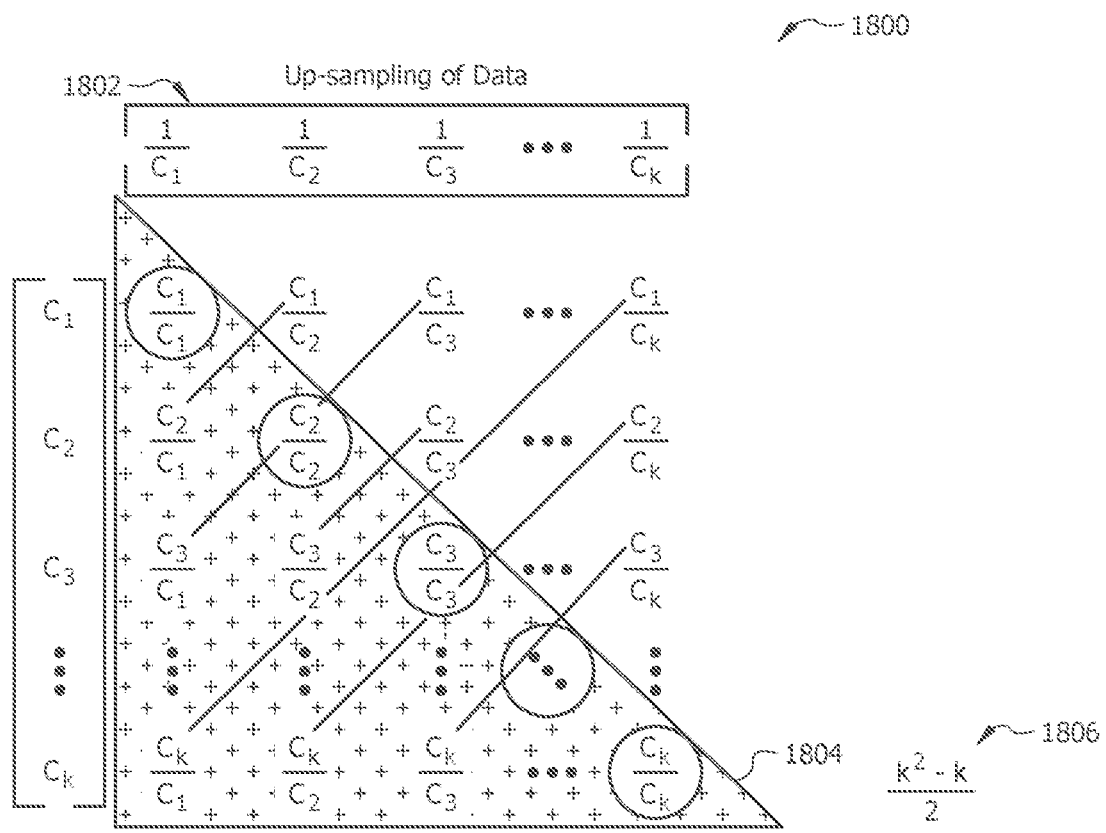
FIG. 18 is an illustration of a process to up-sample an observed data set, according to an embodiment of the disclosure.

Turning now to FIG. 18, an illustration 1800 of a process to up-sample an observed data set, according to an embodiment of the disclosure, is described. Probabilistic analysis of the type utilized in the present disclosure is practicable when sufficiently consistent, reliable, and predictable. A crucial element of ensuring practicability is thus to ensure that sufficient training data (e.g., the historical data 302) is available. Unfortunately, when working with real-world data sets (e.g., an implementation of the historical data 302 of component failures), sufficient training data is often not available and will not become available, due to, for example, the impracticability of waiting for a large number of expensive components that are needed for production work to fail at unpredicted times, the component being new to market and lacking a large set of training data, etc. When modeling a mean lifetime remaining of a component without a sufficiently large pool of training data, as is done throughout the embodiments herein, using conventional means of measuring the mean life risks initial failures in the training data causing substantial variability of the mean life modeling as each new instance of component failure is added to the training data.

Disclosed is a method to up-sample an otherwise unreliably small dataset (e.g., a small set of historical data 302) using only the original small dataset such that a stable calculation of the mean value of the consumed life prior to failure of a component is obtainable from such a small data set. As each new failure record is added to the training data for each component, the method automatically calculates a normalized life equation for the component based on a component type and compares the calculated mean life to the life recalculated to include the previous failure. Utilizing this method, the mean normalized life quickly stabilizes. Without utilizing this method, as each new failure record is added to the training data, the mean life recalculation would exhibit destabilizing differences from the previously calculated mean. The up-sampled data thus stabilizes the mean life with considerably fewer actual real-world failures in the training data.

For the purpose of the illustration 1800, and notwithstanding or intending to conflict with any other descriptions herein, certain concepts are defined as follows.

Equivalency. The amount of exposure at one stress that is equal to a different amount of exposure at a different stress. This definition of equivalency is expressed using the following formula, where $S_i$ is the magnitude of the stress variable i (e.g., load, speed, temperature, etc.), and $N_i$ is the exposure at stress i (e.g., time, cycles, revolutions, volume, etc.)

$$N_1 * fn(S_1) = N_2 * fn(S_2)$$

Miner's Rule. A method for tracking cumulative damage. Miner's rule is expressed using the following formula, where k is a quantity of different stress conditions, $n_i$ is the exposure at stress i, $N_i$ is the exposure at stress i that will cause failure of a component, and the quotient of both is the fractional percentage of life exposure at stress i.

$$\sum_{i=1}^{k} \frac{n_i}{N_i} = 1 \quad \frac{n_1}{N_1} + \frac{n_2}{N_2} + \frac{n_3}{N_3} + \ldots + \frac{n_k}{N_k} = 1 \text{ at full life}$$

The above equations are multi-dimensional. As elsewhere in this application, reducing the equations to a single dimension provides benefits in ease of implementation and computational efficiency. To achieve this dimension reduction, the above equations are restated as follows.

One-Dimensional Miner's Rule. In the equation below, k is a number of different stress conditions, $n_i$ is an amount of exposure at stress i, $N_i$ is exposure at a stress i that will cause component failure, and $n_i/N_i$ is a fractional percentage of life exposure at stress i. Additionally, $n_R$ is exposure at a reference stress, and $N_R$ is exposure at a reference stress that will cause failure.

$$\frac{n_1}{N_1} + \frac{n_2}{N_2} + \frac{n_3}{N_3} + \ldots + \frac{n_k}{N_k} = 1 = \frac{n_R}{N_R}$$

One-Dimensional Equivalency. In the equation below, $S_i$ is the combined magnitudes of stress variables i (torque, speed, temp, press, etc.). In embodiments, $S_i$ is any combination of one or more stress variables. $S_R$ likewise represents the magnitudes of the reference stress variables (torque, speed, temp, press, etc.).

$$N_R = N_i * \frac{fn(S_i)}{fn(S_R)}$$

Equivalency and Miner's Rule: Combined and Simplified.

$$n_R = n_1 * \frac{fn(S_1)}{fn(S_R)} + n_2 * \frac{fn(S_2)}{fn(S_R)} + n_3 * \frac{fn(S_3)}{fn(S_R)} + \ldots + n_k * \frac{fn(k)}{fn(S_R)}$$

$$n_1 * fn(S_1) + n_2 * fn(S_2) + n_3 * fn(S_3) + \ldots + n_k * fn(S_k) = n_R * fn(S_R)$$

Up-sampling Equation for One Failure. Notably, since $n_R$, $S_R$, and x are constants, then:

$$n_R * (S_R)^x = \text{Constant} = C$$

Combining the equation for one failure with a power law function converts the above equation into the following form:

$$n_1 * (S_1)^x + n_2 * (S_2)^x + n_3 * (S_3)^x + \ldots + n_k * (S_k)^x = \text{Constant} = C$$

The illustration 1800 provides a visual conceptualization of the up-sampling equation for one failure in action in the presence of an unbounded collection of constants C 1802. In embodiments, the collection contains at least one constant and has no upper bound on the number of constants. In the illustration 1800:

If all constants are exactly equal then each ratio equals one.

Due to variability of failures, all ratios except those on a diagonal 1804 are not exactly equal to 1.

Values along the diagonal 1804 are the trivial case.

Ratios above the diagonal 1804 compare each constant with every other constant besides itself. Ratios below the diagonal 1804 are the reciprocals of those above the diagonal 1804.

Given the foregoing, total comparisons above the diagonal 1804 are equal to the result of full up-sampling equation 1806, where k is the number of actual observed component failures in the available training data:

$$(k^2 - k)/2$$

The following example of the methodology of illustration 1800 is provided below for demonstration purposes.

For each observed failure, set up an equation where the exponent x is common to but unknown in each failure equation:

$$n_1 * (S_1)^x + n_2 * (S_2)^x + n_3 * (S_3)^x + \ldots + n_k * (S_k)^x = \text{Constant} = C$$

Divide each failure equation by every other failure equation as shown in the illustration 1800.

Set the sum of the results from the previous step equal to the full up-sampling equation 1806, where k is the total number of failure equations.

Solve for the exponent in the ratios of the constants such that the error between the sum of the ratios and the total comparisons are minimized.

$$\frac{C_1}{C_2} + \frac{C_1}{C_3} + \frac{C_2}{C_3} + \ldots + \frac{C_{k-1}}{C_k} - \frac{k^2 - k}{2} = \text{Minimum}$$

After the exponent is solved above, select a reference stress and calculate the stress cycles at a common reference stress for each failure. This normalizes each failure to a common condition:

$$n_R = n_1 * \left(\frac{S_1}{S_R}\right)^x + n_2 * \left(\frac{S_2}{S_R}\right)^x + n_3 * \left(\frac{S_3}{S_R}\right)^x + \ldots + n_k * \left(\frac{S_k}{S_R}\right)^x$$

Figures 19A, 19B:
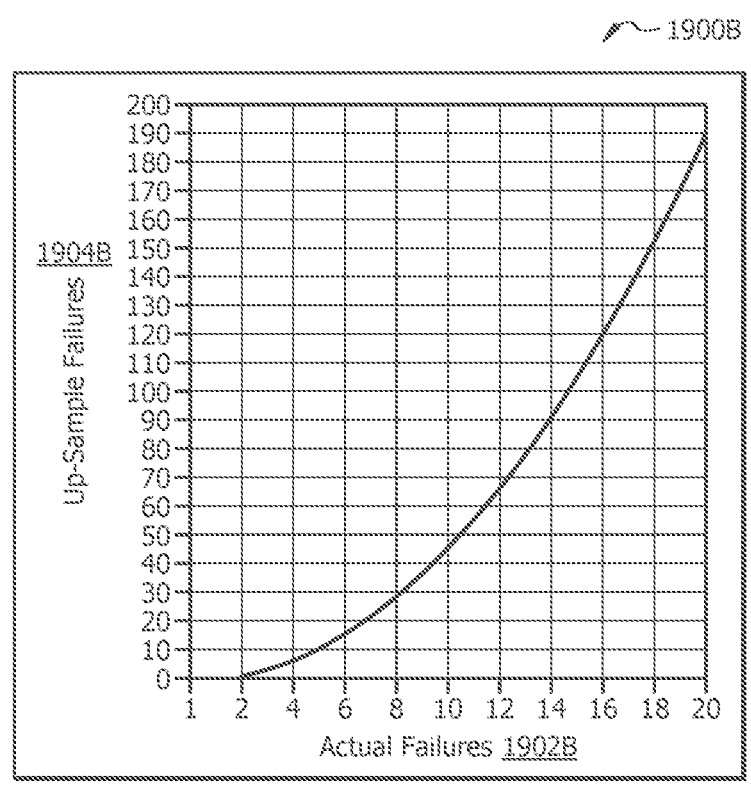
FIGS. 19A and 19B are exemplary illustrations of an up-sampled data set of observed failures of a component of a plurality of components of a pump, according to an embodiment of the disclosure.

Turning now to FIGS. 19A and 19B, exemplary illustrations 1900A and 1900B of an up-sampled data set of observed failures of a component of a plurality of components of a pump, according to an embodiment of the disclosure, are described. The illustrations 1900A and 1900B demonstrate an implementation of the methodology of the illustration 1800, above. Illustration 1900A and 1900B depict the same information, except that illustration 1900A is tabular while illustration 1900B is presented as a line graph. Fails 1902A and 1902B are a number of actually observed failures of a component. Up-samples 1904A and 1904B are a number of up-sampled failures of the same component, based on the methodology of illustration 1800 disclosed above. In embodiments, the up-samples 1904A and 1904B comprise a dataset of sufficient size and stability to be used with the systems and methods of this disclosure to determine conditional reliability of a component, as discussed throughout this disclosure.

Figure 20:
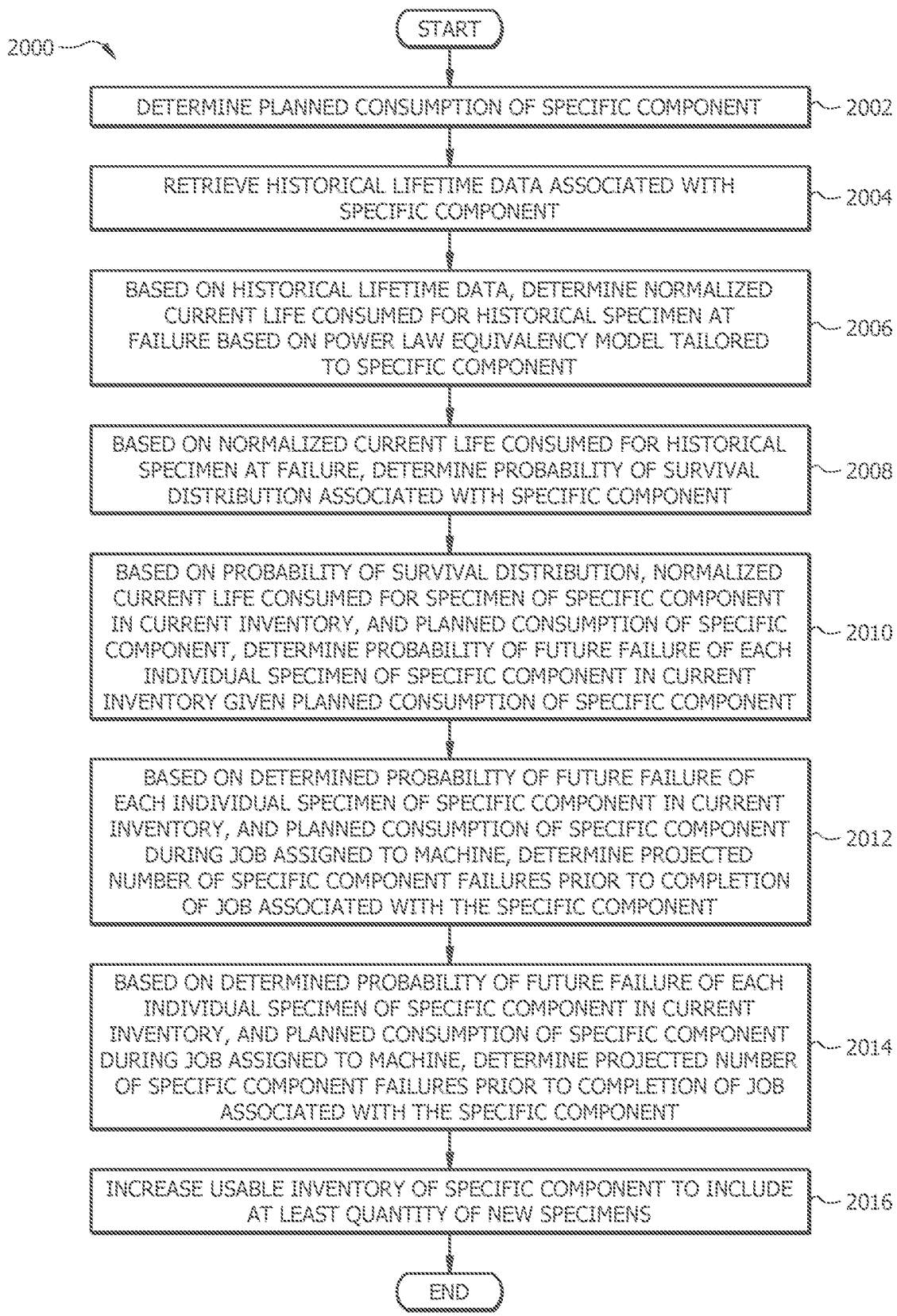
FIG. 20 is automated method to generate at least one acquisition request of a specific component of a machine having a plurality of components, using a probabilistic model and based on a current life consumed and a planned consumption, to maintain a usable inventory of the specific component, each acquisition request being configured to maintain the usable inventory, according to an embodiment of the disclosure.

Turning now to FIG. 20, an automated method 2000 to generate at least one acquisition request of a specific component of a machine having a plurality of components, using a probabilistic model and based on a current life consumed and a planned consumption, to maintain a usable inventory of the specific component, is described. Each acquisition request is configured to maintain the usable inventory. In some embodiments, the usable inventory comprises a sufficient, but not excess, inventory. For example, in some embodiments, the usable inventory is based on a just-in-time ("JIT") inventory system. The usable inventory in a JIT inventory system is in contradistinction to a warehouse having an excess of components that are decaying or consuming maintenance resources to maintain in good working order from non-use.

In some embodiments, each specific component of the plurality of components of the machine is configured for repair or replacement independently of each other specific component of the plurality of components. In some other embodiments, the machine is a pumping unit configured for wellbore servicing operations, and the plurality of components comprises: an engine, a transmission, a speed reducer, a power end, and a fluid end.

The method 2000 comprises, for each specific component: at operation 2002, determining a planned consumption of the specific component. The planned consumption comprises an amount of work the specific component is expected to complete during a job assigned to the machine. The method 2000 further comprises, at operation 2004, retrieving historical lifetime data associated with the specific component. The historical lifetime data comprises historical specimens of the specific component consumed in a set time range. Consumption comprises a period between installation and failure.

The method 2000 further comprises, at operation 2006, based on the historical lifetime data, determining the associated normalized current life consumed for each individual historical specimen at the time of failure based on a power law equivalency model tailored to the specific component; and at operation 2008, based on the normalized current life consumed for each individual historical specimen at the time of failure, determining a probability of survival distribution associated with the specific component. In some embodiments, the probability of survival distribution being a Weibull distribution. In other embodiments, the probability of survival distribution is created by conducting a single-variable monte carlo simulation utilizing a historical failure dataset associated with the specific component as an input to the monte carlo simulation.

In some such other embodiments, the method 1900 up-samples the historical failure dataset associated with the specific component prior to conducting the single-variable monte carlo simulation. The up-sampling comprises generating an up-sampled failure dataset based on the historical failure dataset. The up-sampled failure dataset is (1) larger than the historical failure dataset and (2) more stable than the historical dataset. The historical failure dataset is replaced with the up-sampled failure dataset prior to conducting the single-variable monte carlo simulation. Optionally, in some such other embodiments, the up-sampled failure dataset being more stable than the historical failure dataset comprises the up-sampled failure dataset generating results having greater consistency when utilized as the input to the monte carlo simulation.

The method 2000 further comprises, at operation 2010, based on the probability of survival distribution, the associated normalized current life consumed for each individual specimen of the specific component in a current inventory, and the planned consumption of the specific component, determining a probability of future failure of each individual specimen of the specific component in the current inventory given the planned consumption of the specific component; and at operation 2012, based on the determined probability of future failure of each individual specimen of the specific component in the current inventory, and the planned consumption of the specific component during the job assigned to the machine, determining a projected number of specific component failures prior to completion of the job associated with the specific component.

The method 2000 further comprises, at operation 2014, generating the at least one acquisition request. The at least one acquisition request is configured to acquire a quantity of new specimens of the specific component. The quantity of new specimens at least equal to the projected number of specific component failures prior to completion of the job assigned to the machine. The method 2000 additionally comprises, at operation 2016, increasing the usable inventory of the specific component to include at least the quantity of new specimens.

In some embodiments, the method 2000 further comprises determining a resource cost at risk associated with each individual specimen of the specific component in the current inventory. The resource cost at risk is the probability of failure of each individual specimen of the specific component in the current inventory multiplied by a set amount of available resources needed to repair or replace the individual specimen. In some such embodiments, the method 1900 determines the resource cost at risk associated with the pumping unit. The resource cost at risk associated with the pumping unit is the probability of failure of each component of the plurality of components in the pumping unit multiplied by a set amount of available resources needed to repair or replace each component.

Figure 21:
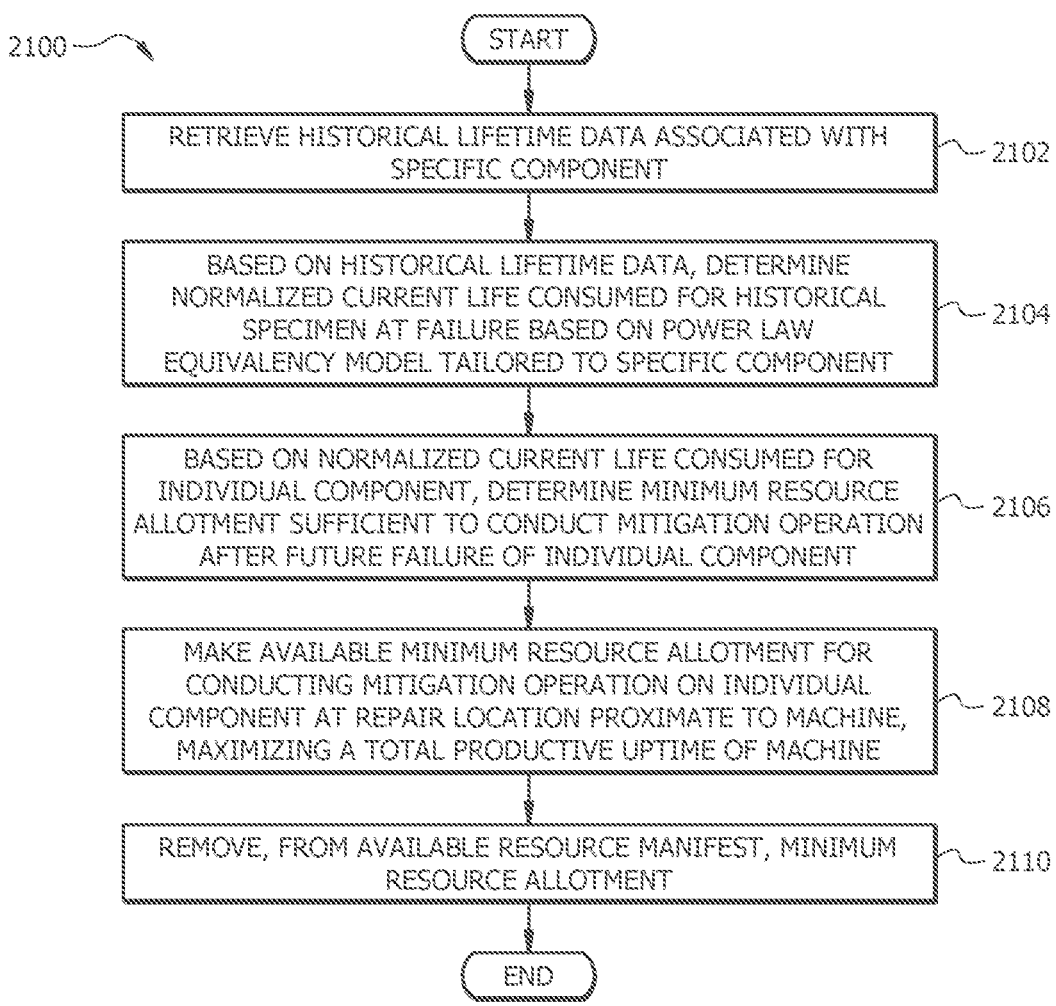
FIG. 21 is an automated method to pre-allocate resources to conduct a mitigation operation on an individual component of a machine having a plurality of components after a future failure of the individual component, using a probabilistic model and based on a current life consumed of the individual component, according to an embodiment of the disclosure.

Turning now to FIG. 21, an automated method 2100 to pre-allocate resources to conduct a mitigation operation on an individual component of a machine having a plurality of components after a future failure of the individual component, using a probabilistic model and based on a current life consumed of the individual component, is described according to an embodiment. In some embodiments, the mitigation operation comprises at least one of repairing or replacing the individual component. In some other embodiments, each individual component of the plurality of components of the machine is configured to be subjected to the mitigation operation independently of each other individual component of the plurality of components. In still other embodiments, the machine is a pumping unit configured for wellbore servicing operations, and the plurality of components comprises: an engine, a transmission, a speed reducer, a power end, and a fluid end.

The method 2100 comprises: at operation 2102, retrieving historical lifetime data associated with the individual component. The historical lifetime data comprises historical specimens of the individual component consumed in a set time range. Consumption comprises a period between installation and failure. The method 2100 further comprises, at operation 2104, based on the historical lifetime data, determining a normalized current life consumed for the individual component based on a power law equivalency model tailored to the specific component; at operation 2106, based on the normalized current life consumed for the individual component, determining a minimum resource allotment sufficient to conduct the mitigation operation after the future failure of the individual component. In some embodiments, the method 1900 generates an alert when the minimum resource allotment exceeds a threshold. The threshold is a set percentage of the available resource manifest. In some such embodiments, the method 1900 communicates the alert to a user via a user interface.

At operation 2108, the method 2100 makes available the minimum resource allotment for conducting the mitigation operation on the individual component at a repair location proximate to the machine, thus maximizing a total productive uptime of the machine; and, at operation 2110, removing, from an available resource manifest, the minimum resource allotment.

Figure 22:
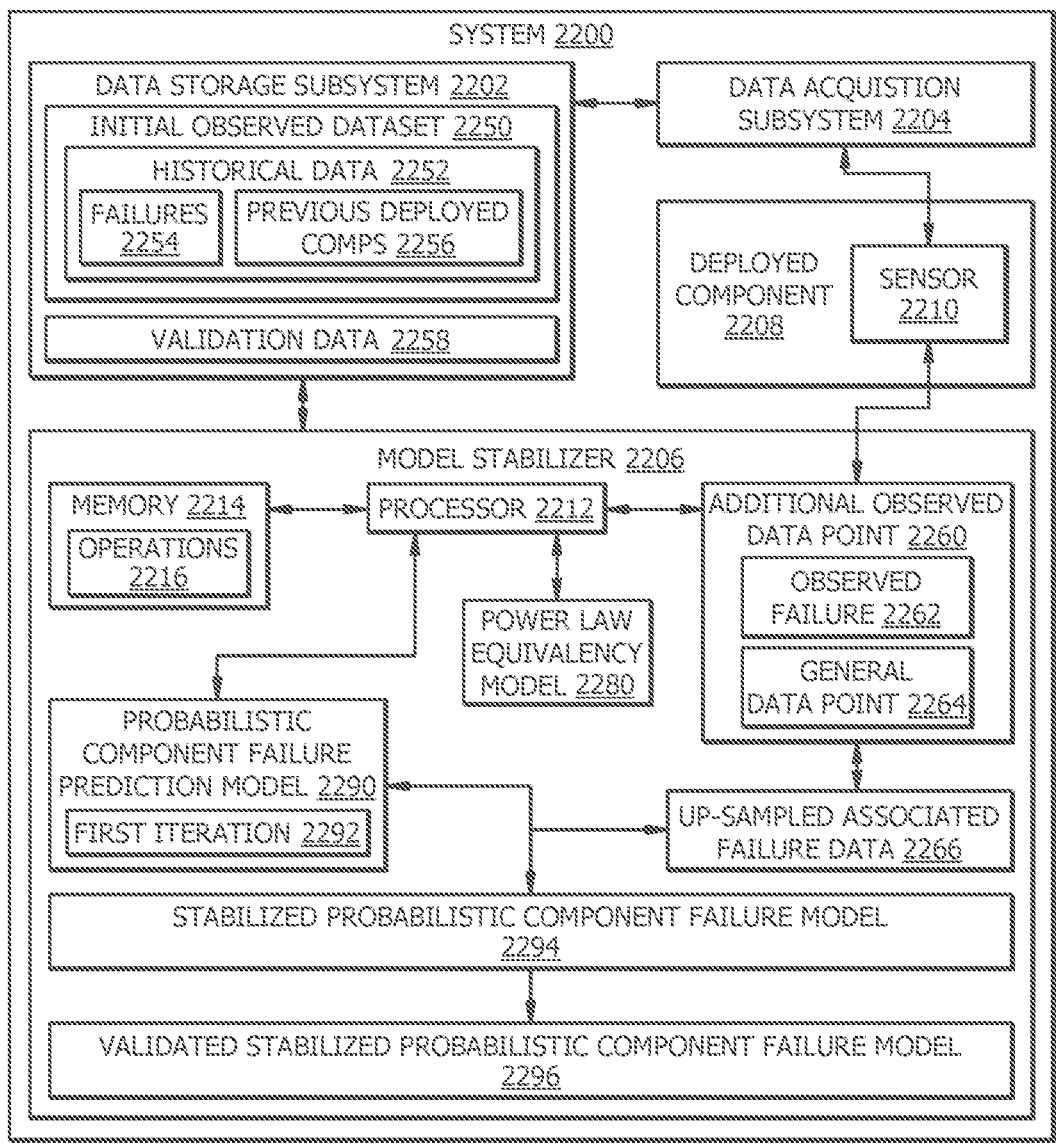
FIG. 22 is a system to stabilize a probabilistic component failure prediction model by generating from an initial observed dataset an up-sampled dataset comprising additional observed datapoints and additional generated datapoints configured to enhance the accuracy of the probabilistic model, according to an embodiment of the disclosure.

Turning now to FIG. 22, a system 2200 to stabilize a probabilistic component failure prediction model 2290 by generating from an initial observed dataset 2250 an up-sampled dataset 2266 (also called the "up-sampled associated failure data 2266" herein) comprising additional observed datapoints 2260 and additional generated datapoints 2264 configured to enhance the accuracy of the probabilistic component failure prediction model 2290 is described according to an embodiment. The system 2200 comprises a data storage subsystem 2202 communicatively coupled to a data acquisition subsystem 2204, and a sensor 2210 communicatively coupled to a deployed component 2208. The sensor 2210 is further communicatively coupled to the data acquisition subsystem 2204. The system 2200 further comprises a model stabilizer 2206. The model stabilizer 2206 comprises a processor 2212 communicatively coupled to a non-transitory memory 2214 and configured to perform a set of operations 2216.

The set of operations 2216 comprise: retrieving the initial observed dataset 2250 from the data storage subsystem 2202; building a first iteration 2292 of the probabilistic component failure prediction model 2290 based on a power law equivalency model 2280 tailored to the initial observed dataset 2250 (the initial observed dataset 2250 comprising historical data 2252 of a plurality of failures 2254 of a plurality of previously deployed components 2256); monitoring, using the sensor 2210, the deployed component 2208; detecting, using the sensor 2210, at least one additional observed datapoint 2260 representing an observed failure 2262 of the deployed component 2208; collecting the at least one additional observed datapoint 2260 associated with the deployed component 2208; and up-sampling, by the model stabilizer 2206, the at least one additional observed datapoint 2260 to generate up-sampled associated failure data 2266.

In some embodiments, up-sampling at least one additional observed datapoint 2260 to generate up-sampled associated failure data 2266 further comprises, for each additional observed datapoint 2260 generating, based on the initial observed dataset 2250 and the additional observed datapoint 2260, an updated normalized life equation for a component type associated with the currently deployed component 2208. The updated normalized life equation is recalculated to include the at least one additional observed datapoint 2260 in an updated component failure prediction. In such embodiments, up-sampling at least one additional observed datapoint 2260 to generate up-sampled associated failure data 2266 also further comprises comparing a current output of the probabilistic component failure prediction model 2290 to an output of the updated normalized life equation; determining that the output of the updated normalized life equation is stabilized in comparison to the current output of the probabilistic component failure prediction model 2290; and adding the current output of the probabilistic component failure prediction model 2290 and the initial observed dataset 2250 to the up-sampled associated failure data 2266. In some such embodiments, the output of the updated normalized life equation that has been stabilized has at least one of increased accuracy and increased consistency.

The operations 2216 further comprise stabilizing, by the model stabilizer 2206, the probabilistic component failure prediction model 2290 using the up-sampled associated failure data 2266 to create a stabilized probabilistic component failure model 2294. In some embodiments, an amount of the historical data 2252 of a plurality of failures 2254 of a plurality of previously deployed components 2256 necessary to stabilize the probabilistic component failure prediction model 2290 is reduced by utilizing up-sampling.

The operations 2216 further comprise validating the stabilized probabilistic component failure prediction model 2294 to create a validated probabilistic component failure prediction model 2296. In some embodiments, validating the stabilized probabilistic component failure prediction model 2294 comprises verifying the accuracy of the stabilized probabilistic component failure prediction model 2294 using validation data 2258.

Some embodiments of the system 2200 further comprise the validated probabilistic component failure prediction model 2296 being configured to predict a component failure of an individual component of a machine having a plurality of components. In such embodiments, the machine is a pumping unit configured for wellbore servicing operations. Also in such embodiments, the plurality of components comprise an engine, a transmission, a speed reducer, a power end, and a fluid end.

Figure 23:
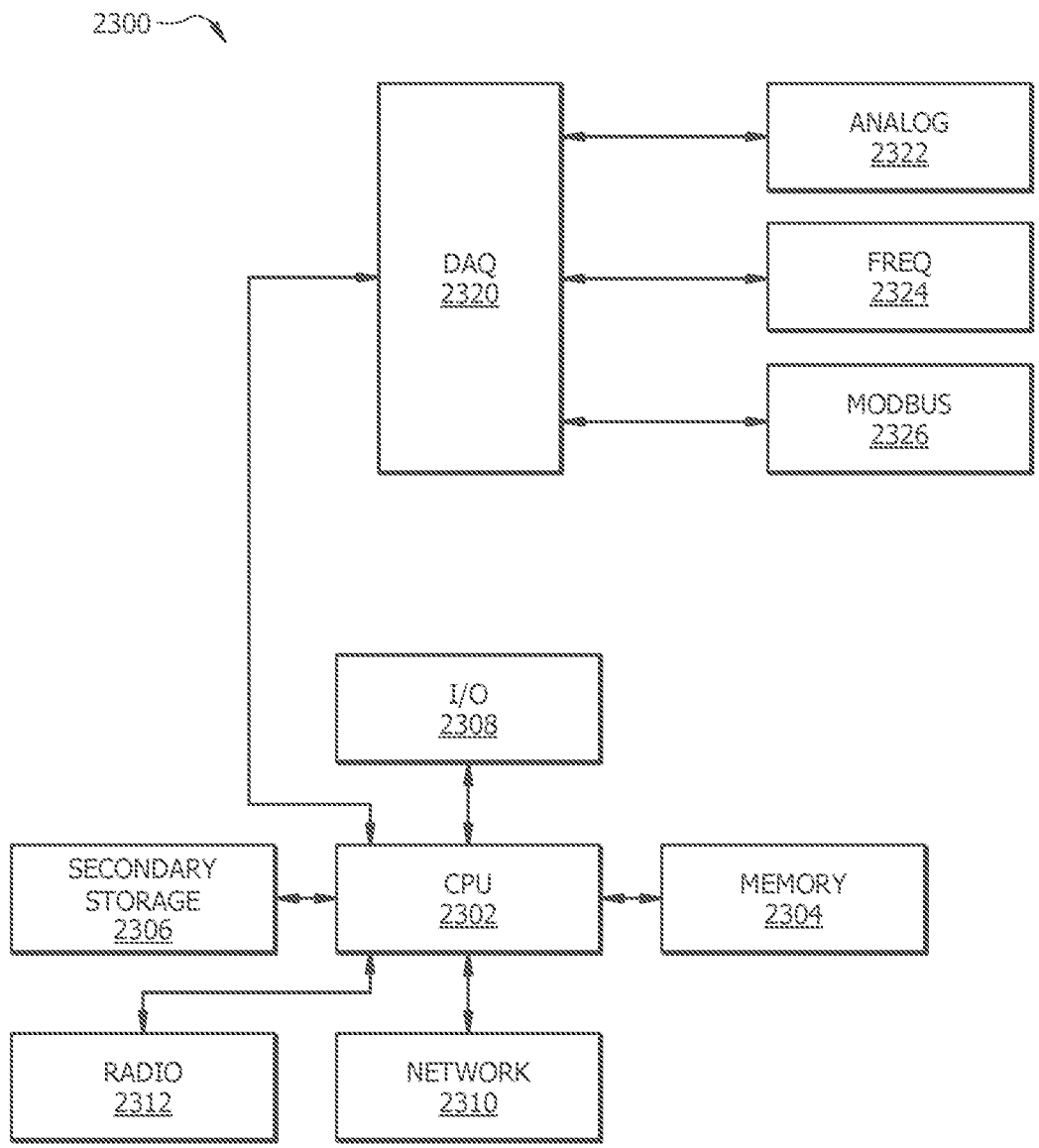
FIG. 23 is a block diagram illustrating a computer system according to an embodiment of the disclosure and suitable for implementing one or more embodiments of the disclosure.

Turning now to FIG. 23, a computer system 2300 according to an embodiment of the disclosure is described. The computer system 2300 is suitable for implementing one or more embodiments of the unit controller, for example, the unit controller or control computer of FIG. 3, including without limitation any aspect of the computing system associated with the pumping equipment and pumping operation located at a remote wellsite. In some embodiments, the computer system 2300 is at least one of (or at least a component of) the system 2200, or any computer system or combination of computer systems configured to execute the method 2000 or the method 2100 described herein. In particular, in some embodiments, the terms unit controller or computer system 2300 are interchangeable. In some embodiments, the computer system 2300 is communicatively connected to embodiments of at least one of the pump 10 or any other component of the wellbore servicing system 200 as disclosed herein.

Some embodiments of the computer system 2300 are suitable for implementing one or more embodiments of a remote computer system, for example, a cloud computing system, a virtual network function (VNF) on a network slice of a cloud computing platform, and a plurality of user devices.

The computer system 2300 includes one or more processors 2302 (each also referred to as a "central processor unit," "central processing unit," or CPU) that is in communication with a memory 2304, a secondary storage 2306, input/output devices 2308, and network devices 2310. Some embodiments of the computer system 2300 continuously monitor the state of the input devices and change the state of the output devices based on a plurality of programmed instructions. In some embodiments, the programmed instructions comprise one or more applications retrieved from the memory 2304 for executing by the processor 2302 in the non-transitory memory 2304 within the memory 2304. In some embodiments, the input/output devices 2308 comprise a Human Machine Interface with a display screen and the ability to receive conventional inputs from a user such as push button, touch screen, keyboard, mouse, or any other such device or element that a user utilizes to input a command to the computer system 2300. In some embodiments, the secondary storage 2306 comprises at least one of a solid-state memory, a hard drive, or any other type of memory suitable for data storage. In some such embodiments, the secondary storage 2306 additionally optionally comprises at least one of removable memory storage devices such as solid-state memory or removable memory media such as magnetic media and optical media (including without limitation compact discs (CDs), digital versatile discs (DVDs), Blu-ray (BD) discs, magneto-optical (MO) discs, etc.).

The computer system 2300 is configured to communicate with various networks utilizing the network devices 2310. In some embodiments, the various networks comprise wired networks utilizing at least one of, e.g., twisted-pair ethernet, direct attach cable (DAC cable), or fiber optic communications equipment, or any other type of wired networking equipment with substantially similar performance characteristics. In other embodiments, the various networks comprise at short range wireless networks such as Wi-Fi (i.e., the IEEE 802.11 family of standards), Bluetooth, or other low power wireless signals such as ZigBee, Z-Wave, 6LoWPan, Thread, and Wi-Fi HaLow, or any other type of wireless networking equipment with substantially similar performance characteristics. In yet other embodiments, the various networks comprise a combination of wired networks and wireless networks as described above. Some embodiments of the computer system 2300 include a long-range radio transceiver 2312 for communicating with mobile network providers.

In some embodiments, the computer system 2300 comprises a data acquisition (DAQ) card 2320 for communication with one or more sensors. In some such embodiments, the DAQ card 2320 is a standalone system with a microprocessor, memory, and one or more applications executing in memory. In some embodiments, the DAQ card 2320, as illustrated, is at least one of a card or a device within the computer system 2300. In some embodiments, the DAQ card 2320 is combined with the input/output device 2308. In some embodiments, the DAQ card 2320 receives one or more analog inputs 2322, one or more frequency inputs 2324, and one or more Modbus inputs 2326. For example, the analog input 2322 may include a volume sensor, e.g., a tank level sensor. In some examples, the frequency input 2324 includes a flow meter, i.e., a fluid system flowrate sensor. In some examples, the modbus input 2326 includes a pressure transducer. In some embodiments, the DAQ card 2320 converts the signals received via the analog input 2322, the frequency input 2324, and the modbus input 2326 into the corresponding sensor data. For example, some embodiments of the DAQ card 2320 converts a frequency input 2324 from the flowrate sensor into flow rate data measured in gallons per minute (GPM).

The systems and methods disclosed herein may be advantageously employed in the context of wellbore servicing operations, particularly, in relation to simulating the effect of turbulators on the displacement of wellbore fluids while cementing as described herein. In some embodiments, systems and methods disclosed herein, including the methods 2000, 2100 or any process executing on the system 2200 or computer system 2300 enable an automated method to pre-allocate resources to conduct a mitigation operation on an individual component of a machine having a plurality of components after a future failure of the individual component, using a probabilistic model and based on a current life consumed of the individual component, the method comprising: retrieving historical lifetime data associated with the individual component, the historical lifetime data comprising historical specimens of the individual component consumed in a set time range, and consumption comprising a period between installation and failure; based on the historical lifetime data, determining a normalized current life consumed for the individual component based on a power law equivalency model tailored to the specific component; based on the normalized current life consumed for the individual component, determining a minimum resource allotment sufficient to conduct the mitigation operation after the future failure of the individual component; making available the minimum resource allotment for conducting the mitigation operation on the individual component at a repair location proximate to the machine, thus maximizing a total productive uptime of the machine; and removing, from an available resource manifest, the minimum resource allotment.

In embodiments herein, utilizing the probabilistic forecast techniques, systems, and methods disclosed capture the probabilistic life costs consumed prior to failure of a component provides full visibility of forecasted future costs (e.g., resources expended for repair, refurbishment, replacement, etc.) associated with using the component to complete work under non-steady state conditions with an associated known amount of cumulative damage that will be incurred by the component. Without utilizing the probabilistic life cost (e.g., for each component of a pumping unit), identifying costs to accrue prior to and up to failure of the component due to the non-steady state work is commercially impracticable. Embodiments of the disclosure enable identifying probable future failures of components, and thus increased forecasted future costs. Identification of increased forecasted future costs is particularly important when using accrual accounting. When using accrual accounting, successfully compensating for the difference in the sum of the probabilistic forecast of future costs and the current actual settled maintenance costs of a component for a period of time (e.g., weekly, monthly, quarterly, etc.) avoids operational difficulties potentially introduced by a failure to make such a compensation.

In such embodiments, combining utilizing the probabilistic forecast techniques, systems, and methods disclosed with accrual accounting provides a number of advantages. Less maintenance resources are needed to maintain equipment using a component (e.g., a pumping unit utilizing the components of pumping units discussed herein), because the resources will be available to address component failures immediately instead of sidelining the equipment until resources become available. Likewise, for a given period of time, the margins of resources being expended versus a return on that expenditure is more accurate than when not utilizing the probabilistic forecast techniques, systems, and methods disclosed with accrual accounting.

In some embodiments, accrual accounting is done by at least one of geographical- or commercially-defined district, geographical- or commercially-defined area, geographical- or commercially-defined region, or some other method of organization of resource expenditure. In some such embodiments, resources are pooled into a common pool for each organizational unit. To account for the variability in component failures in equipment that uses that component across the common pool levels out the high component failure rates and the low component failure rates across all the equipment that shares the common pool.

In some embodiments, the cost consumed by a failed component is obtained by multiplying the EFLX by the cost per EFLX. This cost consumed becomes payable (that is, resources must be expended to address the cost consumed) upon the failure of the component under consideration. The cost consumed per component thus increases as more EFLX for that component is consumed.

In some applications concerned with the failure of components of a pumping unit, a sum of the cost consumed across all non-failed components on all pumping units is the total cost that has accrued. This cost will eventually become due, as explained elsewhere herein. Comparison of the accrued costs with the sum of the settled maintenance costs provides at least an accurate estimation of large costs that will eventually become due (e.g., maintenance resources that must be expended in the future). Monitoring the difference between the accrued costs and the sum of the settled maintenance costs enables effective, fact-based planning for such future costs, including, in some embodiments, (1) automating warnings of growth of in the difference, or (2) automating the reservation of newly acquired resources (including but not limited to monetary payments from current jobs or work) as the life of a component is consumed so that the resources are available when the component fails.

Capturing this accrued cost also enables, in some embodiments, allocation of the costs consumed to the crew, district, or area that used the equipment during the life of the component. This provides an equitable distribution of the cost when the component is used in equipment shared by one or more entities.

ADDITIONAL DISCLOSURE

The following is provided as additional disclosure for combinations of features and aspects of the present invention.

A first embodiment is an automated method to generate at least one acquisition request of a specific component of a machine having a plurality of components, using a probabilistic model and based on a current life consumed and a planned consumption, to maintain a usable inventory of the specific component, each acquisition request being configured to maintain the usable inventory, the method comprising, for each specific component: determining a planned consumption of the specific component, the planned consumption comprising an amount of work the specific component is expected to complete during a job assigned to the machine; retrieving historical lifetime data associated with the specific component, the historical lifetime data comprising historical specimens of the specific component consumed in a set time range, and consumption comprising a period between installation and failure; based on the historical lifetime data, determining the associated normalized current life consumed for each individual historical specimen at the time of failure based on a power law equivalency model tailored to the specific component; based on the normalized current life consumed for each individual historical specimen at the time of failure, determining a probability of survival distribution associated with the specific component; based on the probability of survival distribution, the associated normalized current life consumed for each individual specimen of the specific component in a current inventory, and the planned consumption of the specific component, determine a probability of future failure of each individual specimen of the specific component in the current inventory given the planned consumption of the specific component; based on the determined probability of future failure of each individual specimen of the specific component in the current inventory, and the planned consumption of the specific component during the job assigned to the machine, determine a projected number of specific component failures prior to completion of the job associated with the specific component; generate the at least one acquisition request, the at least one acquisition request configured to acquire a quantity of new specimens of the specific component, the quantity of new specimens at least equal to the projected number of specific component failures prior to completion of the job assigned to the machine; and increase the usable inventory of the specific component to include at least the quantity of new specimens.

A second embodiment, which is the method of the first embodiment, further comprising each specific component of the plurality of components of the machine being configured for repair or replacement independently of the each other specific component of the plurality of components.

A third embodiment, which is the method of the first embodiment, wherein the machine is a pumping unit configured for wellbore servicing operations, and the plurality of components comprises: an engine, a transmission, a speed reducer, a power end, and a fluid end.

A fourth embodiment, which is the method of the first embodiment, further comprising the probability of survival distribution being a Weibull distribution.

A fifth embodiment, which is the method of the first embodiment, further comprising determining a resource cost at risk associated with each individual specimen of the specific component in the current inventory, the resource cost at risk being the probability of failure of each individual specimen of the specific component in the current inventory multiplied by a set amount of available resources needed to repair or replace the individual specimen.

A sixth embodiment, which is the method of the fifth embodiment, further comprising determining the resource cost at risk associated with the pumping unit, the resource cost at risk associated with the pumping unit being the probability of failure of each component of the plurality of components in the pumping unit multiplied by a set amount of available resources needed to repair or replace each component.

A seventh embodiment, which is the method of the first embodiment, wherein the probability of survival distribution is created by conducting a single-variable monte carlo simulation utilizing a historical failure dataset associated with the specific component as an input to the monte carlo simulation.

An eighth embodiment, which is the method of the seventh embodiment, further comprising: up-sampling the historical failure dataset associated with the specific component prior to conducting the single-variable monte carlo simulation, the up-sampling comprising generating an up-sampled failure dataset based on the historical failure dataset, the up-sampled failure dataset being (1) larger than the historical failure dataset and (2) more stable than the historical dataset; and replacing the historical failure dataset with the up-sampled failure dataset prior to conducting the single-variable monte carlo simulation.

The method of the ninth embodiment, which is the method of the eighth embodiment, wherein the up-sampled failure dataset being more stable than the historical failure dataset comprises the up-sampled failure dataset generating results having greater consistency when utilized as the input to the monte carlo simulation.

A tenth embodiment, which is an automated method to pre-allocate resources to conduct a mitigation operation on an individual component of a machine having a plurality of components after a future failure of the individual component, using a probabilistic model and based on a current life consumed of the individual component, the method comprising: retrieving historical lifetime data associated with the individual component, the historical lifetime data comprising historical specimens of the individual component consumed in a set time range, and consumption comprising a period between installation and failure; based on the historical lifetime data, determining a normalized current life consumed for the individual component based on a power law equivalency model tailored to the specific component; based on the normalized current life consumed for the individual component, determining a minimum resource allotment sufficient to conduct the mitigation operation after the future failure of the individual component; making available the minimum resource allotment for conducting the mitigation operation on the individual component at a repair location proximate to the machine, thus maximizing a total productive uptime of the machine; and removing, from an available resource manifest, the minimum resource allotment.

An eleventh embodiment, which is the method of the tenth embodiment, wherein the mitigation operation comprises at least one of repairing or replacing the individual component.

A twelfth embodiment, which is the method of the eleventh embodiment, further comprising each individual component of the plurality of components of the machine being configured to be subjected to the mitigation operation independently of each other individual component of the plurality of components.

A thirteenth embodiment, which is the method of the tenth embodiment, wherein the machine is a pumping unit configured for wellbore servicing operations, and the plurality of components comprises: an engine, a transmission, a speed reducer, a power end, and a fluid end.

A fourteenth embodiment, which is the method of the tenth embodiment, further comprising generating an alert when the minimum resource allotment exceeds a threshold, the threshold being a set percentage of the available resource manifest, and communicating the alert to a user via a user interface.

A fifteenth embodiment, which is a system to stabilize a probabilistic component failure prediction model by generating from an initial observed dataset an up-sampled dataset comprising additional observed datapoints and additional generated datapoints configured to enhance the accuracy of the probabilistic model, the system comprising: a data storage subsystem communicatively coupled to a model stabilizer; a sensor communicatively coupled to a deployed component; the model stabilizer comprising a processor and a non-transitory memory and configured to perform a set of operations comprising: retrieving the initial observed dataset from the data storage subsystem; building a first iteration of the probabilistic component failure prediction model based on a power law equivalency model tailored to the initial observed dataset, the initial observed dataset comprising historical data of a plurality of failures of a plurality of previously deployed components; monitoring, using the sensor, the deployed component; detecting, using the sensor, at least one additional observed datapoint representing a failure of the deployed component; collecting the at least one additional observed datapoint associated with the deployed component; up-sampling the at least one additional observed datapoint to generate up-sampled associated failure data; stabilizing the probabilistic component failure prediction model using the up-sampled associated failure data; and validating the stabilized probabilistic component failure prediction model to create a validated probabilistic component failure prediction model.

A sixteenth embodiment, which is the system of the fifteenth embodiment, further comprising the validated probabilistic component failure prediction model being configured to predict a component failure of an individual component of a machine having a plurality of components; the machine being a pumping unit configured for wellbore servicing operations; and the plurality of components comprising: an engine, a transmission, a speed reducer, a power end, and a fluid end.

A seventeenth embodiment, which is the system of the fifteenth embodiment, up-sampling at least one additional observed datapoint to generate up-sampled associated failure data further comprising, for each additional observed datapoint: generating, based on the initial observed dataset and the additional observed datapoint, an updated normalized life equation for a component type associated with the currently deployed component, the updated normalized life equation being recalculated to include the at least one additional observed datapoint in an updated component failure prediction; comparing a current output of the probabilistic component failure prediction model to an output of the updated normalized life equation; determining that the output of the updated normalized life equation is stabilized in comparison to the current output of the probabilistic component failure prediction model; and adding the current output of the probabilistic component failure prediction model and the initial observed dataset to the up-sampled associated failure data.

An eighteenth embodiment, which is the system of the seventeenth embodiment, wherein the updated normalized life equation being stabilized comprises the output of the updated normalized life equation having at least one of increased accuracy and increased consistency.

A nineteenth embodiment, which is the system of the fifteenth embodiment, wherein validating the stabilized probabilistic component failure prediction model comprises verifying the accuracy of the stabilized probabilistic component failure prediction model using validation data.

A twentieth embodiment, which is the system of the fifteenth embodiment, wherein an amount of the historical data of a plurality of failures of a plurality of previously deployed components necessary to stabilize the probabilistic component failure prediction model is reduced by utilizing up-sampling.

In some embodiments that incorporate an equivalency conversion as described elsewhere herein, rainflow counting is used either as an alternative to or in combination with Miner's Rule. For example, in the context of power ends, speed reducers, and transmissions, the rainflow counting technique converts the uniaxial loading torque sequence of the varying stress, due to the kinematics of the pump, into equivalent constant amplitude torque reversals. Miners rule is then used to calculate the equivalent fatigue damage. In yet other embodiments, other methods of equivalency conversion are usable either alone or in combination with the foregoing.

Some embodiments herein make describe or use the Weibull equation as described herein. In some embodiments, the Weibull equation is preferred as used herein. In other embodiments, alternate probability distributions are usable. Alternate probability distributions include those suitable for modeling cumulative failure of a given component—as non-limiting examples, a Rayleigh distribution or a log normal distribution.

In some embodiments herein, at least one of a beta distribution, possibility theory-based fuzzy math, the first order moment method, the point estimate, the first order reliability method, and variance simulation are usable either in place of or in combination with a monte carlo simulation for the purposes described herein. In some embodiments, the fuzzy math-based approach has performance advantages. As described herein, in some embodiments up-sampling conserves real-world resources and shortens a time-to-market by obviating the need for a large failure data set when allocating resources or performing other tasks.

Examples of up-sampling described herein (e.g., in the discussion of FIG. 18 and FIG. 19), collapse a two-dimensional space to a one-dimensional space. This disclosure contemplates that the same up-sampling techniques are usable to collapse any n-dimensional space to a one-dimensional space based on utilizing an n-dimensional stress equation in place of the power law equation. Further, in addition to the uses described in this disclosure, implementations of the up-sampling of FIGS. 18 and 19 are usable in any application space where there is an insufficient quantity of observed data and more data is needed for an accurate probabilistic analysis.

Throughout this disclosure, 1000 psi buckets are used as examples when discussing pressure buckets, as that term is understood by persons having ordinary skill in the art. The use of exemplary 1000 psi buckets in the disclosure for example purposes only. Nothing in this disclosure, unless otherwise indicated, is intended to place any limits on the size of any psi bucket used in any embodiment or implementation of the disclosure. For example, in some implementations, each psi bucket is sized to match the actual pressure at which a component has operated in the past or is planned to operate in the future. Likewise, while examples herein disclose using a specific number of buckets (e.g., twenty buckets in each of FIGS. 9-12 and twelve buckets in FIG. 13), nothing in this disclosure, unless otherwise indicated, is intended to place any limits on the number of psi buckets used in any embodiment or implementation of the disclosure. The disclosure herein thus contemplates all practicable psi bucket sizes and number of psi buckets.

In the context of this disclosure, unless otherwise indicated, "up-sampling" and "upsamping" are interchangeable. In embodiments herein, the range of probabilities of failure 1582, 1682, and 1782 are each a confidence interval. In some embodiments, once the low value 1584, 1684, and 1784 and high value 1588, 1688, and 1788 stabilize as the forecast continues through each usage period, the forecast is fully representative of all possible outcomes.

In some embodiments, the probabilistic forecast of expected failures 890 is implementable to maximize the amount of useful life extracted from a particular component. For example, assuming component X has been forecasted to have the probabilistic forecast of expected failure 890 under a specific planned consumption, of 0.9 (a ninety percent probability of failure as described herein), the component X is not taken out of service (thus forfeiting remaining consumable life). Instead, pumping unit containing the component X is dispatched to a shorter or less damaging job with a planned consumption that ends before the component X is forecasted to fail.

Embodiments of this disclosure are usable in repair and maintenance forecasting as that term is used herein. In some such embodiments, R and M forecasting is divided into stages including but not limited to: a bidding stage, an equipment mobilization stage, a well treatment stage, a maintenance stage, a component harvesting stage, and an equipment retirement stage.

Bidding. When preparing a bid for a job (e.g., a wellbore servicing operation), a vendor utilizing the systems and methods disclosed herein forecasts the number of expected major component failures and related costs. Based at least in part on these forecasts, the bid is adjusted to account for how many pumps are predicted to be needed for the job and the number of failures of components to plan for over the duration of the wellbore treatment operation. During the bidding stage, some embodiments are also usable to automatically select which pumps to mobilize to all jobs which are being bid upon. The bid is based on both the prior life consumed and the planned consumption of components of pumps, as described herein.

Equipment Mobilization. The prior life consumed and planned consumption forecasted during the bidding stage are used to select, rom the pumps available to be mobilized, which mix of pumps to send to each location to minimize the total number of pumps required and to minimize downtime by selecting the mix of existing pumps that will have the fewest failures across all wells to be treated. In some embodiments, the selection of which pumps to send to which job is based on forecasted major components expected to fail on each job, based in turn on both the component load (pressure and flowrate) the duration of planned consumption (e.g., in hours or some other unit of time), and other factors known to contribute to cumulative damage of a component (e.g., abrasion, corrosion, erosion, fatigue, etc.).

Well Treatment. In embodiments, factors including engine speed, transmission gear and pump revolutions determine the load on each pumping unit and components thereof. As discussed elsewhere herein, embodiments of this disclosure normalize these factors such into an effective one-dimensional prior consumed life to forecast a probability of survival under a specific planned consumption. In some embodiments, during the wellbore servicing operations, the normalized life consumed in real-time is combined with an automatic adjustment of flowrates and pressures to minimize the total component failures during each wellbore servicing operation or well stage treatment.

Maintenance. Traditional, contemporary techniques employ maintenance periods based on calendar time, engine hours, pump hours or horsepower hours. Such periods are inadequate because, unlike the present disclosure, such traditional, contemporary techniques do not represent the life consumed during a wellbore servicing job as, e.g., a function of pressure and flowrate for a duration (e.g., hours). In embodiments, during a wellbore servicing job, the systems and methods of the present disclosure represent the life consumed during a wellbore servicing job as, e.g., a function of pressure and flowrate for a duration (e.g., hours). In some embodiments, prior consumed life or planned future consumption is random relative to the maintenance period. An accurate and reliable determination of the load metrics and the relationship of the load metrics to the normalized life of the components in the face of such randomness is enabled by using R and M forecasting based at least in part on the systems, methods and techniques of this disclosure. The forecasting models and techniques of this disclosure are usable to determine commercially practicable levels of normalized usage between maintenance periods. In some embodiments where the normalized usage is monitored real-time, a computer generates and communicates alerts or reports to users that automatically identify and schedule remediation procedures for, e.g., pumping units or components for which maintenance is due.

Component Harvesting. In some embodiments herein, various equipment (e.g., specific pumps) is taken out of service due to wrecks, fires, other catastrophic conditions, or other external conditions (e.g., a market decline in the hydrocarbon market that leads to a reduction or cessation of hydrocarbon production at a wellsite). The equipment that is taken out of service is excess equipment. In some such embodiments, when the excess equipment is a pump, useful life remains in at least some of the components. This disclosure enables forecasting the remaining life of such components at a desired probability of failure or probability or survival. As a non-limiting example, the systems, methods, and techniques disclosed herein are usable to identify all engines on pumps taken out of service that have a ninety percent (or another target percentage) probability of surviving until a desired usage horizon. The engines of pumps that exhibit the desired probability are then subject harvesting, and the engines are reused on units currently in service. This technique also assists with demand planning by helping to ensure replacement components are available when needed.

Equipment Retirement. In embodiments, in accordance with the foregoing stages of R and M forecasting, components on the equipment (e.g., a pump) are replaced as they reach a defined level of normalized life consumed or a defined level of normalized maintenance. In some such embodiments, such components are not replaced until failure. In some such embodiments, each component has a different consumed life or forecasted remaining life relative to calendar time, which results in the components on the same pump being at different life stages (that is, having different values of prior consumption). Because the components have different values of prior consumption, defining the age of a pump is impracticable. Thus, as described elsewhere herein, cost at risk is used as a surrogate for component or pump age (as illustrated in the discussion of FIG. 14 and elsewhere herein). In some embodiments, pumps are rank ordered by the cost at risk such that if at least one pump needs to be removed from service, those with the highest cost at risk at a given cost horizon or planned consumption are removed from service first. In some such embodiments, because different components fail at different calendar times, the rank order of cost at risk of various components and the pumps associated with those components changes over time with different future usage horizons. Accounting for the different rank order at a given cost horizon or planned consumption optimizes (or "matches to the market") the amount of equipment or components needed to complete wellbore servicing operations upon which successful bids are placed. This avoids either maintaining excess or having insufficient quantities of pumps or components to do the available wellbore servicing operations work.

In the context of this disclosure, "A or B," shall mean "A or B or both." Additionally, any list of elements (e.g., "A, B, C, . . . , or N") shall mean one or more of each element in the list (e.g., one or more of A, B, C, . . . N).

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A system to stabilize a probabilistic component failure prediction model by generating from an initial observed dataset an up-sampled dataset comprising additional observed datapoints and additional generated datapoints configured to enhance accuracy of the probabilistic model, the system comprising:
- a data storage subsystem communicatively coupled to a data acquisition subsystem;
- a sensor communicatively coupled to a deployed component of a machine, the sensor further communicatively coupled to the data acquisition subsystem, wherein the machine is a pumping unit configured for wellbore servicing operations and the deployed component is an engine, a motor, a transmission, a speed reducer, a power end or a fluid end;
- a model stabilizer;
- the model stabilizer comprising a processor communicatively coupled to a non-transitory memory and configured to perform a set of operations comprising:
  - retrieving the initial observed dataset from the data storage subsystem;
  - building a first iteration of the probabilistic component failure prediction model based on a power law equivalency model tailored to the initial observed dataset, the initial observed dataset comprising historical data of a plurality of failures of a plurality of previously deployed components;
  - monitoring, using the sensor, the deployed component;
  - detecting, using the sensor, at least one additional observed datapoint representing an observed failure of the deployed component;
  - collecting the at least one additional observed datapoint associated with the deployed component;
  - up-sampling, by the model stabilizer, the at least one additional observed datapoint to generate up-sampled associated failure data;
  - stabilizing, by the model stabilizer, the probabilistic component failure prediction model using the up-sampled associated failure data to create a stabilized probabilistic component failure model; and
  - validating the stabilized probabilistic component failure prediction model to create a validated probabilistic component failure prediction model,
- wherein the validated probabilistic component failure prediction model is used to generate a forecast of an expected failure of the deployed component, and
- wherein a servicing operation of the machine comprising the deployed component is altered based on the forecast.

2. The system of claim 1, wherein the up-sampling of the at least one additional observed datapoint to generate the up-sampled associated failure data further comprises, for each additional observed datapoint:
- generating, based on the initial observed dataset and the additional observed datapoint, an updated normalized life equation for a component type associated with the deployed component, the updated normalized life equation being recalculated to include the at least one additional observed datapoint in an updated component failure prediction;
- comparing a current output of the probabilistic component failure prediction model to an output of the updated normalized life equation;
- determining that the output of the updated normalized life equation is stabilized in comparison to the current output of the probabilistic component failure prediction model; and
- adding the current output of the probabilistic component failure prediction model and the initial observed dataset to the up-sampled associated failure data.

3. The system of claim 2, wherein the updated normalized life equation being stabilized comprises the output of the updated normalized life equation having at least one of increased accuracy and increased consistency.

4. The system of claim 1, wherein validating the stabilized probabilistic component failure prediction model comprises verifying accuracy of the stabilized probabilistic component failure prediction model using validation data.

5. The system of claim 1, wherein an amount of the historical data of a plurality of failures of a plurality of previously deployed components necessary to stabilize the probabilistic component failure prediction model is reduced by utilizing up-sampling.

6. The system of claim 1, wherein the altering of the servicing operation of the machine comprises dispatching the machine to a job with a planned consumption that ends before the component is forecasted to fail.

7. The system of claim 1, wherein the altering of the servicing operation of the machine comprises transferring the machine from a first job to a second job, wherein the second job is estimated to be less damaging to the machine than the first job.

8. The system of claim 1, wherein the altering of the servicing operation of the machine comprises repairing or replacing the component at a time based on the forecast.

9. The system of claim 1, wherein the altering of the servicing operation of the machine comprises taking the machine out of service.

10. The system of claim 1, wherein the up-sampling comprises generating, based on the initial observed dataset and the additional observed datapoint, an updated normalized life equation for a component type associated with the deployed component.

11. The system of claim 10, wherein the updated normalized life equation is recalculated to include the at least one additional observed datapoint in an updated component failure prediction.

12. The system of claim 11, wherein the up-sampling further comprises comparing a current output of the probabilistic component failure prediction model to an output of the updated normalized life equation.

13. The system of claim 12, wherein the up-sampling further comprises determining that the output of the updated normalized life equation is stabilized in comparison to the current output of the probabilistic component failure prediction model.

14. The system of claim 13, wherein the up-sampling further comprises adding the current output of the probabilistic component failure prediction model and the initial observed dataset to the up-sampled associated failure data.

15. The system of claim 14, wherein the updated normalized life equation being stabilized comprises the output of the updated normalized life equation having at least one of increased accuracy and increased consistency.

16. The system of claim 15, wherein validating the stabilized probabilistic component failure prediction model comprises verifying accuracy of the stabilized probabilistic component failure prediction model using validation data.

17. The system of claim 16, wherein an amount of the historical data of a plurality of failures of a plurality of previously deployed components necessary to stabilize the probabilistic component failure prediction model is reduced by utilizing up-sampling.

18. The system of claim 17, wherein the altering of the servicing operation of the machine comprises dispatching the machine to a job with a planned consumption that ends before the component is forecasted to fail.

19. The system of claim 17, wherein the altering of the servicing operation of the machine comprises transferring the machine from a first job to a second job, wherein the second job is estimated to be less damaging to the machine than the first job.

* * * * *